(12) United States Patent
McCusker et al.

(10) Patent No.: US 9,698,985 B2
(45) Date of Patent: Jul. 4, 2017

(54) AUTHENTICATION

(71) Applicant: CERTIVOX LTD., London (GB)

(72) Inventors: Kealan McCusker, London (GB); Brian Spector, London (GB); Michael Scott, London (GB)

(73) Assignee: MIRACL LIMITED, London (GB)

( * ) Notice: Subject to any disclaimer, the term of this patent is extended or adjusted under 35 U.S.C. 154(b) by 4 days.

(21) Appl. No.: 14/374,046

(22) PCT Filed: May 30, 2014

(86) PCT No.: PCT/GB2014/051666
§ 371 (c)(1),
(2) Date: Jul. 23, 2014

(87) PCT Pub. No.: WO2014/191768
PCT Pub. Date: Dec. 4, 2014

(65) Prior Publication Data
US 2015/0244525 A1    Aug. 27, 2015

(30) Foreign Application Priority Data

May 30, 2013  (GB) .................................. 1309702.7

(51) Int. Cl.
| H04L 29/00 | (2006.01) |
| H04L 9/30 | (2006.01) |
| H04L 9/32 | (2006.01) |
| H04L 29/06 | (2006.01) |

(Continued)

(52) U.S. Cl.
CPC .......... *H04L 9/3073* (2013.01); *H04L 9/3218* (2013.01); *H04L 63/08* (2013.01); *H04L 2209/24* (2013.01)

(58) Field of Classification Search
None
See application file for complete search history.

(56) References Cited

U.S. PATENT DOCUMENTS

| 6,611,597 B1 * | 8/2003 | Futa ........................ G06F 7/725 |
| | | 380/28 |
| 7,239,701 B1 | 7/2007 | Ogishi et al. |
| 7,590,236 B1 | 9/2009 | Boneh et al. |

(Continued)

OTHER PUBLICATIONS

M. Scott and P. S. L. M. Barreto. Compressed pairings. Cryptology ePrint Archive, Report 2004/032, 2004. http://eprint.iacr.org/2004/032.

(Continued)

*Primary Examiner* — Shin-Hon Chen
(74) *Attorney, Agent, or Firm* — Saul Ewing LLP

(57) ABSTRACT

A method in a first entity for authenticating itself to a second entity by proving to the second entity that it is in possession of a full secret without sending the full secret to the second entity, the method comprising: receiving in the first entity an input from a user, the full secret having been divided into at least a first factor and a second factor and the input relating to the second factor of the full secret; reconstructing in the first entity the full secret from at least the first factor and the input; and carrying out a calculation in the first entity using the reconstructed full secret and sending the results of the calculation to the second entity, wherein the results provide an input to a pairing calculation in the second entity.

11 Claims, 13 Drawing Sheets

(51) Int. Cl.
H04L 9/28 (2006.01)
H04K 1/00 (2006.01)

(56) References Cited

U.S. PATENT DOCUMENTS

| | | | |
|---|---|---|---|
| 7,860,247 | B2 | 12/2010 | McCullagh et al. |
| 8,285,996 | B2 | 10/2012 | McCullagh et al. |
| 8,868,923 | B1 * | 10/2014 | Hamlet .................... H04L 9/00 326/8 |
| 2003/0081785 | A1 | 5/2003 | Boneh et al. |
| 2004/0123156 | A1 * | 6/2004 | Hammond, II ....... H04L 9/0891 726/4 |
| 2006/0050886 | A1 | 3/2006 | Tuyls et al. |
| 2007/0165843 | A1 | 7/2007 | Lauter et al. |
| 2008/0016346 | A1 * | 1/2008 | Harrison ............... H04L 9/3073 713/168 |
| 2008/0133912 | A1 * | 6/2008 | Yamamoto ............ H04L 9/3221 713/168 |
| 2009/0285386 | A1 | 11/2009 | Takashima |
| 2009/0327704 | A1 * | 12/2009 | Hatlelid ................. H04L 63/04 713/156 |
| 2011/0055568 | A1 * | 3/2011 | Farrugia ................ H04L 9/321 713/170 |
| 2013/0191638 | A1 | 7/2013 | Spector et al. |

OTHER PUBLICATIONS

N. Smart and F. Vercauteren. On computable isomorphisms in efficient pairing-based systems. Discrete Applied Mathematics, 155:538-547, 2007.
M. Stam and A. K. Lenstra. Speeding up XTR. In Asiacrypt 2001, vol. 2248 of Lecture Notes in Computer Science, pp. 125-143. Springer-Verlag, 2001.
Y. Tseng and T. Tsai. Efficient revocable ID-based encryption with a public channel. The Computer Journal, 55 (4):475-486, 2012.
Y. Wang. Efficient identity-based and authenticated key agreement protocol. Cryptology ePrint Archive, Report 2005/108, 2005. http://eprint.iacr.org/2005/108.
X. Yi. An identity-based signature scheme from weil pairing. IEEE Communications Letters, 7:76-78, 2003.
R. Gallant, R. Lambert, and S. Vanstone. Faster point multiplication on elliptic curves with efficient endomorphism. In Crypto 2001, vol. 2139 of Lecture Notes in Computer Science, pp. 190-200. Springer-Verlag, 2001.
R. Sakai and M. Kasahara. ID based cryptosystems with pairing on elliptic curve. Cryptology ePrint Archive, Report 2003/054, 2003. http://eprint.iacr.org/2003/054.
P.S.L.M. Barreto and M. Naehrig. Pairing-friendly elliptic curves of prime order. In Selected Areas in Cryptology—SAC 2005, vol. 3897 of Lecture Notes in Computer Science, pp. 319-331. Springer-Verlag, 2006.
S. Blake-Wilson, D. Johnson, and A. Menezes. Key agreement protocols and their security analysis. Cryptography and Coding, 1355:30-45, 1997.
D. Boneh and M. Franklin. Identity-based encryption from the Weil pairing. SIAM Journal of Computing, 32(3):586-615, 2003.
L. Chen and C. Kudla. Identity based key agreement protocols from pairings. In Proc. of the 16-th IEEE Computer Security Foundations Workshop, pp. 219-233. IEEE Computer Society, 2003.
D. Fiore and R. Gennaro. Making the Diffie-Hellman protocol identity-based. In Topics in Cryptology—CT-RSA 2010, vol. 5985 of Lecture Notes in Computer Science, pp. 165-178. Springer, 2010.
D. Freeman, M. Scott, and E. Teske. A taxonomy of pairing friendly elliptic curves. Journal of Cryptography, 23:224-280, 2010.
L. Fuentes-Castaneda, E. Knapp, and R. Rodriguez-Henríquez. Faster hashing to $G\_2$. In Selected Areas in Cryptography—SAC 2011, vol. 7118 of Lecture Notes in Computer Science, pp. 412-430. Springer-Verlag, 2011.
S. Galbraith, K. Paterson, and N. Smart. Pairings for cryptographers. Discrete Applied Mathematics, 156:3113-3121, 2008.
S. Galbraith and M. Scott. Exponentiation in pairing-friendly groups using homomorphisms. In Pairing 2008, vol. 5209 of Lecture Notes in Computer Science, pp. 211-224. Springer-Verlag, 2008.
R.P. Gallant, R.J. Lambert, and S.A. Vanstone. Faster point multiplication on elliptic curves with efficient endomorphisms. In Advances in Cryptology—Crypto 2001, vol. 2139 of Lecture Notes in Computer Science, pp. 190-200. Springer-Verlag, 2001.
F. Hao and D. Clarke. Security analysis of a multi-factor authenticated key exchange protocol. Cryptology ePrint Archive, Report 2012/039, 2012. http://eprint.iacr.org/2012/039.
H. S. Kim, S. W. Lee, and K. Y. Yoo. ID-based password authentication scheme using smart cards and fingerprints. ACM Operating Systems Review, 37(4):32-41, 2003.
I. Liao, C. Lee, and M. Hwang. A password authentication scheme over insecure networks. Journal of Computer and System Sciences, 72:727-740, 2006.
R. Martinez-Pelaez and F. Rico-Novella. Cryptanalysis of Sood at al.'s authentication scheme using smart cards. Cryptology ePrint Archive, Report 2012/386, 2012. http://eprint.iacr.org/2012/386.
D. Pointcheval and S. Zimmer. Multi-factor authenticated key exchange. In ACNS'08 Proceedings of the 6th international conference on Applied cryptography and network security, pp. 277-295. Springer-Verlag, 2008.
R. Sakai, K. Ohgishi, and M. Kasahara. Cryptosystems based on pairing. The 2000 Symposium on Cryptography and Information Security, Okinawa, Japan, 2000.
C. P. Schnorr. Efficient identification and signatures for smart cards. In Crypto'89: Advances in Cryptology, vol. 435 of Lecture Notes in Computer Science, pp. 239-252, 1989.
M. Scott. Authenticated ID-based key exchange and remote log-in with simple token and PIN number. Cryptology ePrint Archive, Report 2002/164, 2002. http://eprint.iacr.org/2002/164.
M. Scott. Cryptanalysis of an ID-based password authentication scheme using smart cards and fingerprints. Cryptology ePrint Archive, Report 2004/017, 2004. http://eprint.iacr.org/2004/017.
M. Scott. On the efficient implementation of pairing-based protocols. In Cryptography and Coding 2011, vol. 7089 of Lecture Notes in Computer Science, pp. 296-308. Springer-Verlag, 2011.
A. Shamir. Identity-based cryptosystems and signature schemes. In Advances in Cryptology: Proceedings of CRYPTO 84, vol. 196 of Lecture Notes in Computer Science, pp. 47-53, 1984.
S. Sood, A. Sarje, and K. Singh. An improvement of Liao at al's authentication scheme using smart cards. International Journal of Computer Applications, 1(8):16-23, 2010.
D. Stebila, P. Poornaprajna, and S. Chang. Multi-factor password-authenticated key exchange. In Australasian Information Security Conference, CPRIT vol. 105, pp. 56-66. Australian Computer Society, 2010.
C. Tsai, C. Lee, and M. Hwang. Password authentication schemes: Current status and key issues. International Journal of Network Security, 3(2):101-115, 2006.
D. Wang, C. Ma, and P. Wu. Secure password-based remote user authentication scheme with non-tamper resistant smart cards. Cryptology ePrint Archive, Report 2012/227, 2012. http://eprint.iacr.org/2012/227.
Shengbao Wang, Zhenfu Cao, Zhaohui Cheng, and Kim-Kwang Raymond Choo. Perfect forward secure identity-based authenticated key agreement protocol in the escrow mode. Science in China Series F Information Sciences, 52(8): 1358-1370, 2009.
Y.Wang. Efficient identity-based and authenticated key agreement protocol. Cryptology ePrint Archive, Report 2005/108, 2005. http://eprint.iacr.org/2005/108.
Y. Wang. Password protected smart card and memory stick authentication against off-line dictionary attacks. Cryptology ePrint Archive, Report 2012/120, 2012. http://eprint.iacr.org/2012/120.
T. Wu. The secure remote password protocol. In Proceedings of the 1998 Internet Society Network and Distributed System Security Symposium, pp. 97-111, 1998.
Guomin Yang, Duncan S. Wong, HuaxiongWang, and Xiaotie Deng. Formal analysis and systematic construction of two-factor authen-

(56) References Cited

OTHER PUBLICATIONS tication scheme. In Proceedings of the 8th international conference on Information and Communications Security, ICICS'06, pp. 82-91. Springer-Verlag, 2006.

E. Yoon and K. Yoo. New authentication scheme based on a one-way hash function and Diffie-Hellman key exchange. In CANS'05 Proceedings of the 4th international conference on Cryptology and Network Security, vol. 3810 of Lecture Notes in Computer Science, pp. 147-160. Springer-Verlag, 2005.

D. F. Aranha, K. Karabina, P. Longa, C. H. Gebotys, and J. Lopez. Faster explicit formulas for computing pairings over ordinary curves. Cryptology ePrint Archive, Report 2010/526, 2010. http://eprint.iacr.org/2010/526.

L. Ballard M. Green, B. de Medeiros, and F. Montrose. Correlation-resistant storage via keyword-searchable encryption. Cryptology ePrint Archive, Report 2005/417, 2005. http://eprint.iacr.org/2005/417.

F. Bao, R. Deng, and H. Zhu. Variations of diffie-hellman problem. In ICICS 2003, vol. 2836 of Lecture Notes in Computer Science, pp. 301-312. Springer-Verlag, 2003.

M. Bellare, C. Namprempre, and G. Neven. Security proofs for identity-based identification and signature schemes. In Eurocrypt 2004, vol. 3027 of Lecture Notes in Computer Science, pp. 268-286. Springer-Verlag, 2004.

D. Boneh, B. Lynn, and H. Shacham. Short signatures from the weil pairing. In Asiacrypt 2001, vol. 2248 of Lecture Notes in Computer Science, pp. 514-532. Springer-Verlag, 2001.

J. Cha and J. Cheon. An identity-based signature from gap diffie-hellman groups. In PKC 2003, vol. 2567 of Lecture Notes in Computer Science, pp. 18-30. Springer-Verlag, 2003.

B. Chevalier-Mames, J-S. Coron, N. McCullagh, D. Naccache, and M. Scott. Secure delegation of elliptic curve pairing. Cryptology ePrint Archive, Report 2005/150, 2005. http://eprint.iacr.org/2005/150.

A. Fiat and A. Shamir. How to prove yourself: Practical solutions to identification and signature problems. In Crypto 1986, vol. 263 of Lecture Notes in Computer Science, pp. 186-194. Springer-Verlag, 1987.

K. Kurosawa and S-H. Heng. From digital signature to ID-based identification/ signature. In PKC 2004, vol. 2947 of Lecture Notes in Computer Science, pp. 125-143. Springer-Verlag, 2004.

C. H. Lim and P. J. Lee. A key recovery attack on discrete log-based schemes using a prime order subgroup. In Crypto 1994, vol. 1294 of Lecture Notes in Computer Science, pp. 249-263. Springer-Verlag, 1994.

J. Pollard. Monte carlo methods for index computation mod p. Mathematics of Computation, 32, 1978.

M. Scott. Computing the tate pairing. In CT-RSA 2005, vol. 3376 of Lecture Notes in Computer Science, pp. 293-304. Springer-Verlag, 2005.

M. Scott. Replacing username/password with software-only two-factor authentication. Cryptology ePrint Archive, Report 2012/148, 2012. http://eprint.iacr.org/2012/148.

* cited by examiner

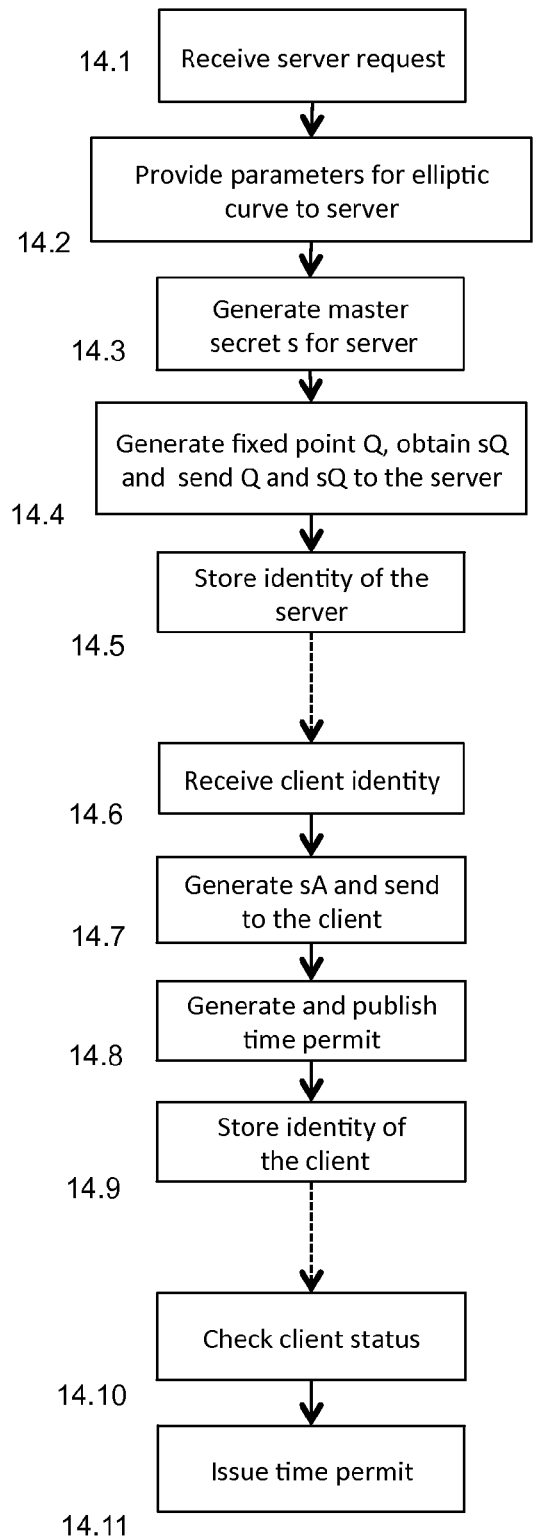
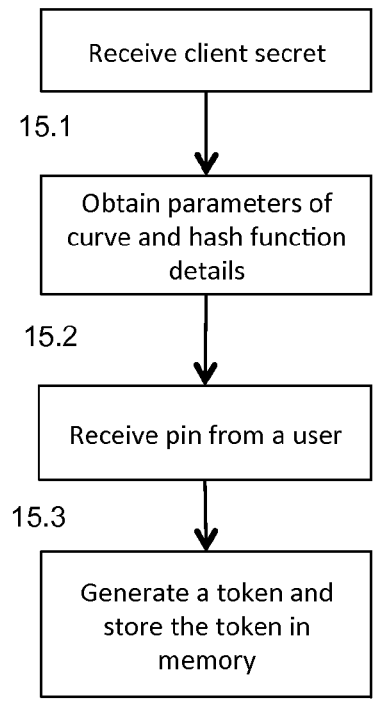
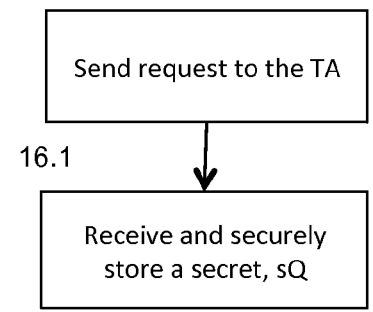
Figure 14
Figure 15
Figure 16

AUTHENTICATION

CROSS REFERENCE TO RELATED APPLICATIONS

This application claims the priority of PCT/GB2014/051666, filed on May 30, 2014, which claims priority to Great Britain Application No. 1309702.7, filed on May 30, 2013, the entire contents of each of which is fully incorporated herein by reference.

FIELD OF THE INVENTION

The specification relates to security. More particularly, but not exclusively, it relates to authentication of a first entity to a second entity.

BACKGROUND OF THE INVENTION

It is basically a solved problem for a server to authenticate itself to a client using standard methods of Public Key cryptography. The Public Key Infrastructure (PKI) supports the Secure Socket Layer (SSL) protocol which in turn enables this functionality. The single-point-of-failure in PKI, and hence the focus of attacks, is the Certification Authority. However this entity is commonly off-line, well defended, and not easily got at. For a client to authenticate itself to the server is much more problematical. The simplest and most common mechanism is Username/Password. Although not at all satisfactory, the only onus on the client is to generate and remember a password—and the reality is that we cannot expect a client to be sufficiently sophisticated or well organised to protect larger secrets. However Username/Password as a mechanism is breaking down. So-called zero-day attacks on servers commonly recover files containing information related to passwords, and unless the passwords are of sufficiently high entropy they will be found. The commonly applied patch is to insist that clients adopt long, complex, hard-to-remember passwords. This is essentially a second line of defence imposed on the client to protect them in the (increasingly likely) event that the authentication server will be successfully hacked. Note that in an ideal world a client should be able to use a low entropy password, as a server can limit the number of attempts the client can make to authenticate itself.

A proposed alternative is the adoption of multifactor authentication. In the simplest case the client must demonstrate possession of both a token and a password. The banks have been to the forefront of adopting such methods, but the token is invariably a physical device of some kind. Cryptography's embarrassing secret is that to date no completely satisfactory means has been discovered to implement two-factor authentication entirely in software.

This patent specification describes not only various ideas and functions, but also their creative expression. A portion of the disclosure of this patent document therefore contains material to which a claim for copyright is made and notice is hereby given: Certivox Limited (pursuant to 17 U.S.C. 401). A claim to copyright protection is made to all protectable expression associated with the embodiments of the invention illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to an aspect of the invention, there is provided a method of a first entity authenticating itself to a second entity by proving to the second entity that it is in possession of a full secret without sending the full secret to the second entity, the method comprising: receiving in the first entity an input from a user, the full secret having been divided into at least a first factor and a second factor and the input relating to the second factor of the secret; reconstructing in the first entity the full secret from at least the first factor and the input; and carrying out a calculation in the first entity using the reconstructed full secret and sending the results of the calculation to the second entity, wherein the results provide an input to a pairing calculation in the second entity.

The results may be sent to the second entity to be used by the second entity to determine whether the first entity is in possession of the secret. The second entity carries out a calculation to determine whether the first entity is in possession of the key and the pairing calculation may form part of that calculation.

The method may be a computer-implemented method. The first entity may be a client and the second entity may be a back-end server. The client may be a program run in a browser of a computing device. The input may be received from a user. The user may be a person or a computing device.

Consequently, a server can authenticate the client without the client sending its secret to the server. Moreover, the heavy processing involved in the pairing calculation can be carried out in the server.

The secret may have been divided into two factors comprising said first and second factor, the input may comprise a guess of the second factor and the secret is reconstructed from the first factor and the guess for the second factor.

The secret may correspond to a point on an algebraic curve and the pairing calculation may comprise a cryptographic pairing on the algebraic curve. The algebraic curve may be an elliptic curve. Alternatively, it could be a hyperelliptic curve.

The method may further comprise receiving, in the first entity, a challenge from the second entity and wherein the calculation using the recovered secret may also use the challenge to obtain the results to be sent to the second entity.

The calculation in the first entity may comprise calculating in the first entity the coordinates of a point on the algebraic curve, from a point corresponding to the secret, or a point derived from at least a point corresponding to the secret, and wherein sending the results of the calculation to the second entity may comprise sending the coordinates of the point.

The calculation in the first entity may comprise multiplying, on the algebraic curve, a point corresponding to the secret, or a point derived from at least a point corresponding to the secret, in the first entity to obtain another point on the algebraic curve and wherein sending the results of the calculation to the second entity may comprise sending the coordinates of that other point.

The secret of the first entity may have been issued by a trusted authority and may be based on the identity of the first entity and a master secret stored by a trusted authority. The trusted authority may be an independent entity. The trusted authority may also have issued a separate secret to the second entity and the second entity may need the secret to authenticate the first entity. The second entity may use the second entity secret in its calculations to authenticate the first entity.

The method may further comprise generating a random value x in the first entity, where x is lower than q; calculating $A=H_1(ID_\alpha)$ in the first entity, where $ID_\alpha$ is the identity associated with the first entity and $H_1$ is a hash function that hashes the identity to a point on the algebraic curve; calculating another point $U=xA$ on the curve in the first entity and transmitting $ID_\alpha$ and U to the second entity; and receiving a random value y generated in the second entity, wherein y is lower than q, and wherein carrying out said calculation in the first entity using the reconstructed key and sending the results to the second entity comprises calculating a new point $V=-(x+y)((s-\alpha)A+\alpha A)$ and sending V to the second entity. The first factor may correspond to the coordinates of a point $(s-\alpha)A$, the input may comprise a value $\alpha$, the client secret may be issued by a trusted authority and obtained by the trusted authority by multiplying the point A corresponding to the client identity with a master secret s. The pairing calculation may comprise a mapping $\mathbb{G}_1 \times \mathbb{G}_2 \to \mathbb{G}_T$ where $\mathbb{G}_1$ and $\mathbb{G}_2$ are distinct and q is the order of the groups $\mathbb{G}_1$, $\mathbb{G}_2$ and $\mathbb{G}_T$.

The method may further comprise receiving a time permit in the first entity and the calculation using the reconstructed secret may also use the time permit to obtain the results to send to the second entity. The time permit may be issued by the trusted authority and the time permit may be derived from a time period during which the first entity is entitled to complete the protocol.

Alternatively, the method may further comprise receiving a time permit in the first entity and the calculation using the reconstructed secret may also use the time permit to obtain the results to send to the second entity. The time permit may be issued by the trusted authority and the time permit may be derived from a time period during which the first entity is entitled to complete the protocol and additional data.

The pairing calculation may form part of a calculation in the second entity to authenticate the first entity and the method may further comprise receiving a response from the second entity indicating that the input did not correspond to the second factor and inviting the first entity to try to authenticate again.

The pairing calculation may form part of a calculation in the second entity to authenticate the first entity and wherein the method may further comprise, in response to the second entity determining that the first entity is in possession of the secret, the first entity receiving an indication that the authentication was successful.

The method may further comprise receiving a response from the second entity and deriving in the first entity an encryption key from a data value in the response, the data value in the response being obtained from the results of a pairing of said pairing calculation.

The pairing calculation may comprise a mapping $\mathbb{G}_1 \times \mathbb{G}_2 \to \mathbb{G}_T$ where $\mathbb{G}_1$ and $\mathbb{G}_2$ are distinct groups and q is the order of the groups $\mathbb{G}_1$, $\mathbb{G}_2$ and $\mathbb{G}_T$, the results of the calculation may be the coordinates of a point V on the algebraic curve, in $\mathbb{G}_1$, the mapping may take as a first input the point V and take as a second input a second point on the algebraic curve in $\mathbb{G}_2$, the second point corresponding to a fixed point associated with the second entity.

Deriving the key may comprise raising the data value to the power of a value unknown to the second entity and hashing the results to obtain the key and the method may further comprise using the key to encrypt messages to the second entity and decrypt messages received from the second entity.

The method may further comprise the first entity extracting the second factor from the full secret to create the first and the second factor.

The second factor may comprise a Personal Identification number (PIN). It may alternatively comprise a password or a soft biometric.

According to another aspect of the invention, there is also provided a computer program for a client device for authenticating itself to an authenticating entity by proving to the entity that it is in possession of a secret without sending the secret to the entity, the computer program comprising instructions that when executed by at least one processor of the client device cause the at least one processor to execute the method described above.

The computer program may be part of or run in, a browser of the client device. The authenticating entity may be a computing system. The computing system may be an authenticating server.

According to another aspect of the invention, there is also provided a non-transitory tangible computer readable medium storing the computer program.

According to another aspect of the invention, there is also provided a method of authenticating a first entity to a second entity by determining that the first entity must be in a possession of a secret without the second entity receiving the secret itself, the method comprising: receiving in the second entity a result of a calculation carried out in the first entity, the calculation using the secret reconstructed in the first entity from at least a first factor and a second factor of the secret; and carrying out a calculation in the second entity to determine that the first entity is in possession of the secret, wherein the calculation comprises a pairing calculation based on the result received from the first entity.

The method may be a computer-implemented method. The first entity may be a client. The second entity may be a back end server. The client may be a program run in the browser of a device.

The secret may have been divided into two factors comprising said first and second factor and the secret may be reconstructed from said two factors.

The first entity secret may correspond to a point on an algebraic curve and the pairing calculation may comprise a pairing on the algebraic curve. The curve may be an elliptic or a hyper-elliptic curve.

The pairing calculation may take the results from the first entity directly as an input. Alternatively, it may use the results from the first entity to derive an input to the pairing calculation.

The calculation to determine that the first entity is in possession of the first entity secret may also require a second entity secret associated with the second entity.

The calculation in the second entity may comprise calculating a product of pairings to determine whether the first entity is in possession of the secret, the product of pairings comprising a first pairing based on the result received from the client, and a second pairing based on a secret of the second entity. The product of pairings may be calculated as a multi-pairing. Alternatively, it may be calculated as two separate pairings that are then multiplied together.

The second entity may determine whether the product of pairings is equal to a predetermined value and may authenticate the first entity if the product is equal to the predetermined value.

The secret of the first entity may have been issued by a trusted authority and may be based on the identity of the first entity and a master secret stored by a trusted authority and the secret of the second entity may also have been issued by the trusted authority and may be derived from a fixed point on the curve and said master secret.

The method may further comprise: receiving, from the first entity, the identity of the first entity and the coordinates of a point U on the algebraic curve; generating a random value y, lower than q, in the second entity and sending to the first entity; calculating $A=H_1(ID_\alpha)$ in the second entity, where $ID_\alpha$ is an identity associated with the first entity and $H_1$ is a hash function that hashes the identity to a point on an algebraic curve. Receiving the result of the calculation from the first entity may comprise receiving the coordinates of a point V from the first entity, where $V=-(x+y)((s-\alpha)A+\alpha A)$, wherein x is another random value lower than q and the secret of the first entity is issued by a trusted authority and corresponds to a point sA wherein s is a master secret, the at least first factor corresponds to a point $(s-\alpha)A$ on the algebraic curve and the second factor comprises a value $\alpha$. Calculating said pairing calculation may comprise calculating a product of pairings comprising a first pairing $e(V,Q)$ and a second pairing $e(U+yA, sQ)$ to obtain $g=e(V,Q) \cdot e(U+yA, sQ)$ where Q is a fixed point on the curve and sQ is another point on the curve corresponding to a secret of the second entity and the first and second pairing is a mapping $\mathbb{G}_1 \times \mathbb{G}_2 \rightarrow \mathbb{G}_T$ where $\mathbb{G}_1$ and $\mathbb{G}_2$ are distinct and q is the order of the groups $\mathbb{G}_1$, $\mathbb{G}_2$ and $\mathbb{G}_T$. The method may further comprise refusing the connection if $g \neq 1$.

The method may further comprise obtaining a time period during which the first entity is entitled to complete the protocol and using the time period and the identity of the first entity to derive an input to the second pairing.

Alternatively, the method may further comprise obtaining a time period during which the first entity is entitled to complete the protocol and additional data and using the time period, the additional data and the identity of the first entity to derive an input to the second pairing.

The method may further comprise transmitting a value derived from the result of the first pairing to the first entity to allow the first entity to derive an encryption key.

The pairing calculation may include a pairing which is a type-3 mapping $\mathbb{G}_1 \times \mathbb{G}_2 \rightarrow \mathbb{G}_T$ where $\mathbb{G}_1$ and $\mathbb{G}_2$ are distinct and the pairing takes as a first input a first point on the algebraic curve in $\mathbb{G}_1$, derived by at least one multiplication, on the algebraic curve, of a point corresponding to the first entity secret or a point derived from at least the point corresponding to the first entity secret, and takes as a second input a second point on the algebraic curve in $\mathbb{G}_2$, the second point corresponding to a fixed point associated with the second entity.

The method may further comprise the second entity calculating an encryption key to be used for further communication between the first and the second entity, the calculation of the encryption key comprising calculating a pairing based on an identity of the first entity and the second entity secret. The pairing may take as input a point derived from the identity of the client and other data.

The encryption key established in the second entity is the same as the encryption key established in the first entity. A new key may be established each time the entities start a new communication session.

The pairing to obtain the encryption key in the second entity may be a type-3 mapping $\mathbb{G}_1 \times \mathbb{G}_2 \rightarrow \mathbb{G}_T$ where $\mathbb{G}_1$ and $\mathbb{G}_2$ are distinct and the pairing takes as a first input a point on the algebraic curve in $\mathbb{G}_1$, derived by at least one multiplication, on the algebraic curve, of a point derived from at least a point corresponding to an identity of the first entity, and takes as a second input a point on the algebraic curve in $\mathbb{G}_2$ corresponding to the second entity secret.

The second entity may comprise at least two components, each storing a part of the secret of the second entity. The second entity secret can be obtained by adding the two parts together. Carrying out the second pairing may comprise calculating a pairing in each component, taking as an input its respective part, and then calculating a product of the results of the two pairings. One of the two components or a separate component of the second entity can carry out the product of the two pairings. The second entity secret may be divided into more than two parts and the second entity may comprise more than two components for storing the parts of the secret.

The method may comprise, in response to determining that the first entity is not in possession of the secret, determining the extent of any error in the second factor.

The extent of any error is calculated using the value of g and the equation $g=e(U+yA, Q)^\delta$ where $\delta$ is the extent of the error in the second factor. Alternatively, if time permits are used, it may be calculated using $g=e(R+yA, Q)^\delta$, The method may further comprise, in response to determining that the first entity is not in possession of the secret, inviting the first entity to attempt to authenticate again, and calculation the value of a total error score, the value increasing by a variable amount for each authentication attempt, the amount varying depending on the extent of error in the second factor in each authentication attempt. The method may further comprise rejecting the connection to the first entity if the value of the total error score exceeds a predetermined maximum error score. For some types of errors, the variable amount may be zero.

The method may further comprise considering additional information comprising at least one out of the location of the first entity, the identity of the first entity, the IP address and the time of authentication, when deciding in the second entity whether to invite the first entity to attempt to authenticate again.

The method may further comprise, in response to determining that the error is of a predetermined type, determining that the first entity is attempting to send a message and determining that message from the error in the second factor.

The second factor may comprises a PIN. Alternatively, it may comprise a password or a soft biometric.

The algebraic curve may be an elliptic curve. The curve may be an elliptic curve having a BN curve parameter such that $(p^4-p^2+1)/q$ is a prime, where p is the prime modulus and q is the order of the groups $\mathbb{G}_1$, $\mathbb{G}_2$ and $\mathbb{G}_T$ of the mapping $\mathbb{G}_1 \times \mathbb{G}_2 \rightarrow \mathbb{G}_T$ on the curve.

According to another aspect of the invention, there is also provided a computer program for an authenticating apparatus for authenticating a client device by determining that the client device must be in a possession of a secret without the authenticating apparatus receiving the secret itself, the computer program comprising instructions that when executed by a at least one processor cause the at least one processor to carry out the method in the second entity described above.

According to another aspect of the invention, there may be provided a non-transitory computer readable medium having the computer program recorded and stored thereon.

According to another aspect of the invention, there is also provided a method of authenticating a client to a server comprising a client carrying out the method described to be carried out in the first entity above and a server carrying out the method described to be carried out in the second entity above.

According to another aspect of the invention, there is also provided an apparatus for authenticating itself to another entity by providing to the other entity that it is in possession of a secret without revealing the secret to the other entity, the apparatus comprising: at least one memory having instructions stored thereon; and one or more processors programmed to execute the instructions to perform the following operations: receiving in the apparatus an input from a user, the secret being divided into at least a first factor and a second factor and the input relating to the second factor of the secret; reconstructing in the apparatus a secret from at least the first factor and the second factor; and carrying out a calculation in the apparatus using the reconstructed secret and sending the results of the calculation to the other entity, wherein the results provides an input to a pairing calculation.

The full secret may correspond to a point on an elliptic curve and the non-transitory computer readable medium may further may have instructions that when executed by the one or more processors perform the following: generating a random value x in the apparatus, where x is lower than q; calculating $A=H_1(ID_\alpha)$ in the apparatus, where $ID_\alpha$ is the identity associated with the apparatus and $H_1$ is a hash function that hashes the identity to a point on an elliptic curve; calculating another point U=xA on the elliptic curve in the apparatus and transmitting $ID_\alpha$ and U to the other entity; and receiving a random value y generated in the other entity, where y is lower than q. The instructions for carrying out said calculation in the apparatus using the reconstructed key and sending the results to the other entity may comprise instructions for calculating a new point $V=-(x+y)((s-\alpha)A+\alpha A)$ and sending V to the other entity, wherein the first factor is the coordinates of a point $(s-\alpha)A$, the input comprises a value $\alpha$, the secret sA is issued by a trusted authority and obtained by the trusted authority by multiplying the point corresponding to the identity associated the apparatus with a master secret s and the pairing calculation comprises a mapping $$\mathbb{G}_1 \times \mathbb{G}_2 \to \mathbb{G}_T$$

where $\mathbb{G}_1$ and $\mathbb{G}_2$ are distinct and q is the order of the groups $\mathbb{G}_1$, $\mathbb{G}_2$ and $\mathbb{G}_T$.

The calculation using the reconstructed secret may also use a time permit received in the apparatus to obtain the results to send to the other entity, the time permit may be issued by the trusted authority and the time permit may be derived from a time period during which the apparatus is entitled to complete the protocol.

The at least one memory may further comprise instructions for deriving an encryption key from a data value in a message received from the other entity, in response to sending the other entity the result of the calculation, the data value in the response being obtained from the results of a pairing of said pairing calculation.

According to another aspect of the invention, there is also provided apparatus for authenticating itself to another entity by proving to the other entity that it is in possession of a secret without revealing the secret to the other entity, the apparatus comprising: means for receiving in the apparatus an input from a user, the secret being divided into at least a first factor and a second factor and the input relating to the second factor of the secret; means for reconstructing in the apparatus a secret from at least the first factor and the second factor; and means for carrying out a calculation in the apparatus using the reconstructed secret and sending the results of the calculation to the other entity, wherein the results provide an input to a pairing in the other entity.

The apparatus for authenticating itself to another entity may be a client device. The at least one memory may comprise a memory that forms part of the client's browser memory.

According to another aspect of the invention, there is also provided apparatus for authenticating another entity by determining that the entity must be in a possession of a secret without receiving the secret itself, the apparatus comprising: at least one memory having instructions stored thereon; and at least one processor programmed to execute the instructions to: receive in the apparatus a result of a calculation carried out in the other entity, the calculation using the secret reconstructed from at least a first factor of the secret and a second factor of the secret; and carry out a calculation in the apparatus to determine that the other entity is in possession of the secret, wherein the calculation comprises a first pairing that takes an input based on the result from the other entity and a second pairing based on a secret associated with the apparatus.

The apparatus may be a computing system. The computing system may be an authenticating server.

The secret associated with the other entity may correspond to a point on an algebraic curve and the non-transitory computer readable media may further comprise instructions for receiving, from the other entity, the identity of the other entity and the coordinates of a point U on the algebraic curve; generating a random value y, lower than q, and sending to the other entity; calculating $A=H_1(ID_\alpha)$, where $ID_\alpha$ is the identity associated with the first entity and $H_1$ is a hash function that hashes the identity to a point on the algebraic curve. Receiving a result of the calculation may comprise receiving the coordinates of a point V from the first entity, where $V=-(x+y)((s-\alpha)A+\alpha A)$, x another random value lower than q and the secret of the other entity is issued by a trusted authority and corresponds to a point sA wherein s is a master secret, the factor comprises the coordinates of a point $(s-\alpha)A$ on the algebraic curve and the second factor comprises a value $\alpha$. Moreover, carrying out said pairing calculation may comprises calculating a product of pairings comprising a first pairing e(V,Q) and a second pairing e(U+yA, sQ) to obtain g=e(V,Q).e(U+yA, sQ) where Q is a fixed point on the elliptic curve and sQ is another point on the elliptic curve corresponding to a secret of the apparatus and the first and second pairing is a mapping $\mathbb{G}_1 \times \mathbb{G}_2 \to \mathbb{G}_T$ where $\mathbb{G}_1$ and $\mathbb{G}_2$ are distinct groups and q is the order of the groups $\mathbb{G}_1$, $\mathbb{G}_2$ and $\mathbb{G}_T$. The instructions may also comprise instructions for refusing the connection if g≠1.

The instructions may further comprise instructions for obtaining a time period during which the other entity is entitled to complete the protocol and using the time period and the identity of the other entity to derive an input to the second pairing.

The at least one memory may further comprise instructions for transmitting a value derived from the results of a pairing of the pairing calculation, taking an input based on the result received from the other entity, to the other entity to allow the other entity to derive an encryption key and deriving a key in the apparatus from another pairing, taking an input corresponding to the secret of the apparatus.

The apparatus may comprises two components, each comprising a separate memory of the at least one memory, each having a separate processor, of the at least one processor, for executing the instructions stored on its respective memory, and each storing a part of the secret associated with the apparatus, wherein the instructions for carrying out the second pairing comprises instructions for carrying out a pairing in each component, taking as an input its respective part of the secret, and then carrying out a product of the two pairings. The two parts correspond to two different points on the curve that when added together form the full secret.

The instructions may further comprise, in response to determining that the other entity is not in possession of the secret associated with the other entity, determining the extent of any error in the second factor.

The instructions may further comprise, in response to determining that the other entity is not in possession of the secret associated with the other entity, inviting the other entity to attempt to authenticate again, and increasing the value of an error count by a variable amount for each authentication attempt, the amount varying depending on the extent of error in each authentication attempt.

The instructions may further comprise rejecting the connection to the other entity if the value of the error count exceeds a predetermined maximum error value.

The algebraic curve may be an elliptic curve having a BN curve parameter such that $(p^4-p^2+1)/q$ is a prime, where p is the prime modulus and q is the order of the groups $\mathbb{G}_1$, $\mathbb{G}_2$ and $\mathbb{G}_T$ of the mapping $\mathbb{G}_1 \times \mathbb{G}_2 \to \mathbb{G}_T$ on the curve.

According to another aspect of the invention, there is also provided an apparatus for authenticating another entity by determining that the other entity must be in a possession of a secret without the apparatus receiving the secret itself, the apparatus comprising: means for receiving in the apparatus a result of a calculation carried out in the other entity, the calculation using a secret reconstructed in the other entity from at least a first factor of the secret and a second factor of the secret; and carrying out a calculation in the apparatus to determine that the other entity is in possession of the secret, wherein the calculation comprises a pairing calculation that takes an input based on the result from the other entity.

The apparatus for authenticating the other entity may be a server.

According to another aspect of the invention, there is also provided a system comprising a client device as described above and a server as described above. The system may also include an independent entity providing a trusted authority. The trusted authority may issue a secret to the client and another secret to the server.

According to another aspect of the invention, there is also provided a computer-implemented method of carrying out multi-factor zero-knowledge proof authentication of a first entity to a second entity.

The method may use pairing-based cryptography to carry out the authentication.

The authentication may be followed by authenticated key agreement to allow subsequent secure exchange of data.

The first entity may be associated with a secret issued by a separate entity, corresponding to a point on an elliptic curve and divided into at least a first factor and at least a second factor in the first entity and wherein the method may further comprise the first entity reconstructing the full secret from at least the first factor, stored in the first entity, and at least the second factor received from a user, using the reconstructed full secret to carry out a calculation and sending a result of the calculation to the second entity. The second entity may use the results of the calculation to authenticate the first entity. The calculation in the first entity may be a non-pairing calculation and the calculation in the second entity may be a pairing calculation.

The second entity may store its own secret, also issued by the separate entity, the second entity secret also corresponding to a point on the elliptic curve and wherein the method may further comprise: carrying out product of pairings in the second entity comprising a first pairing that takes as one of its input the result received from the first entity and a second pairing that takes as one of its inputs the point on the curve corresponding to the second entity secret, and determining whether to authenticate the first entity based on the results of the product of pairings.

The product of pairings may be carried out as a multi-pairing. Alternatively, the second entity may first carry out the first and the second pairing and then multiply the results of the two pairings together.

According to yet another aspect of the invention, there is also provided a computer implemented method of carrying out authenticated key agreement comprising authenticating a client using the authentication method defined above and further comprising deriving a session encryption key from the results of a pairing calculated during the authentication process.

The method may further comprise the second entity transmitting a value derived from the results of the pairing to the first entity and the first entity deriving the key from the received value.

According to yet another aspect of the invention, there is provided a computer-implemented method of carrying out pairing based key agreement using a Barreto-Naehrig (BN) elliptic curve wherein the BN curve parameter is selected such that $(p^4-p^2+1)/q$ is a prime, where p is the prime modulus and q is the order of the groups $\mathbb{G}_1$, $\mathbb{G}_2$ and $\mathbb{G}_T$ of the mapping $\mathbb{G}_1 \times \mathbb{G}_2 \to \mathbb{G}_T$ on the elliptic curve.

Furthermore, according to yet another aspect of the invention, there is provided a computer program comprising instructions that when executed by at least one processor cause the one or more processors to carry out steps of a key agreement protocol in an entity to derive a key for securely communicating with another entity, the key agreement protocol using a Barreto-Naehrig (BN) elliptic curve wherein the BN curve parameter is selected such that $(p^4-p^2+1)/q$ is a prime, where p is the prime modulus and q is the order of the groups $\mathbb{G}_1$, $\mathbb{G}_2$ and $\mathbb{G}_T$ of the mapping $\mathbb{G}_1 \times \mathbb{G}_2 \to \mathbb{G}_T$ on the elliptic curve.

According to yet another aspect of the invention, there is also provided a non-transitory computer readable medium having a computer program, as defined above, stored thereon.

According to yet another aspect of the invention, there is also provided an apparatus comprising a non-transitory computer readable medium as defined above and at least one processor for executing the instructions on the non-transitory computer readable medium.

According to another aspect of the invention, there is provided a computer implemented method comprising: receiving in an apparatus data from a client, the data being provided as part of an authentication attempt to authenticate the client to the apparatus; determining in the apparatus that there is an error associated with the received data, determining an error value based on the extent of the error; and in response to determining that a value of a combined error value for a number of authentication attempts of the client does not exceed a predetermined maximum error value, inviting the client to attempt to authenticate again.

According to another aspect of the invention, there is also provided a computer implemented method comprising: receiving in an apparatus data from a client, the data being provided as part of an authentication attempt to authenticate the client to the apparatus, the client being associated with an actual secret that has been split into multiple factors and the data having been derived from multiple factors used in the client to attempt to reconstruct the actual secret; determining that one of the factors of the multiple factors used to derive the data is different to a corresponding factor of the multiple factors of the actual secret and determining the extent of said difference; determining an error value associated with the difference; and in response to determining that a value of a combined error value for a number of authentication attempts of the client does not exceed a predetermined maximum error value, inviting the client to attempt to authenticate again.

The multiple factors of the actual secret may be unknown to the apparatus. The factor may be a PIN and the error value may depend on how many digits of the PIN are wrong.

According to yet another aspect of the invention, there is also provided a computer program comprising instructions that when executed by at least one processor of an apparatus cause the at least one processor to: receive data received in the apparatus from a client, the data being provided as part of an authentication attempt to authenticate the client to the apparatus, the client being associated with an actual secret that has been split into multiple factors and the data having been derived from multiple factors used in the client to attempt to reconstruct the actual secret; determine that one of the factors of the multiple factors used to derive the data is different to a corresponding factor of the multiple factors of the actual secret; determine an error value associated with the difference between said one of the factors of the multiple factors and the corresponding factor; and in response to determining that a combined error value for a number of authentication attempts of the client does not exceed a predetermined maximum error value, inviting the client to attempt to authenticate again.

According to another aspect of the invention, there is also provided an apparatus comprises: at least one memory having instructions stored thereon; and at least one processor programmed to execute the instructions to perform the following operations: receiving data from a client as part of an authentication attempt to authenticate the client to the apparatus, the client being associated with a secret that has been split into multiple factors and the received data having been derived from multiple factors used in the client to attempt to reconstruct the actual secret; determining that one of the factors of the multiple factors used to derive the data is different to a corresponding factor of the multiple factors of the actual secret and determining the extent of the difference; determining an error value associated with the difference; and in response to determining that a combined error value for a number of authentication attempts of the client does not exceed a predetermined maximum error value, inviting the client to attempt to authenticate again.

According to another aspect of the invention, there is also provided a computer-implemented method of issuing a client and a server with secrets for carrying out encryption or authentication, wherein the client is issued with secret sA and the server is issued with secret sQ where A is a point, on an algebraic curve, associated with the client, Q is a fixed point on the algebraic curve, s is a master secret and sA and sQ represent points obtained by multiplication, on the algebraic curve, of the points A and point Q respectively, by the master secret s.

The method may be carried out by a trusted authority that controls a system comprising the client and the server. The fixed point Q may be the same point for all servers in a system controlled by the trusted authority. The master secret s may be associated with a particular server and may be different for different servers. The point A may be obtained by hashing data corresponding to an identity of the client.

The method may be a computer-implemented method.

According to another aspect of the invention, there is also provided a non-transitory computer readable medium comprising instructions that when executed by one or more processors cause the one or more processors to carry out the above defined method.

According to another aspect of the invention, there is also provided a trusted authority comprising said non-transitory computer readable medium and one or more processors for executing the instructions on the medium.

According to yet another aspect of the invention, there is provided a computer-implemented method in a first entity for communicating information to a second entity, without sending the actual information to the second entity, the information being associated with a secret divided into at least a first factor and a second factor, the method comprising: combining at least the first factor and a dummy second factor into a dummy secret, the dummy second factor being different to the second factor by a value corresponding to the information to be communicated to the second entity; and carrying out a calculation in the first entity using the reconstructed dummy secret and sending the results of the calculation to the second entity, wherein the results are used in a calculation in the second entity to determine the difference between the dummy second factor and the second factor.

The calculation may comprise a cryptographic pairing on an elliptic curve and the secret may be a point on the curve.

The information may form a part of a message, each part of the message being associated with a secret split into at least two factors and wherein the method further comprises combining at least a first factor and a dummy factor into a dummy secret for each part of the message and sending the results of calculations based on the dummy secrets to the second entity for the second entity to assemble the message.

The message may comprise credit card information.

According to another aspect of the invention, there is also provided a computer program comprising instructions that when executed by at least one processor cause the at least one processor to carry out the method of communicating information defined above. The computer program may be stored on a computer readable medium.

According to another aspect of the invention, there is also provided a computer-implemented method in for obtaining information from a first entity in a second entity, the information being associated with a secret divided into at least a first factor and a second factor, the method comprising: receiving in the second entity a result of a calculation carried out in the first entity, the calculation using a dummy secret, created, in the first entity, from at least a first factor of the secret and a dummy second factor, the dummy second factor being different to the second factor by a value corresponding to the information to be obtained in the second entity; and carrying out a calculation in the second entity to determine the difference between the dummy second factor and the second factor, wherein the calculation uses the result from the first entity.

The calculation may comprise a pairing based on the result from the first entity.

The method may further comprise receiving the result of multiple calculations from the first entity, each calculation having been based on dummy secret associated with a different part of a message and each dummy secret being derived from a dummy factor different to an actual factor and assembling the message in the second entity.

The calculation to determine the difference may comprise carrying out a calculation to obtain a value g and determining the value of δ from the value obtained for g and using the relationship $g=e(U+yA, Q)^\delta$, where U, yA and Q are points on an elliptic curve.

The calculation to determine the difference may comprise carrying out a calculation to obtain a value g and determining the value of δ from the value obtained for g and using the relationship $g=e(R+yA, Q)^\delta$ where R, yA and Q are points on an elliptic curve.

The message may comprise information for carrying out a financial transaction. The message may comprise a credit card number or a debit card number.

According to another aspect of the invention, there is also provided a computer program comprising instructions that when executed by one or more processor cause the processor to carry out the method of obtaining information defined above. The computer program may be stored on a computer readable medium.

According to another aspect of the invention, there is also provided a computer implemented method for generating a secret for each part of the message and extracting a factor, corresponding to a part of the message, from each factor to create a plurality of multi-factor secrets.

Additionally, according to another aspect of the invention there is provided a non-transitory computer readable medium having instructions stored thereon that when executed by a processor cause the processor to carry out the above defined method.

According to another aspect of the invention, there may also be provided a trusted authority that comprises said computer readable medium and one or more processors for carrying out the instructions.

According to another aspect of the invention, there is also provided a computer implemented method of authenticating a first entity to a second entity, wherein the first entity is associated with a secret split into multiple factors and the method comprises carrying out a calculation, using bilinear mappings, based on data derived from the secret reconstructed from the multiple factors and determining whether the first entity must have been in possession of the secret based on the calculation.

The method may further comprise reconstructing the secret in the first entity from the multiple factors of the secret; and using the reconstructed secret to derive an input to a bilinear mapping, wherein carrying out the calculation comprises computing a first bilinear mapping taking said input as a first input and a second input based on data associated with the second entity and computing a second bilinear mapping taking a first input based on data associated with the first entity and a second input data derived from a secret associated with the second entity, the first entity secret having been constructed from said data associated with the first entity and the second entity secret having been constructed from the data associated with the second entity such that, using bilinearity, the results of the mappings, or values derived from the results of the mappings, can be used to determine by the second entity whether the first entity is in possession of its secret.

The method may comprise calculating the first bilinear mapping either in the first entity or the second entity.

The calculation may comprise carrying out a multi-pairing realising two pairings corresponding to the first and second bilinear mapping and determining whether the first entity must have been in possession of the secret may comprise determining whether the result of the multi-pairing is equal to a predetermined value.

Alternatively, the calculation may comprise hashing the results of the bilinear mappings and determining whether the first entity must have been in possession of the secret may comprise comparing the results or a hash of the results.

According to yet another aspect of the invention, there is also provided an apparatus comprising at least one memory having instructions stored thereon; and at least one processor programmed to execute the instructions to authenticate a client, the client being associated with a secret having been divided into multiple factors and the instructions, when executed, cause the at least one processor to carry out a calculation, using bilinear mappings, based on data derived from the secret reconstructed from the multiple factors and determine whether the first entity must have been in possession of the secret based on the calculation.

According to yet another aspect of the invention, there is also provided a non-transitory computer readable medium having instructions stored thereon that when executed by at least one processor of an apparatus cause the at least one processor of the apparatus to carry out an authentication process for authenticating a client, the client being associated with a secret having been divided into multiple factors and the instructions, when executed, cause the one or more processors to carry out a calculation, using bilinear mappings, based on data derived from the secret reconstructed from the multiple factors and to determine whether the first entity must have been in possession of the secret based on the calculation.

BRIEF DESCRIPTION OF THE DRAWINGS

Embodiments of the invention will now be described, by way of example, with reference to the accompanying drawings, in which:

FIGS. 14, 15 and 16 are flow diagrams illustrating set-up processes in the entities of the system.

DETAILED DESCRIPTION

Figure 1:
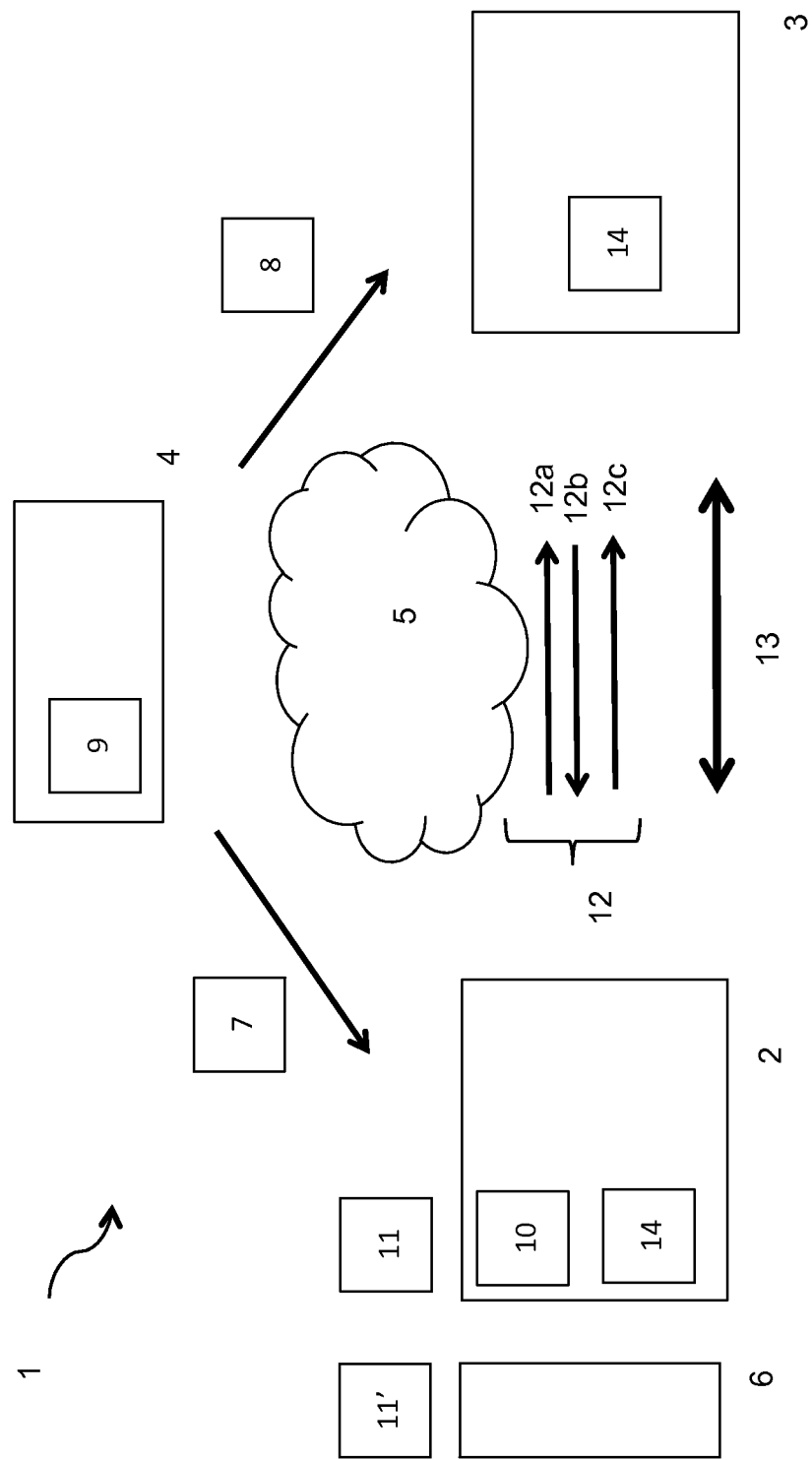
FIG. 1 is a schematic block diagram illustrating an example of a system comprising a client, an authentication server and a trusted authority.

With reference to FIG. 1, a system 1 is shown comprising a client 2, an authentication server 3 and a trusted authority (TA) 4. The client, the authentication server and the TA may communicate over a communication medium such as a data network 5. The client 2 is operated by a user 6.

The client 2 wishes to authenticate itself to the server 3 to, for example, access data or another resource, carry out a transaction or transmit data to the server. The client may wish to gain access to another server (not shown in FIG. 1). The client and server may also want to exchange data in a secure manner, following the authentication, and they may therefore want to establish an encryption key for exchanging the data. The key may be used by the client to encrypt the message and by the server to decrypt the message or vice versa.

The TA 4 issues a secret 7 to the client and another secret 8 to the server. The secrets are derived from a master secret 9 stored by the TA 4. Some implementations allow the client 2 to prove to the server 3 that the client is in possession of its secret 7 without revealing the secret itself, or anything about the secret, to the server. Some examples of protocols described herein also require the server 3 to be in possession of a server secret 8 in order to determine that the client does in fact have its own secret 7. The decision to issue a secret 7 to the client 2 may be carried out upon a request from the server 3 to the trusted authority 4 to issue a secret to a client that attempts to connect to the server. The server may have previously enrolled in the system and received its own secret 8 from the trusted authority 4. Once the secret has been issued to the client, the client can then authenticate itself to the server and the server and the client can establish a communication link. The server 3 may provide an identity of the client 2 to the TA to allow the TA to derive the client secret 7 and send it to the client over a secure connection. In other examples, the client may itself send its identity to the TA and request the TA to issue it with a client secret to be used by the client to authenticate to the server 3. The identity of the client may include any data string that identifies the user and/or the client. The identity may include, but is not limited to, a name, an email address, a social security number, a tide or a license number.

The client processes the received secret 7 into a plurality of factors 10 and 11. In FIG. 1, the secret is shown to be split into a first factor 10 and a second factor 11. However, the secret can be split into any number of factors. During set-up, the client receives one of the factors 11 from the user 6, extracts that factor from the client secret 7 and stores what remains, the first factor 10, in the client. If the client secret is split into more than two factors, the client may extract more than one factor from the secret. For example, the client may receive two or more factors from a user or from more than one user and may extract all the factors from the secret.

In the system of FIG. 1, the first factor 10 of the secret is a token. The token may be a software token. The software token may be a string of data. It may be stored, for example, as a "cookie". The second factor 11 can be any string of data. It may, for example, be a personal identification number (PIN), a password or a soft biometric. Hereinafter, we will refer to the second factor 11 as a PIN but it will be realised that it could also be another type of data. The client may only store the token 10. The PIN 11 may be memorised by the user.

When the user 6 later wants to authenticate to the server 3 to, for example, access data in the server or another entity or send data to the server, it enters a PIN guess 11' which the client 2 can use together with the stored token to recover a secret. If the PIN guess 11' matches the actual PIN 11, the client will recover the actual secret 7. If the secret is split into more than two factors, the client may receive more than one factor that it uses with the stored token to recover the secret.

The client and the server proceed to exchange a plurality of messages 12. The messages may comprise a commitment 12a, a challenge 12b and a response 12c. Each of the commitment, the challenge and the response may comprise more than one message. The messages 12 may also include additional messages. Based on the message, the server can then authenticate the client, as will be described in more detail below. Having authenticated the client to the server, the client and the server may proceed to exchange a plurality of other messages 13, as will also be described in more detail. The client and the server may proceed to establish a key 14 to encrypt some of the data in the messages. The key may be derived from the information exchanged in the authentication messages 12, the respective secrets of the client 2 and the server 3 and other parameters created in the process and only known to the respective parties, as will also be described in more detail below. Since the server's secret is also required to calculate the key, an imposter server cannot pretend that it is the real server and complete the protocol to authenticate the client and establish the session key. Alternatively, the keys may be established, for example, using SSL, in the other messages 13.

Although FIG. 1 only shows one client and one authentication server, it will be realised that the system can support a plurality of authentication servers and clients and each authentication server can establish secure communication links with a plurality of clients.

Each of the client, the server and the trusted authority will now be described in more detail with respect to FIGS. 2, 3 and 4.

The client, the server and the TA may be implemented as software or a combination of software and hardware. In the description below, the client, the server and the TA will be described to also comprise the computing devices on which the software runs. However, in some implementations, the client, the server and the TA will be provided as computer programs with instructions that when run by one or more processors provide the functionality of the client, the server and the TA respectively. The cryptographic functions may, for example, be provided by plug-in software modules.

Figure 2:
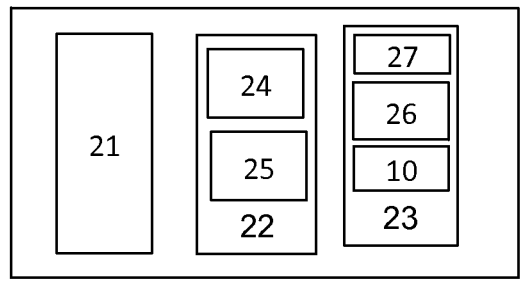
FIG. 2 is a schematic block diagram of a client in the system of FIG. 1.

With reference to FIG. 2, the client 2 comprises a computer, a server or other computing device. It may for example be a personal computer, laptop or a mobile telephone or other personal portable device or mobile device. The computing device comprises a processor 21, a memory 22 for storing computer program instructions and storage 23 for storing data. The memory 22 may store an initialisation program 24 for allowing the client to create a PIN 11 and store the token 10 and an authentication program 25 for allowing the client to authenticate itself to the server using the PIN 11 and the token 10. The client may have received, over a secure communication link, the initialisation program 24 from the TA 4 and the authentication program 25 from the authentication server 3. Alternatively, the client receives both programs from the TA, the authentication server or another entity. In some implementations, the initialisation program and the authentication program form part of the same computer program. The initialisation program may store instructions for enrolling in the system. The instructions may include instructions for providing a graphical user interface for the user 6 to enter a PIN, instructions for receiving the PIN from an input device, used by the user to enter the PIN, and instructions for extracting the PIN from the secret 7 to create the multiple factors of the secret. The input device may for example be a keypad or a keyboard, which forms part of or is connectable to, the client. The authentication program 25 may comprise instructions for reconstructing the client secret from multiple factors, e.g. the PIN and the token, and engage in the authentication protocol with the server. The instructions may also enable the client to engage in an authenticated key agreement process with the authentication server. In some examples, the initialisation program 24 may be served through a web interface to the client 2 by the trusted authority 4. Similarly, in some examples, the authentication program 25 may be served through a web interface to the client 2 from the authentication server 3. The client may receive the programs through the web interface and store them in the memory 22. In some implementations, when the programs are served through a web interface, the programs, or a part of the programs, may not be stored in the memory 22.

The memory may also store additional instructions for communication with the server and other devices. For example the instructions may provide a browser. The browser may be a web browser for the user to access the World Wide Web but it can also be a browser for accessing resources in a private network. The initialisation program 24 and the authentication program 25 may form part of or be served through, the browser. The client may for example download and store the programs in the client's browser memory. In some examples, the client 2 may be provided by the browser.

The processor 21 is configured to execute the instructions. The processor will have its own internal temporary memory, for example a cache memory, in order to store and quickly access some data during execution of the instructions in the memory 22.

The storage 23 may store the token 10. The storage may be provided by the storage of a browser. Alternatively, the storage may comprise a separate universal serial bus (USB) flash drive for storing the token. The storage may also store the client's identity 26. For example, the client's identity may be stored as metadata with the token 10. In other examples, the identity is not stored in the storage of the client but entered by the user each time it is needed. In some examples, where time permits are used, the storage may also store a time permit 27. Time permits will be described in more detail below. The storage need not be protected. Without the PIN 11, which is not stored, the client secret cannot be recovered. Consequently, even if an external entity gets hold of the token and the client identity, it will not be able to recover the full secret 7.

The initialisation program 24 and the authentication program 25 may be provided by a JavaScript program. The JavaScript program may comprise one or more separate program modules and the initialisation program and the authentication program may be provided by separate modules. The JavaScript program may also be used to receive the PIN from the user. The JavaScript program may store the token in the browser's storage or alternative unprotected storage. The client may be provided by this JavaScript program. The program may be configured to run on a general purpose user device. The JavaScript program may be served through a web interface from the authentication server 3 and/or the TA 4 to the device. In some implementations, the program could for example be received or downloaded from the authentication server 3 and/or the TA 4 and installed on the general purpose user device.

As mentioned with respect to FIG. 1, the client may be operated by a user 6. The user 6 would typically be a human being. However, the user 6 may instead be a machine, such as a computer. When the user is a machine, the PIN may be machine generated. When authentication to the server 3 is required, the machine then provides the PIN to the client 2 in order to allow the client to reconstruct the secret 7.

Figure 3:
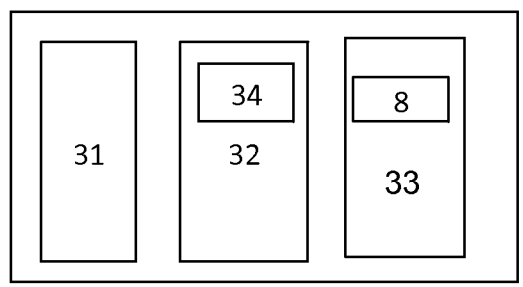
FIG. 3 is a schematic block diagram of an authentication server in the system of FIG. 2.

With reference to FIG. 3, the authentication server 3 comprises a computer, a server or other computing device. The computing device comprises a processor 31, a memory 32 for storing computer program instructions and storage 33 for storing data. The memory 32 comprises a server authentication program 34 with instructions in the form of computer code for running the server side of the enrolment and authentication processes. The authentication program comprises instructions for enrolling with the TA to obtain its own secret. The program also comprises instructions for authenticating the client. In some implementations, the program may comprise computer instructions for deriving the session key. The program may further comprise instructions for sending the client the client authentication program 25 comprising instructions for the client to carry out its side of the authentication protocol. On receipt, a general purpose user device can use the program to participate in the system and authenticate itself to the server using the secret received from the TA. The client may store and execute the program and the program may configure the client to carry out the authenticate process with respect to the server using the secret received from the TA. Moreover, the authentication program 34 may comprise instructions for carrying out an error handling process if the client receives an incorrect PIN from the user and therefore fails an attempt to authenticate to the server. The authentication program 34 may comprise a module for registering with the TA 4 and a separate module for communicating with the client 2. When the authentication program 34 also includes instructions for carrying out the error handling processor, the authentication program may comprise a separate error handling module. The server 3 may have obtained the authentication program 34 from the TA 4.

The processor 31 is configured to execute the instructions in the memory. The processor may also comprise its own internal temporary memory, such as cache memory, for temporary storing data during execution of the instructions in the memory 32.

The storage 33 may comprise of secure storage for storing the server secret 8. The storage may also comprise a client authentication program a copy of which it sends to each new client that wants to authenticate to a server.

As mentioned above, in some implementations, the authentication server is implemented as software only and comprises only the program instructions to be executed by the processor. In other implementations, the server may be a dedicated hardware device.

Figure 4:
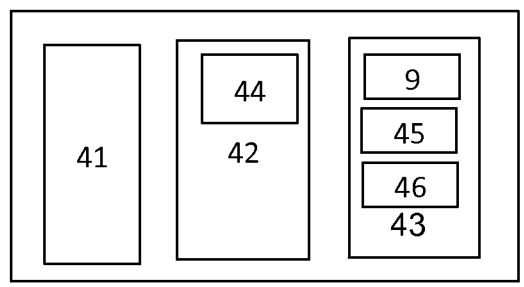
FIG. 4 is a schematic block diagram of a trusted authority in the system of FIG. 1.

With reference to FIG. 4, the TA 4 may comprise a computer, a server or other computing device. The TA is a separate entity to the client and the server and acts as a controller of the system. The computing device comprises a processor 41, a memory 42 for storing computer program instructions and a storage 43 for storing data. The memory may store an initialisation program 44 that generates the master secret 9 and enrolls participants in the system. It may also allocate identifiers to the entities of the system. The program may also comprise instructions for sending the initialisation program 24 to the client to allow the client to generate the token and the PIN. For example, as mentioned above the TA may provide the initialisation program 24 through a web interface to the client. The initialisation program may also include instructions for issuing time permits as will be described in more detail below.

The processor 41 is configured to execute the instructions in memory. The processor also comprises its own internal temporary memory, such as cache memory, for temporary storing data during execution of the instructions in memory 42.

The storage 43 may comprise secure storage that stores the master secret 9. The secure storage may be tamper proof or tamper resistant. The secure storage may also comprise a list 45 of the clients and servers enrolled in the system. The list of clients and servers 45 may also store time permits for the clients, as will be described in more detail below. Additionally, the storage of the trusted authority may store parameters 46 to be used in the protocols, including parameters defining an algebraic curve and hash functions to be used in the protocol, as will be described in more detail below. The TA may send this information to the clients and the servers or publish it for the clients and the servers to obtain when needed. The information may be included in the initialisation program provided to the client 2.

As mentioned above, in some examples the TA only comprises the program instructions to be executed by the processor. In other examples, the TA may be a dedicated hardware device.

As described with respect to FIG. 1, the client, the server and the TA may be connected by a communication medium 5, such as a data network. For example, the entities may be connected by the Internet. However, the client, the server and the TA may additionally or alternatively communicate using other communication media. It will be realised that the processors, memories and storage of the client, the server and the TA may each comprise one or more processors, memories and storage modules.

The system may use bilinear mappings to allow the client 2 to authenticate itself to the authentication server 3. The system may use the bilinear mappings to allow the client to authenticate itself to the server without sending its secret information to the authentication server. This is known as zero knowledge proof authentication. A zero knowledge proof cryptography scheme is a scheme in which one party (the prover) proves to the other party (the verifier) that is has a secret value, without revealing anything about the secret. Consequently, no matter how many times the client authenticates to the server, the server will not be able to determine the secret.

The bilinear mappings may comprise pairings. Pairings work on a special pairing-friendly elliptic curve. An asymmetric pairing map may be used. The bilinearity characteristic of pairings may be used to realise the examples of zero knowledge proof cryptography schemes described herein.

Pairings on elliptic curves are known by the skilled person and will not be described in detail herein. Briefly, an asymmetric pairing takes as input two points on the curve, belonging to distinct first and second groups, and maps the points to an element in a third group. Because of the bilinear property of pairings, a client secret sA and data associated with the server can be mapped to the same element in the third group as data associated with the client and a server secret sQ, when the client secret and the server secret are constructed from the data associated with the client and the data associated with the server, respectively, in a specific way.

$$e(sA,Q)=e(A,sQ)=e(A,Q)^s$$

The client secret 7 may be constructed in the TA by hashing public data associated with the client, in the form of the client identity 26, to a point A on the curve belonging to first group and then multiplying, on the curve, the point with a master secret s. The server secret 8 is constructed in the TA by multiplying, on the curve, a fixed point Q, in the second group, with the master secret s. Consequently, by calculating a pairing based on its own secret data in the server, and analysing the result of the pairing based on the client secret or a value derived from that pairing, the server can determine whether the client was in possession of the client secret 7 without receiving the client secret 7 itself.

The skilled person will appreciate that there exists a large number of suitable elliptic curves that can be used to carry out the pairings. Moreover, although the pairings are described to be carried out on elliptic curves herein, it will be realised that other suitable curves may be used.

Elliptic curve algebra defines particular rules for carrying out additions and multiplications of points on the curves. These are known in the art and will not be described herein. Briefly, the rules define an operation called addition that involves adding two points A and B together to obtain another point C. Geometrically this may involve, for example for points with different x coordinates, drawing a straight line between the points A and B and finding the point C where the straight line intersects the curve. However the rules will also define how the new point can be obtained algebraically. The operation called multiplication is defined by repeated additions of the same point A a number of k times to obtain kA. The operation called subtraction involves obtaining the negative of the point B to be subtracted from another point A and then carrying out an addition of the points A and −B. The negative of B is the point with the same x coordinate but with the negative of the y coordinate, −B.

A number of different types of pairings can be used to realise the cryptographic protocols described herein, as will be appreciated by the skilled person. For example, the Weil pairing, the Tate pairing, the ate pairing and the R-ate pairing are examples of suitable pairings that may be used.

The protocols may further be constructed such that the client 2 is not required to calculate a pairing and the heavy processing is instead carried out in the authentication server 3. The client carries out a calculation, using its secret 7, and sends the results to the server. The server, using its own secret 8 and by computing a pairing calculation, checks whether the client would have been able to obtain the results received without being in possession of the client secret. If the server determines that the client would not have been able to obtain the results of the calculation without being in possession of the secret, the server authenticates the client. The calculation carried out in the server may include a pairing using the results received from the client and a pairing based on its own secret information and a product of the two pairings. The calculation may be carried out as a multi-pairing calculation. In some examples, if the product equals a certain value, the server can determine that the client is in fact in possession of the key. In some examples, if the server determines that the client is not in possession of the secret it may be able to determine the extent of the error in the PIN received by the client. Its response to the client may depend on the extent of the error in the PIN.

Once the client has been authenticated, the client and the server may then proceed to compute session keys. The client and the server may proceed to establish the same symmetric session key based on the information already exchanged and additional information. Alternatively, the client and the server may establish session keys using the Transport Layer Security/Secure Socket Layer (TLS/SSL) protocol. In some examples, the keys used would be different each session and the client and the server would need to establish a new session key each session, providing Perfect Forward Secrecy (PFS).

Figure 5:
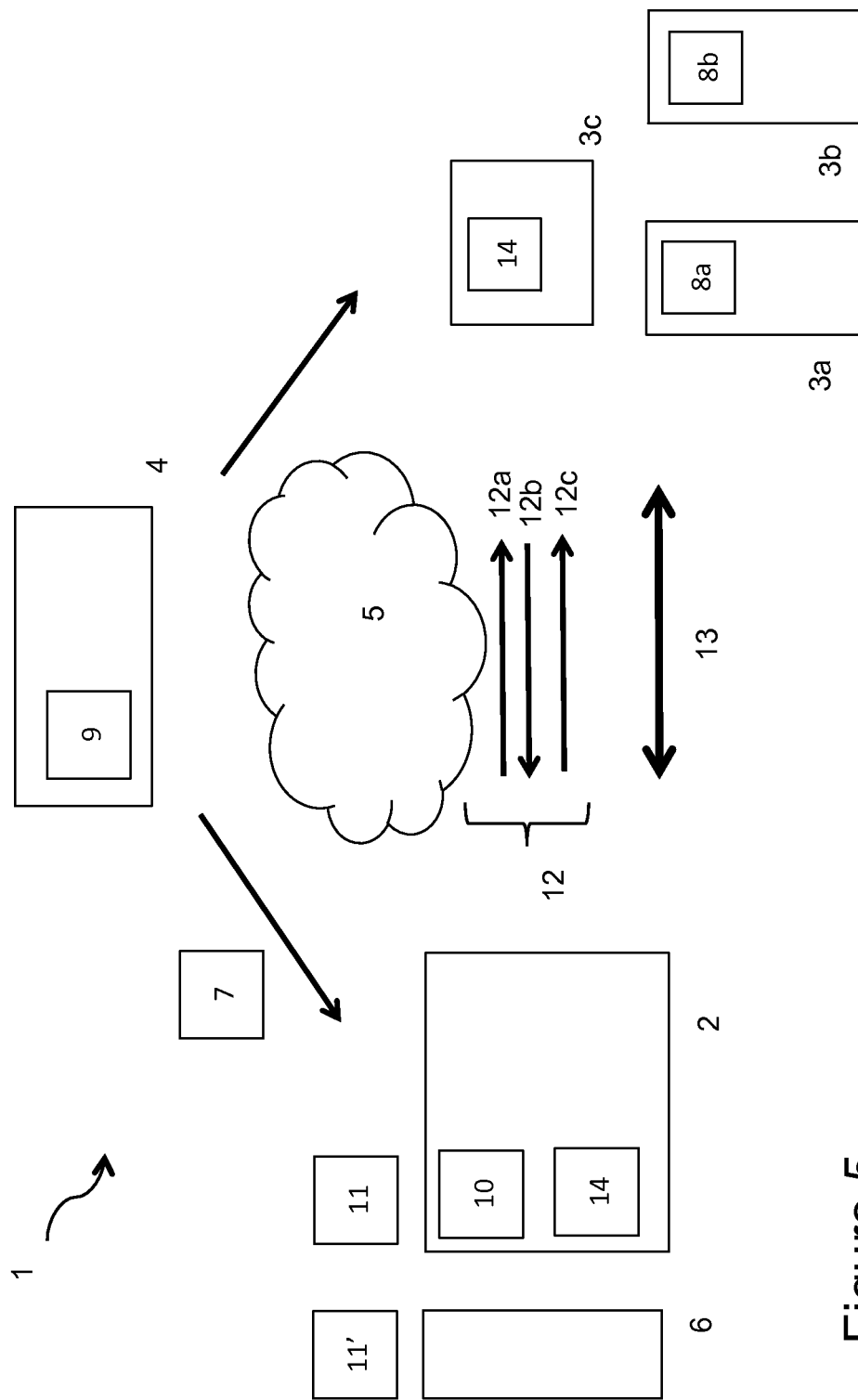
FIG. 5 is a schematic block diagram of an example of an alternative system.

With reference to FIG. 5, an example of another system is shown. In FIG. 1 and FIG. 5, like reference numerals designate like components. In FIG. 5, the authentication server 3 is replaced by two servers 3a and 3b and a proxy 3c. As mentioned above, the processor 31, the memory 32 and the storage 33 of the authentication server 3 of FIG. 3 may comprise more than one processor, memory and storage respectively and the authentication server 3 may be implemented as a distributed server with a number of server modules that each have their own processor, memory and storage. In the system of FIG. 5, each of the two servers 3a, 3b and the proxy 3c may have their own processor, memory and storage. Each of the servers 3a and 3b are issued with and stores a part 8a, 8b of the server secret 8. The proxy 3c, which may itself be a separate server, communicates with the client 2 and passes on the relevant information to each server 3a, 3b. Each server carries out its own calculation and the proxy 3c combines the results of the calculations in order to authenticate the client 2. The calculations are carried out in such a way that neither the proxy nor the servers can obtain the full server secret 8. Consequently, an attack on the proxy or either server will not allow a hacker to obtain the server secret and pose as a server to a client. The proxy 3c may also establish the session key 14 from results received from the servers 3a, 3b. In some systems, a separate proxy may not exist but one of the servers will instead carry out the function of the proxy and communicate the relevant information to the other servers. This distributed server arrangement will be described in more detail below.

In some systems, the TA may also be split into two components, each of which stores a part of the master secret, to make it more difficult for a hacker to steal the master secret.

Some of the examples of protocols described below will be referred to as "M-pin". Only "M-Pin" refers to a protocol for carrying out authentication. "M-Pin Full" refers to an extended protocol for also carrying out key agreement.

We will describe various protocols and implementations in a staged approach below. We will describe various known protocols and schemes and suggested modifications or variations to those protocols and schemes. We will then describe an M-Pin protocol and then a number of protocols which build on the M-Pin protocol. We will also describe alternative protocols. Moreover, we will describe examples of implementations and variations of the protocols and examples of how the protocols can be used.

Review of Existing Proposals

In 2003 a scheme was proposed by Kim et al. [A13], which promised an "ID-based password Authentication Scheme using Smart Cards and Fingerprints". Scott [A20] showed how it could be comprehensively broken by an attacker who passively eavesdropped a single transaction. For clarity, details of references [A13] and [A20], together with details of other references referred to herein are listed at the end of the description.

A much more recent 2012 paper by Martinez-Pelaez and Rico-Novella [A15] successfully cryptanalyses a scheme due to Sood, Sarje and Singh, described in their paper "An Improvement of Liao at al's Authentication Scheme using Smart Cards" [A23]. This scheme is essentially a two-factor authentication proposal. From the abstract of [A15] " . . . we show that Sood at al's scheme is still vulnerable to malicious user attacks, man-in-the-middle attack, stolen smart-card attack, off-line ID guessing attack, impersonation attack and server spoofing attack . . . ". Chasing down through lists of cited papers on two-factor identification, one finds a wasteland of similarly broken protocols. Many other schemes have fallen into the break-fix-break-fix cycle which generates a lot of literature, but rather less confidence. The cryptographic establishment seems to have largely abandoned this area of research as a kind of wild-west of cryptography, where no-one survives very long.

This problem was recognised by Hao and Clarke [A12] who explain it by stating that "The past thirty years of research in the area of authenticated key exchange has proved that it is incredibly difficult to get even a single factor based key exchange (KE) scheme right. Designing a multi-factor authenticated key exchange (AKE) protocol can only be harder." However the reaction of the casual reader might be this: How come at this stage in the development of cryptographic protocols there appears to be no satisfactory and widely accepted solution to the problem of easy-to-use and secure two-factor authentication?

Password Authenticated Key Exchange (PAKE) is a well researched area, and many proven methods for PAKE have been proposed [A30]. However most require the maintenance of a "password file", or "password verifier file", which is exactly what an attacker looks for in a hacked server, and which allows them to completely unlock the server's security. Most commonly this file consists of tuples of ( Username, Salt, H(Salt|Password)) where Salt is a random number, H(.) is a one way hash function and indicates concatenation. As is well appreciated, unless the password is chosen to have high entropy, the attacker will succeed with an off-line dictionary attack in finding the password by searching through a dictionary at computer speeds. Only passwords that are outside of the dictionary will survive this attack. This leads to the tautology that a high entropy password must be agreed with the server in advance. Recall that the whole purpose of a PAKE is to mutually authenticate and agree a high entropy cryptographic key.

One alternative is to issue each client with a smart card, and to store password related information here rather than on the server. This has the added benefit of adding a second factor to the authentication process—the smart card itself. However for this to work it seems that the smart card component must maintain full smart card functionality. If its security is broken then the system fails. See Yang et al. [A31] for a successful implementation of this approach. However smart cards are expensive. Also such schemes invariably require the server to maintain a long term secret s. And again if the server is hacked s might be revealed, unlocking the security of the entire system.

Multi-Factor Authentication

Multi-factor authentication commonly consists of (a) something we have, (b) something we know, and (c) something we are. The form in which it is most familiar to us would be as the two-factor ATM bank card and a 4 digit PIN number. Here most of our discussion will be in the context of two-factor authentication, but with some consideration for support for the third factor.

The "something we have" factor can be a physical token storing static data, perhaps in the form factor of data recorded on a magnetic strip, or in a QR code, or the familiar USB stick. Or it can be a smart-card. Note that a smartcard will have extra functionality in that it can have its own protected secrets and computing ability, and cannot be cloned. However a smart card is much more expensive, and losing it requires expensive replacement.

The "something we know" factor is a password. However passwords come in two distinct flavours. The high-entropy password that is now more commonly demanded of us, for example the password which must have eight or more characters and involve both upper and lower case letters, and at least one numeral. Then there is the low entropy password, for example the 4-digit PIN. In the sequel we will use the word password exclusively for high entropy passwords, and the word PIN for the low entropy password. An alternative way to distinguish them is to observe that the latter is easily found by an off-line dictionary attack, whereas the former, hopefully, is not. An off-line dictionary attack is where an attacker can (at computer speeds) run through a dictionary of possible passwords/PINs and easily detect when they have found the right one.

The "something we are" factor is captured as a biometric, perhaps a fingerprint or an iris scan. However they are commonly inexact, and a certain range of values for a biometric measurement might be regarded as acceptable.

Biometrics can be "hard" or "soft". A soft biometric returns a classification which can be used to limit the individual to membership of a small group. A hard biometric works in conjunction with a stored template to make an exact identification. This is analogous to the comparison between a PIN and a password—clearly many people safely share the same PIN, but ideally every password should be unique. Hard biometrics tend to be expensive, whereas soft biometric fingerprint scanners for example can be quite cheap. The template for a hard biometric makes a valuable target for attack and must be securely stored somewhere.

Many schemes propose a smart-card as a token. However they often also consider the case where the security of the smart-card is breached and its secrets revealed, in which case it is no better than a passive token [A29], [A26]. We restrict ourselves, for some applications, to the simplest, easiest and cheapest scenario (and hence the most practical).

We will assume
1. a static clonable token,
2. a low entropy 4-digit PIN number
3. (Optionally) a soft biometric.

However, it will be realised that the embodiments of the invention are not limited to two or three factor authentication but can use secrets split into multiple factors, including two factors, three factors and more than three factors. Note that since our token may be static, we are in a position to provide a software only solution. For the client some of our proposed schemes are in fact closely analagous to the tried and trusted ATM card (with static data recorded on a magnetic strip), and associated PIN number. But one that works over the much more hostile domain that is the Internet.

Security Features

Many authors have composed helpful lists of desirable features of such protocols. Tsai et al. [A25] provide a list of 9 security requirements and 10 goals for such schemes. However their review of schemes available at their time of writing reveals that all are disappointing. Liao et al. [A14] came up with a list of 10 properties, which Yang et al. [31] reduced to 5. Recently Wang [A29] came up with a list of 8 attacks that such a scheme should resist, and identified 3 categories of potential attacker.

Motivated by this prior art, here we give our own list of conditions that a scheme could meet.

1. The protocol should result in the client and the server being mutually authenticated, and deriving a mutual cryptographic key.
2. No PIN related data is stored on the server. Nevertheless a server should be able to assist a client in recovering their forgotten PIN.
3. The underlying Authenticated Key Exchange is immune to "Key Compromise Impersonation". That is the server cannot impersonate a client, and a client cannot impersonate the server.
4. The client should be able to change their PIN locally without involving the server.
5. An attacker who gains possession of the authentication server's secrets should only be able to (a) set up a false server, and (b) given a client token determine their PIN. Note that this is basically the best that can be hoped for, for any such scheme.
6. The server should be able to identify the extent of any small error □ in the client's secret. This will facilitate the inclusion of an imprecise biometric measurement as a factor.
7. The scheme should support the property of "forward secrecy".
8. The scheme should be truly "multi-factor". If there are n factors involved the loss of n−1 factors should not be sufficient to permit the final factor to be found. Of course this must also be true for insider attacks: For example a client equipped with a valid token and PIN and who captures the token of another client, should be unable to determine their PIN number.
9. PIN guessing attacks can only be carried out on-line (and therefore can be monitored and prevented by the server).
10. The overall system should not have a single-point-of-failure.

It will now be described how a number of existing proposals and some adapted proposals fail to meet these properties. We will then describe a scheme that meets these properties and a number of protocols and systems that improve on this scheme or provide alternatives or modifications to this scheme. Our literature review would suggest that no such scheme existed before the scheme described herein. Not all protocols described herein will meet these properties. The embodiments of the invention are not limited to protocols that meet the 10 properties and some of the embodiments of the invention provide protocols, and modifications and variations of protocols, which do not meet the 10 properties. Some of the examples of protocols described herein may be used with other protocols or schemes to meet the 10 properties.

Note that condition 3 is clearly impossible to meet for any scheme that allows the server to manage client registration. When considering security, we can adopt in its entirety the adversarial model of [A31], which assumes an adversary who can completely control communications between the servers and its clients, and who may have possession of any number of tokens and associated PINs of users other than the individual under attack.

Review of Further Existing Proposals

Next we look a little closer at the proposals to date. Most are based in a setting where there are just two parties involved, the clients and the server. The former enter into some initial interaction with the server (a Registration phase) and are issued with some credentials. Invariably this requires the server to have in their possession some master secret which will be involved in the authentication process. Such schemes we would suggest are unlikely to improve on the current situation, as if (when) the server is hacked this secret may be discovered, and the security of the whole scheme will unravel.

A close inspection of many of the simpler proposals reveals at their heart the simple idea of using the one way hash of the clients identity concatenated to a server master-secret, as the basis for client authentication and the establishment of an authenticated secret key. So for client identity ID and server master secret s, the protocol would be built on the high entropy mutual secret H(ID|s), using as a hash function for example the standard Secure Hash Algorithm (SHA256). This secret would be stored by the client on their token (masked by a password), and generated on the fly by the server as needed. Such schemes often also include a Diffie-Hellman component to provide forward secrecy. Multiple combinations of these simple ideas have been proposed [A32], [A14], [A31], [A26] but most have not survived prolonged scrutiny. The ingenious idea of Yang et al. [A31] is to in effect use H(ID|s) as the password in a password authenticated key exchange (PAKE). But as already pointed out this requires smart-card functionality for a token, and a long term server secret s and as they state "the secrecy of s is of utmost important because the security of the entire system essentially relies on the security of s". But a hack of the server may reveal s which would be even more lethal than stealing a password file.

A striking feature of most proposals is that often little effort is made to provide a proof of security. Which certainly helps to explain why so many schemes are so quickly broken. However those proposals which do provide some kind of proof of security tend to do poorly when measured against our 10 desirable properties. And of course a proof of security is only as good as its assumptions. For example in 2010 Stebila et al. [A24] proposed a multi-factor password-authenticated key exchange. However it does not meet our condition 2, and so a successful hack of the server reveals all static non-high-entropy passwords. The proposal by Yang et al. [A31] does not meet condition 3. A recent proposal by Wang [A29] does not consider the possibility of an insider attack (our condition 8) and therefore not surprisingly falls to it. The scheme of Pointcheval and Zimmer [A16] does not satisfy our condition 2, and recently Hao and Clarke [A12] have discovered problems with it based on deficiencies of their formal model.

The lack of a satisfactory solution to date perhaps mirrors the situation with respect to Identity-Based Encryption (IBE). Although this concept was well known since first proposed by Shamir in 1984 [A22], using standard public key infrastructure (PKI) constructs no satisfactory scheme for IBE was ever found that didn't violate one important condition or another. It was only in 2001 through the use of the then novel construct of the cryptographic pairing that practical protocols became possible [A4]. So perhaps it is unsurprising that our proposed solution, in some implementations, exploits the properties of cryptographic pairings.

The possibility of a better solution based on pairings is hinted at by Yang et al. [A31] who identify the paper [A19] as describing "a protocol which can be extended to provide explicit mutual authentication and satisfy all the properties given in [A14]".

Our solution amounts, in some implementations, to the first software-only method for two factor authentication. Some implementations satisfy all 10 of the desirable properties that we have identified above and in their simplest form require only a software token and an easily memorised PIN number. However, as mentioned above, other implementations and protocols described below may not meet all 10 properties.

Exploiting Standard Methods of PKI

For some applications, we would ideally like a method not dissimilar to PKI, where both the clients and the server are enrolled in the scheme by a largely off-line and well protected third party trusted authority. By separating out the roles of the enrollment or registration from the role of the server the loss of server secrets, while clearly damaging, should hopefully not be as catastrophic.

Several proven methods have been reported for one-factor authenticated key exchange (AKE) using the methods of PIC. The basic idea is to issue users with a digital signature of their identity which they can then use in the key exchange.

Consider the provably secure Identity-Based Diffie-Hellman scheme of Fiore and Gennaro [A6]. Here a trusted authority choses a random group generator g, and a random master secret x and issues a public key $y=g^x$. Then it issues a Schnorr signature [A18] on a proffered identity as $(r_{ID}, s_{ID})$ by choosing a random k and calculating $r_m=g^k$ and $s_{ID}=k+xH(ID,r_{ID})$. The key exchange proceeds as in Table 1.

TABLE 1

| Identity-Based Diffie-Hellman - Fiore and Gennaro [A6] | |
|---|---|
| Alice - identity $ID_a$ | Bob - identity $ID_b$ |
| Generates random $a < q$ | Generates random $b < q$ |
| $u_A = g^a$ | $u_B = g^b$ |
| $ID_a, r_A, u_A \rightarrow$ | $\leftarrow ID_b, r_B, u_B$ |
| $k = (u_B r_B y^{H(ID_b, r_B)})^{a+sA}$ | $k = (u_A r_A y^{H(ID_a, r_A)})^{b+sB}$ |

Both participants end up with the same key $k=g^{ab}$. Now let us try to adapt this scheme to the client-server setting and to include a PIN number as a second factor. We immediately face two problems. First this protocol is intrinsically peer-to-peer rather than client-server. Therefore no matter how we go about embedding a PIN number such a scheme must fall to an insider off-line dictionary attack. Basically anyone who has possession of a token and PIN can set themselves up as a "server". Now if they steal another's token they can off-line perform key exchanges with their "server" until they find the PIN that works. Furthermore even non-insiders can break the system. Basically steal a token and try every possible PIN until the token value is revealed as a valid signature. The validity of signatures can be easily verified as the certification authority's public key is available to all.

As the authors themselves say "The user can verify the correctness of its secret key by using the public key y and checking the equation $g^{sID}=r_{ID} \cdot y^{H(ID,r_{ID})}$". Although implied as a feature of the scheme, for us it represents the problem: The existence of such an equation means that a PIN cannot safely be used in conjunction with the secret signature, because this equation would allow an off-line dictionary attack to recover it. In some of the schemes that we will suggest, no such equation exists. In some implementations, the only way to verify the correctness of the secret key should be to use it to complete a key agreement with a genuine server.

These problems with exploiting standard PKI methods for two-factor authentication are also pointed out by Wang [A29].

Pairings and PINs

With the advent of pairings new solutions became possible. A pairing works on a special pairing-friendly elliptic curve [A2], [A7], with three groups of the same prime order q, normally denoted $\mathbb{G}_1 \times \mathbb{G}_2 \rightarrow \mathbb{G}_T$. Here we assume the type-3 pairing [A9] where $\mathbb{G}_1$ and $\mathbb{G}_2$ are distinct, and where $C=e(A,B)$, $A \in \mathbb{G}_1$, $B \in \mathbb{G}_2$, and $C \in \mathbb{G}_T$. Note that elements from these groups cannot be mixed. This is very important for us as we intend to place clients in $\mathbb{G}_1$ and servers in $\mathbb{G}_2$.

The main significant property of pairings is that of bilinearity $$e(aA,bB)=e(bA,aB)=e(A,B)^{ab}$$

Assume the existence of an independent Trusted Authority (TA) with its own master secret that is not required on-line—it is only responsible for off-line enrollment/registration and issuing of client and server ID-based secrets. This provides an extra layer of security and limits the damage caused by the loss of client or server long-term secrets.

Assume $ID_\alpha$ and Assume $ID_s$ are Alice's identity and the server's identity respectively. $H_1(.)$ is a hash function that hashes to a point of order q in the group $\mathbb{G}_1$, $H_2(.)$ is a hash function that hashes to a point of order q in the group $\mathbb{G}_2$. Then both the client Alice and the server are issued with secrets sA and sS respectively, where $A=H_1(ID_\alpha)$, $S=H_2(ID_s)$ and s is the TA's master secret for use with a particular server. Of course knowing A and sA does not reveal s, as it is fully protected by a difficult discrete logarithm problem.

Consider now the simple SOK non-interactive key exchange algorithm [A17], by which Alice and the server can simultaneously mutually authenticate and derive a common key. Alice calculates it as k=e(sA,S), and the server calculates it as k=e(A,sS). By bilinearity both are clearly the same. But now Alice extracts a PIN α of her choosing from her secret, to divide it into the token part (s−α)A, and the PIN part αA. Clearly, when these are added together the full secret can be reconstituted. This idea (originally suggested in [A19]) forms a starting point for some examples of our proposed two-factor authentication schemes.

The external Diffie-Hellman (XDH) assumption was first informally implied in [A19], and is now widely used. The XDH assumption formally states that
1. The discrete logarithm problem (DLP), the computational Diffie-Hellman problem (CDH), and the computational co-Diffie-Hellman problem are all intractable in $\mathbb{G}_1$ and $\mathbb{G}_2$.
2. There exists an efficiently computable bilinear map (pairing) $\mathbb{G}_1 \times \mathbb{G}_2 \to \mathbb{G}_T$.
3. The decisional Diffie-Hellman problem (DDH) is intractable in $\mathbb{G}_1$.

The intuition is that despite the fact of an efficiently computable type-3 pairing, $\mathbb{G}_1$ acts as a "normal" Diffie-Hellman group. The DDH problem can be described thus: Given a generator G, aG, bG and cG determine if c=ab. Consider now an insider attacker Bob with identity $ID_b$ who is issued with sB where $B=H_1(ID_b)$ and who gains possession of (s−α)A. If the hash function has performed its job correctly A and B are independent generators of order q in the cyclic group $\mathbb{G}_1$, where B=wA for some unknown W. The only way to exploit his inside information is to keep trying a guess g and adding gA to (s−α)A until he can use his inside knowledge of sB to identify when (s−α)A+gA=sA. Observe that on a type-1 pairing where $\mathbb{G}_1=\mathbb{G}_2$ this is easy as he could use the fact that e(A,sB)=e((s−α)A+gA, B) when g=α. However on a type-3 pairing this is not possible according to the XDH assumption, as it implies the ability to solve the Decisional Diffie-Hellman (DDH) problem in $\mathbb{G}_1$.

Proof: Substitute A=wB and assume an Oracle which if given A, wA, xA and swA can determine if x=s. Then such an Oracle can be used to solve the DDH problem. Simply input G, aG, bG and cG and our Oracle will determine if b=c/a or c=ab.

So in practice Alice can extract a PIN α of her choosing from her secret, to divide it into the token part (s−α)A, and the PIN part αA. Clearly, when these are added together the full secret can be reconstituted. A captured token is compatible with any possible PIN, and therefore useless without it.

However, we must be very careful if we are to retain this property. PIN extraction cannot be used with many pairing-based protocols if it is desired to retain this property, for example, Boneh and Franklin's IBE scheme [A4], or the Chen and Kudla authenticated Key exchange [A5] (Protocol 1), or any scheme which requires as part of its public parameters a generator point P and $P_{pub}$=sP in $\mathbb{G}_2$ (or any scheme implemented on a type-1 pairing, for example the PSCAb scheme of [A29]). In such a case if Charlie were to capture Alice's token containing (s−α)A, Charlie could quickly find her PIN by testing all g until $$e((s-\alpha)A+gA,P)=e(A,sP)$$

This is another example of the off-line dictionary attack, and it is quite deadly.

If the server secret sS is ever leaked (that is revealing S and sS), or indeed any multiple of a known point by sin G2, then those values can be used to determine the PIN associated with a stolen token. It is of course only common sense that this should be possible. If the server secret is discovered, the discoverer can set up their own false server, and try every possible PIN against a stolen token, and thus discover the PIN.

Note that all clients who access any server validated by the same TA using the same s, are at risk if just one of those servers is compromised. For this reason each individual server should ideally be associated with a different master secret s.

Interestingly we can deliberately create a circumstance where the server can launch an off-line dictionary attack on the PIN, and exploit it as a useful feature. A server offers a simple PIN-recovery service to the client (and so fully satisfies our condition 2). The client A sends X=H(e((s−α)A+gA, S)) to the server S via a secure channel, which requires only the token and their incorrect guess of the PIN g. Then the client presumably goes to some lengths to prove their identity (mother's maiden name etc.). Once that is done to the server's satisfaction, the server goes off-line and calculates Y=H(e(A, sS−iS)) for all possible i until he gets a match X=Y. Then i=α−g. This difference between the guess g and the correct PIN α can then be sent back to the client by email, or some other method. Note that this does not reveal the PIN α to the server.

It may be observed that the Trusted Authority's master secret represents a single point of failure in the overall system. However, as mentioned above, this master secret can easily be secret-shared across a number of independent authorities [A4]. In the simplest case a pair of TAs might each independently generate secrets $s_1$ and $s_2$, and issue to a client $s_1A$ and $s_2A$ which can be added by the client to create $sA=s_1A\ s_2A$. Note that a Hardware Security Module (HSM)—as commonly used to protect PKI private keys—could be used for one or both of these calculations, to provide an extra level of security. Now the master secret s is not known to any single entity. In this way we can formally satisfy our condition 10.

A SOK-Based Protocol

It is important to observe that no Trusted Authority Public Key is required in this protocol. Combined with the idea of putting clients exclusively in $\mathbb{G}_1$ and servers exclusively in $\mathbb{G}_2$, we overcome both of the problems associated with the attempted PM-based solution of Table 1.

Consider an attacker who steals a token and attempts to log on to the server without knowing the PIN. They can derive the key from $e((s-\alpha)A,S)$, whereas the server will derive it correctly from $e(A, sS)$. If the server were then to send something encrypted with the correct key to the attacker, the attacker can find the PIN via an offline dictionary attack by trying to decrypt with every possible key derived from $e((s-\alpha)A+gA, S)$ until they find the value g which provides a valid decryption. To prevent this we force the client to first submit an authenticator derived from their calculated key. Only when the server is convinced that the client has derived the correct key (using the correct PIN) will the protocol be continued.

We are now ready to present our simple SOK based solution. Assuming the protocol succeeds, both sides proceed to use the key K. See Table 2.

TABLE 2

A Simple SOK-based Protocol

| Alice - identity $ID_a$ | Server - identity $ID_s$ |
|---|---|
| $ID_a \rightarrow$ | $\leftarrow ID_s$ |
| $S = H_2(ID_s), A = H_1(ID_a)$ | $A = H_1(ID_a), S = H_2(ID_s)$ |
| $k = e((s - \alpha)A + \alpha A, S)$ | $k = e(A, sS)$ |
| $K = H(k)$ | $K = H(k)$ |
| $M = H(ID_a|ID_s|K)$ | $N = H(ID_a|ID_s|K)$ |
| $M \rightarrow$ | if $M \neq N$, drop the connection |

Next we test this simple protocol against our 10 properties. As already indicated we have succeeded in fulfilling properties 2 and 10. We also satisfy properties 1 and 9. Clearly a client can change their PIN locally, by simply adding/subtracting a multiple of A to/from their token, so 4 is satisfied as well.

Condition 8 is more than satisfied—as pointed out by Boneh and Franklin [A4] the simple form of the client secret (as a multiple of their identity) means that it can be securely split up in a variety of ways, using a secret-sharing scheme. If the client's reconstituted secret is off by a small amount, a mutual key can still be calculated by the server, who can determine the extent of the error and compensate for it. For example if the client uses $sA+\Box A$ as their secret, the server can compensate by using $sS+\Box S$ as its secret. Furthermore the server can afford to spend some time searching for the right $\Box$. Therefore this scheme supports a key correction capability as required by our property 6 to support a possible biometric factor. The inventors have realised that the same behavior can be exploited in other ways. If the client were to enter the wrong PIN, the server can easily determine the extent of the error δ using this key correction capability. So for example if the client entered 1224 instead of 1234, then the server could figure out that the PIN was "out" by 10. This behaviour can also be exploited to intelligently respond to the wrong PIN being entered—if it is out by a lot, do not allow another attempt, if it is out by only one digit, then allow a further attempt, etc. A "coercion" convention could be agreed, for example if the PIN was just out by 1 in the last digit, the server might interpret this as a client entering a PIN while under physical threat, and respond appropriately.

That leaves us with properties 3, 5 and 7 still unsatisfied. Clearly the server can impersonate any client to log in, as they can derive the key for any client C as $e(C, sS)$, which violates 3 and 5. There are multiple other problems as well. The same pair of client and server will always derive the same key k, so we are open to replay attacks. An attacker who captures Alice's token and eavesdrops an encrypted conversation, can easily derive the associated PIN.

The challenge is to block these attacks and satisfy the remaining properties while not losing the properties we have achieved already. The main idea is to replace the SOK construction with another somewhat more elaborate construction.

Wang's Protocol.

A powerful property of any authenticated key exchange protocol is resistance to a Key Compromise Impersonation (KCI) attack [A3]. A Key Compromise Impersonation attack is where an attacker Charlie who captures Alice's credentials (token plus PIN) is in a position not only to log in to a server pretending to be Alice (which is only to be expected), but can also pretend to be the server to the real Alice. Our SOK based protocol is wide open to this kind of attack as while the server can calculate the key as $e(A, sS)$, Charlie who has stolen Alice's credentials can calculate the same value as $e(sA, S)$, without knowing sS. The problem is the ability to exploit bilinearity to move the component involving the master secret s from one side of the pairing to the other. The solution is to "overload" each side of the pairing with other necessary calculations and hence to block this possibility.

Observe that in the client-server setting (rather than the peer-to-peer setting in which key exchange is usually described) KCI can be broken down into server-to-client KCI, where the server can masquerade as a client, or client-to-server KCI where the client can masquerade as a server, or mutual KCI where both cases are possible. The point being that there could be a scenario where one or other is possible, but not both. Here we prefer to block both possibilities.

In [A28], Wang suggests an efficient Identity-Based Authenticated Key Agreement protocol. It is described in a peer-to-peer setting, but we will adapt it to a client-server protocol by implementing it on a type-3 pairing. The original protocol has a proof of security based on the decisional bilinear Diffie-Hellman (DBDH) assumption. It provides us with a drop-in replacement for the SOK protocol, while now providing support for our properties 3 and 5. Wang's protocol forms part of the P1363.3 proposed IEEE standard [A1].

We start with a much simplified version of Wang's protocol—Table 3. For both parties the agreed key $k=e(A, S)^{sxy}$. Wang's protocol is not vulnerable to a KCI attack. However the Trusted Authority who has eavesdropped on $P_a$ and $P_s$ can easily calculate the key as $e(P_a, P_s)^s$. This is as a direct result of the protocol not having the property (our number 7) of Perfect Forward Secrecy (PFS).

TABLE 3

Simplified Protocol based on [A28]

| Alice - identity $ID_a$ | Server - identity $ID_s$ |
|---|---|
| Generates random $x < q$ | Generates random $y < q$ |
| $ID_a \rightarrow$ | $\leftarrow ID_s$ |
| $S = H_2(ID_s), A = H_1(ID_a)$ | $A = H_1(ID_a), S = H_2(ID_s)$ |
| $P_a = xA$ | $P_s = yS$ |
| $P_a \rightarrow$ | $\leftarrow P_s$ |
| $k = e(x. ((s - \alpha)A + \alpha A), P_s)$ | $k = e(P_a, y.sS)$ |
| $K = H(k)$ | $K = H(k)$ |
| $M = H(ID_a|ID_s|P_a|P_s|K)$ | $N = H(ID_a|ID_s|P_a|P_s|K)$ |
| $M \rightarrow$ | if $M \neq N$, drop the connection |

To include the property of PFS, Wang suggests this modification, which includes an in-tandem Diffie-Hellman into the key exchange—Table 4. See also [A5].

TABLE 4

Simplified Protocol with Perfect Forward Secrecy

| Alice - identity $ID_a$ | Server - identity $ID_s$ |
|---|---|
| Generates random $x < q$ | Generates random $y, w < q$ |
| $ID_a \rightarrow$ | $\leftarrow ID_s$ |
| $S = H_2(ID_s), A = H_1(ID_a)$ | $A = H_1(ID_a), S = H_2(ID_s)$ |
| $P_a = xA$ | $P_s = yS, P_g = wA$ |
| $P_a \rightarrow$ | $\leftarrow P_s, P_g$ |
| $k = e(x. ((s - \alpha)A + \alpha A), P_s)$ | $k = e(P_a, y.sS)$ |
| $K = H(k|xP_g)$ | $K = H(k|wP_a)$ |
| $M = H(ID_a|ID_s|P_a|P_s|P_g|K)$ | $N = H(ID_a|ID_s|P_a|P_s|P_g|K)$ |
| $M \rightarrow$ | if $M \ne N$, drop the connection |

Both keys are the same $K=H(e(A,S)^{sxy}|xwA)$. In Wang's original paper [A28] it is suggested to use $w=y$. However this re-enables the Key Compromise Impersonation attack, based on the observation that $e(xsZ, yS)=e(xyZ, sS)$, so if sS is captured, Charlie can log in to S with any identity Z.

A Two-Factor Client-Server Protocol

As we have described it above Wang's protocol has a problem. The identities of A (and S) are not directly included in the key calculation. So Bob can claim the identity Alice, but still log on using his own credentials. This is not satisfactory in some applications. Wang uses a rather complex method to fix this, as we will see. Assume $H_q$ (.) is a hash function that hashes to a number in the range 1 to q (although according to Wang its OK to reduce this range to a size half the number of bits in q, with some performance gains). The new scheme is given in Table 5.

TABLE 5

Two-Factor Authentication Protocol

| Alice - identity $ID_a$ | Server - identity $ID_s$ |
|---|---|
| Generates random $x < q$ | Generates random $y, w < q$ |
| $ID_a \rightarrow$ | $\leftarrow ID_s$ |
| $S = H_2(ID_s), A = H_1(ID_a)$ | $A = H_1(ID_a), S = H_2(ID_s)$ |
| $P_a = xA$ | $P_s = yS, P_g = wA$ |
| $\pi_a = H_q(P_a|P_s|P_g), \pi_s = H_q(P_s|P_a|P_g)$ | $\pi_s = H_q(P_s|P_a|P_g), \pi_a = H_q(P_a|P_s|P_g)$ |
| $k = e((x + \pi_a). ((s - \alpha)A + \alpha A), \pi_s S + P_s)$ | $k = e(\pi_a A + P_a, (y + \pi_s)sS)$ |
| $K = H(k|xP_g)$ | $K = H(k|wP_a)$ |
| $M = H(ID_a|ID_s|K)$ | $N = H(ID_a|ID_s|K)$ |
| $M \rightarrow$ | if $M \ne N$, drop the connection |

For both parties observe that $k=e(A,S)^{s(x+\pi_a)(y+\pi_s)}$. Observe that Alice's token and PIN are recombined locally before any value calculated from them is transmitted. If the wrong PIN is entered, the server drops the connection (and only allows a few more attempts before taking more drastic action with respect to the purported "Alice").

There is a wide-spread concern that pairing-based protocols may be intrinsically too slow for real world application. However recent progress in efficient implementation has clearly answered the doubters (for a review of recent progress see [A21]). We implemented the protocol in Table 5 using a Barreto-Naehrig (BN) curve [A2] at the standard Advanced Encryption Standard-128 (AES-128) bit level of security, on a 64-bit Intel i5 520M processor, clocked at 2.4 GHz, using a mixture of C and some automatically generated assembly language.

As well as using optimal techniques for the pairing itself [A21], one can exploit the Fuentes-Castañeda et al. method for fast hashing to $\mathbb{G}_2$ [A8], the well-known Gallant, Lambert and Vanstone (GLV) method for point multiplication in $\mathbb{G}_1$ [A11], and the Galbraith-Scott technique for fast point multiplication in $\mathbb{G}_2$ [A10].

Even without any precomputation [A21] the above protocol is fully practical. On our test hardware the server side of the calculation required 4.48 milliseconds and the client side required 4.10 milliseconds.

Note that Wang's protocol is not the only choice here. There is for example an alternative protocol due to S. Wang et al. [A27] which also supports a PIN and key correction. It is rather more elegant than Wang's, and claims to be faster. It also has a nice and simple proof of security. Another alternative is Protocol 2 from Chen and Kudla [A5].

Consider the implications of a successful hack on the server which reveals its secret sS. Note that there are no client related secrets (token, PIN or biometric) stored on the server. However this attack obviously allows a false server to be set up, onto which clients might be convinced to log on. If the successful hacker then captures a token, they can easily find the associated PIN. However they cannot use the captured server secret to log onto the genuine server, and access its data. They cannot enroll any other clients. So we fully achieve our property 5 and although loss of the server secret is serious, the effects are to a maximum extent mitigated.

By removing the role of client registration from the server and entrusting it instead to an independent third party, we have enabled a PKI/SSL-like solution to the problem of two-factor authentication. We maintain that the scheme shown in Table 5 is a very suitable alternative for any Web-based application that currently uses Username/Password, being simultaneously more user-friendly and more secure. However, it requires the client, as well as the server, to carry out a pairing.

A number of examples of protocols that improve on, and/or provide alternatives to, the above described protocols will now be described. Some of the protocols and implementations meet some but not all of the 10 security features listed above.

M-Pin Protocols

A number of M-Pin protocols, which feature an efficient two-factor client-server authentication mechanism, will now be described. In particular, as an M-Pin client will often be implemented in an environment with a limited computational capability, we show how to lighten the load on the client side of the protocol. Our description here is in the context of a Barreto-Naehrig (BN) curve [B4] at the AES-128 bit level of security, but the ideas contained here easily extend to other contexts.

As mentioned above, M-Pin is a zero-knowledge authentication protocol which authenticates a client to a server. Its unique feature is that it allows a short PIN number 11 to be extracted from the client secret to create a token+PIN combination, facilitating two-factor authentication. The idea can easily be extended to support multi-factor authentication. Moreover, the second factor 11 extracted from the client secret 7 does not have to be a PIN. It can be any string of data.

A strong client-server protocol should (a) authenticate the client to the server, (b) authenticate the server to the client, and (c) should result in a negotiated encryption key with which subsequent communications can be encrypted. As mentioned above, the standard way of implementing this to date has been by using a Username/Password mechanism to authenticate the client to the server, and use the well known TLS/SSL protocol to authenticate the server to the client, and to establish the encryption key. The weakest link here is the Username/Password mechanism which is widely regarded as being broken. SSL itself has, to a lesser extent, been weakened by intensive scrutiny which has revealed some exploitable vulnerabilities.

To replace Username/Password, multi-factor authentication is the most often touted solution. Of all the possible form-factors the simple ATM-like combination of a token and a PIN number is the most user familiar and user-friendly. But until very recently no suitable purely cryptographic protocol was available to support it, other than those that used simplistic methods derived from classic symmetric cryptography. Implementations invariably involved some kind of (potentially expensive) hardware token. Cryptographic solutions based on modern asymmetric cryptography suffered from weaknesses which allowed an attacker, in possession of some easily accessible side information, and who had captured a software token, to mathematically immediately determine the associated PIN number. Therefore they were not genuinely two-factor.

Here we describe the M-Pin technology solution. This comes in two flavours (a) a basic M-Pin protocol which simply replaces Username/Password while continuing to leverage SSL, and (b) an M-Pin-Full variant which also replaces SSL.

As described with respect to FIG. 1, an important aspect of M-Pin is the involvement of a third party, referred to as the Trusted Authority 4 in the description of FIG. 1. In classic Username/Password schemes the client registers directly with the server, who maintains an "encrypted" (in fact hashed) file of client passwords. So the server is not just responsible for day-to-day operations, it is responsible for client registration as well. Note that this is in contrast with (the much more successful) SSL protocol, which already involves a third party in the form of a certificate issuing authority (CA), such as Verisign. As mentioned above, this certificate based technology is known as the Public Key Infrastructure (PKI). With the likes of SSL, server registration is quite separate from day-to-day server operation. With M-Pin we do something similar for the client—we separate out the day-to-day server functionality from client registration, which is now handled by a Trusted Authority (TA). So a TA is to M-Pin what a CA is to SSL/PKI. One of the huge benefits of this approach is that a break-in to the server does not cause nearly as much damage, as long as the TA remains inviolate. Just as hacking a single SSL server is not nearly as bad as hacking Verisign.

The TA issues client and server secrets. Using M-Pin, no client secrets, or values derived from client secrets, are stored on the server. With M-Pin, Alice proves to the server that she is in possession of a valid secret, while revealing nothing about it.

Pairing-Based Cryptography

As further mentioned above, to realise our solution we will be exploiting the relatively new science of pairing-based cryptography (PBC). Pairing-Based Crypto provides an extra structure which often allows solutions to complex problems that proved intractable to the standard mathematics of Public-Key Cryptography. The Poster child for PBC was Identity-Based Encryption, whereby the identity of a client became their public key. The idea was around for a long time, but traditional cryptographic primitives repeatedly failed to produce a solution. However with the introduction of PBC solutions were found [B6].

As also mentioned above, a Type-3 pairing [B12] is a mapping $\mathbb{G}_1 \times \mathbb{G}_2 \to \mathbb{G}_T$. The groups $\mathbb{G}_1$, $\mathbb{G}_2$ and $\mathbb{G}_T$ are all of the same prime order q. A pairing works on a special pairing-friendly elliptic curve [B4], [B11]. For a BN curve $\mathbb{G}_1$ are points on the curve over the base field $F_p$, $\mathbb{G}_2$ are points on the sextic twist of the curve over the quadratic extension field $F_{p^2}$, and $\mathbb{G}_T$ are elements in the cyclotomic subgroup embedded in the finite extension field $F_{p^{12}}$. Parameter p designates the prime modulus of the pairing. The pairing itself is written as a function with two inputs C=e(P,Q) where $P \in \mathbb{G}_1$, $Q \in \mathbb{G}_2$ and $C \in \mathbb{G}_T$. It is realised that a BN pairing-friendly curve is a perfect fit for security at the AES-128 level, and so we will assume its use here. As mentioned above, the most important property of the pairing is its bilinearity:

$$e(aA, bB) = e(bA, aB) = e(A, B)^{ab}$$

To create a client-server protocol, it is important that client and server secrets should be kept distinct. A simple way to exploit the structure of a Type-3 pairing is to put client secrets in $\mathbb{G}_1$ and server secrets in $\mathbb{G}_2$. For a Type-3 pairing there is no computable isomorphism between these groups, even though both are of the same order.

As mentioned with respect to FIGS. 1 to 5, the Trusted Authority will be in possession of a Master Secret s. The Master Secret s may be a random element of $F_q$. The unique secret value s may be associated with the Trusted Authority's support for a particular server. A client secret is of the form s.H(ID), where ID is the client identity and H(.) a hash function which maps to a point A on $\mathbb{G}_1$. Here we follow [B20] and assume that H is modelled as a random oracle where $H(ID) = r_{ID}.P$ where $r_{ID}$ is random and P is a fixed generator of $\mathbb{G}_1$. The server will be issued with secret sQ, where Q is a fixed generator of $\mathbb{G}_2$. In other words, secret sQ represents a fixed point Q on a special elliptic curve multiplied by the TA secret s. The fixed point Q may be chosen arbitrarily by the TA. The server is also issued with the coordinates of the fixed point Q. Even if a hacker gets hold of sQ and Q, the hacker would not be able to determine the master secret s since it is protected by a discrete logarithmic problem. Note that, in some implementations, this will be the only multiple of s in $\mathbb{G}_2$ ever provided by the TA. In some implementations, servers will always be associated with their own unique master secrets. In other words, the value of s is unique for every server. The curve is the same curve on which point A is located but points A and Q belong to different groups, $\mathbb{G}_1$ and $\mathbb{G}_2$, of the same order q.

Note that the TA functionality can be distributed using a secret sharing scheme, to remove from the overall system a single point of failure. In the simplest possible case there may be two Distributed Trusted Authorities (DTA), each of which independently maintains their own share of the master key. So $s = s_1 + s_2$, and each DTA issues a part-client secret $s_1 H(ID)$ and $s_2 H(ID)$, which the client adds together to form their full secret. Now even if one DTA is compromised, the client secret is still safe.

An important idea is that a PIN number $\alpha$ will be extracted by the client from their secret, to create the token [B16]. Our two-factors of authentication are then this memorised PIN and the remaining token. To be explicit, for an individual Alice whose identity hashes to a point $A \in \mathbb{G}_1$, her full secret as issued by the TA is the point sA. This is split into the token $(s-\alpha)A$, and the chosen PIN number $\alpha$. The token is created by calculating $\alpha A$ and subtracting it from sA. The full secret can be reconstructed from its two components by Alice as $sA = (s-\alpha)A + \alpha A$. Consequently, the token $(s-\alpha)A$ may in some examples be a point on the elliptic curve and could be any string of data representing the coordinates of that point. As described with respect to FIG. 1, the token 10 is stored in the client. The PIN 11 is remembered by the user and entered when the user 6 wants the client 2 to establish a session with the authentication server 3. The PIN may be chosen by a human being or may be generated automatically by a computer. However, the PIN can be changed by the client, at any time, without the involvement of any other party.

M-Pin

This proposed protocol derives from a long history of Identity-Based identification (IBI) protocols, that originate with the seminal work of Fiat and Shamir [B10]. The basic idea is for a Prover to identify itself using an identity-related secret issued by a Trusted Authority, while revealing nothing of that secret to the Verifier. This is often called a zero-knowledge proof, as proof of possession of the secret is established while revealing nothing of the secret itself. It is important to emphasise that an identification protocol results only in the Verifier (in this case the server) either accepting or rejecting the Prover (in this case the client).

Pairing-based IBI protocols were studied in depth by Bellare et al. [B5], as part of a larger framework whereby many standard identification (SI) methods could be "surfaced" as IBI schemes, or indeed as full Identity Based Signature (IBS) schemes. By "pushing" some proposed (but unproven) IBS schemes down to their underlying SI description, they were able to resurface them, but this time with full security proofs. They considered some pairing-based schemes, the best of which appears to be that which first appeared as an IBS scheme proposed independently by [B8] and [B24]. Independently (of [B5]), Kurosawa and Heng [B13] came up with more-or-less the same idea. All of this research owes a debt to the original (non-identity based) short signature scheme of Boneh, Lynn and Shacham [B7].

The IBI method is the one we will exploit as a starting point here. Note that in standard IBI protocols the Verifier has no secrets. The Prover is simply trying to prove that they are entitled to their claimed identity, to anyone that is interested. However, in some examples described below, only the unique verifier in possession of the secret sQ is in a position to carry out the verification. By doing this, a corrupt Verifier cannot be used as an Oracle against which to test PIN guesses by someone who had stolen the associated token. Therefore we assume that the server which is running SSL or its equivalent, also takes responsibility for protecting sQ. The server may store sQ in secure storage in data storage 33. Another change we make is to split the client secret into token and PIN as described above.

An M-Pin protocol is shown in Table 6. Observe that on the client side all of the computation is in the simpler group $\mathbb{G}_1$. On the server side the product of two pairings can be calculated using standard multi-pairing methods [B17], and will cost much less than two separate pairing computations. The correctness of the protocol can be quickly established using the bilinearity property.

TABLE 6

M-Pin

| Alice - identity $ID_\alpha$ | Server |
|---|---|
| Generates random x < q | Generates random y < q |
| A = $H_1(ID_\alpha)$ | A = $H_1(ID_\alpha)$ |

TABLE 6-continued

M-Pin

| Alice - identity $ID_\alpha$ | Server |
|---|---|
| U = xA | |
| $ID_\alpha$, U → | ← y |
| V = −(x + y)((s − α)A + αA) → | |
| | g = e(V, Q) · e(U + yA, sQ) |
| | if g ≠ 1, refuse the connection |

Using bilinearity it can be shown that:

$$g = e(V, Q) \cdot e(U + yA, sQ)$$
$$= e(-(x + y)sA, Q) \cdot e(xA + yA, sQ)$$
$$= e(A, Q)^{-(x+y)s} \cdot e(A, Q)^{(x+y)s}$$

Consequently, if the correct PIN is received in the client, to allow it to reconstruct the full client secret, g will be equal to 1.

The protocol of Table 6 will now be described in more detail with respect to FIGS. 6 and 7. With respect to FIG. 6, at step 6.1 the client 2 receives a PIN guess 11' from the user. As shown in Table 6, at step 6.2, the client then hashes its identity to a point A on the elliptic curve in $\mathbb{G}_1$. The identity may be retrieved from storage 23. At step 6.3, the client also generates a random x and carries out a multiplication of the point A, on the elliptic curve, to another point U. Multiplications and additions on an elliptic curve are known by the skilled person and will not be described in detail here. The value of x is lower than the prime order q of the groups $\mathbb{G}_1$, $\mathbb{G}_2$ and $\mathbb{G}_T$. At step 6.4, the client issues a commitment to the server 3 that it wants to authenticate and sends its identity and the coordinates of the point U on the curve. The client then receives a challenge y from the server at step 6.5, where y is a random number also lower than q. At step 6.6, the client then recovers the client secret from the PIN and the token and multiplies, on the elliptic curve, the point corresponding to the client secret, with the sum of −x and −y, to obtain the coordinates of another point V. The client then sends these coordinates to the server to allow the server to authenticate the client. At step 6.7, the client may receive a notification of the outcome of the authentication process from the server. This will be described in more detail below.

Figure 6:
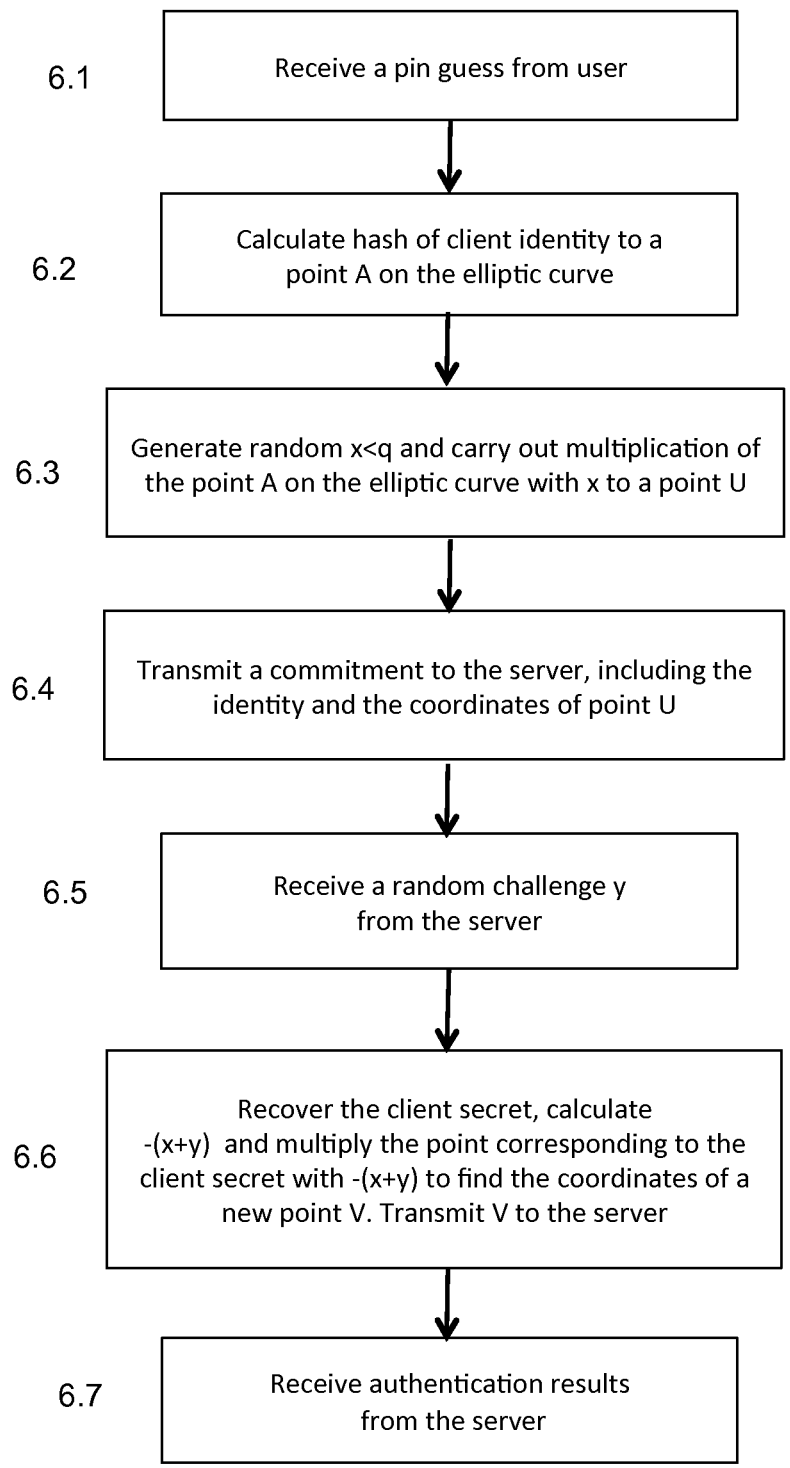
FIGS. 6 and 7 are flow diagrams illustrating a protocol for authentication a client to the server.

The steps of FIG. 6 may be carried out by the processor 21 of the client 2 executing the instructions of the authentication program 25, described with respect to FIG. 2.

Figure 7:
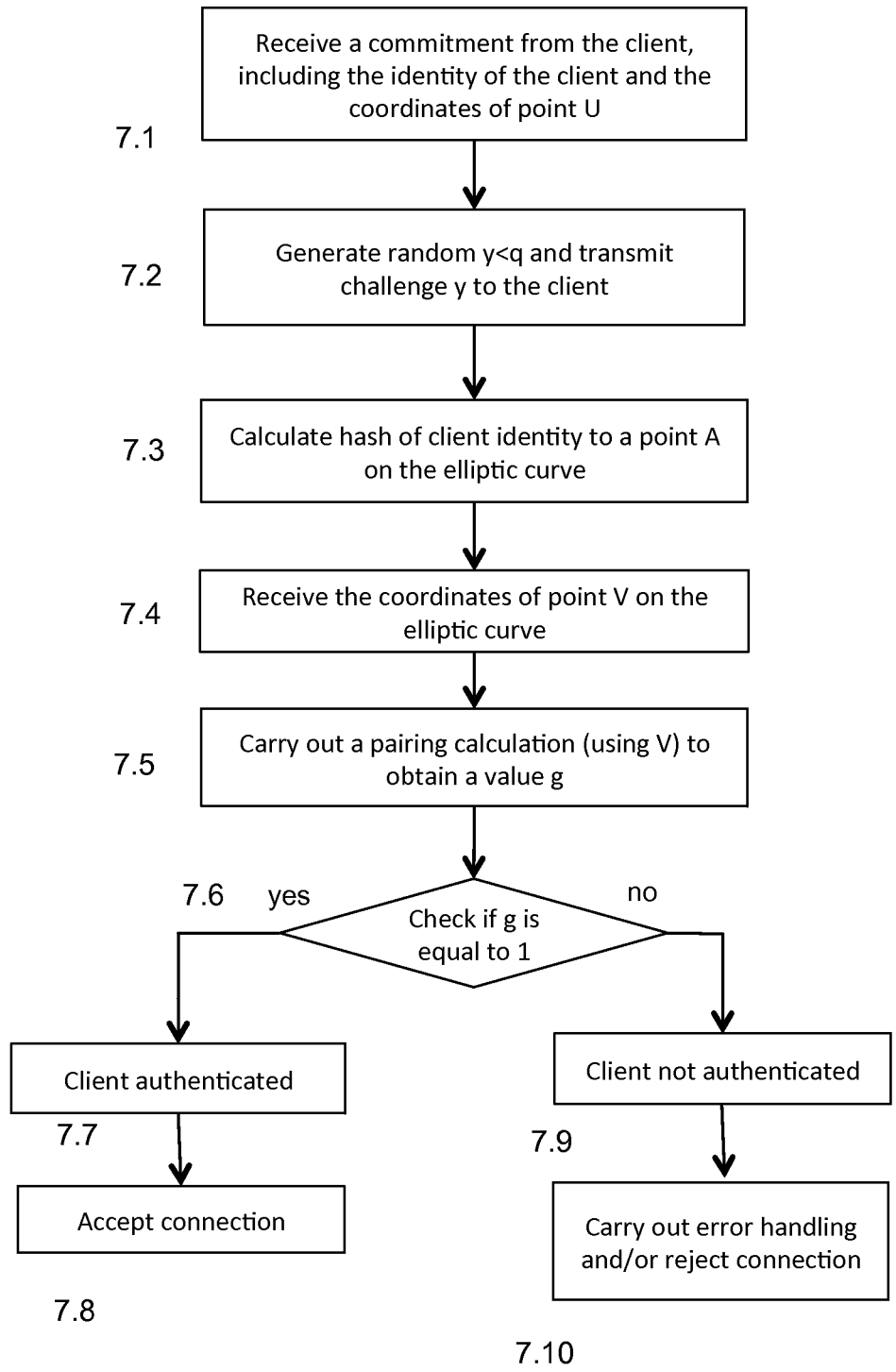

With respect to FIG. 7, the server 3 receives the commitment to authenticate at step 7.1, including the claimed identity of the client and the coordinates of a point U on the elliptic curve. The server may also have received another message from the client prior to step 7.1, indicating that the client wishes to establish a connection. The server may have invited the client to transmit the identity and the coordinates of U. At step 7.2, the server then generates random y, also lower than q, and transmits the value of y as a challenge to the client. At step 7.3, the server hashes the client identity to a point A on the elliptic curve. At step 7.4, the server receives the coordinates of a point V on the elliptic curve.

The server then calculates a product of pairings at step 7.5. The server may calculate the two pairings first and then multiply the two pairings together. Alternatively, the server may calculate a multi-pairing which allows the product of pairings to be calculated much faster. The first pairing takes as input point V and a point Q and maps them to an element in $\mathbb{G}_T$. As indicated in the description of FIG. 6, V is a point on the curve in $\mathbb{G}_1$ obtained by starting from the point corresponding to the client secret. As already mentioned above, Q is a fixed generator of $\mathbb{G}_2$. The other pairing takes as input the coordinates of another point in $\mathbb{G}_1$, obtained from starting from a point corresponding to the identity of the client, and the point corresponding to the server secret sQ and maps them to an element in $\mathbb{G}_T$. The point sQ is of course another point in $\mathbb{G}_2$. The point in $\mathbb{G}_1$ is obtained by adding, on the elliptic curve, the point U in $\mathbb{G}_1$, the coordinates of which were received from the client in the commitment of step 7.1, and a point, of course also in $\mathbb{G}_1$, obtained by multiplying a point corresponding to the client identity with the random value y. The results of the product of the pairings give a value g. Because of bilinearity, the value of g should be equal to 1 if the correct PIN was entered and therefore the correct client secret was recovered. In step 7.6, the server checks if the value of g equals to 1 and if it does equal to 1 the server authenticates the client in step 7.7 and accepts the connection in step 7.8. Accepting the connection may involve transmitting a message to the client to inform the client that the client has been authenticated.

If, conversely, the value of g does not equal to 1, the server determines in step 7.9 that the client is not authenticated. The server then has a number of options for proceeding. In step 7.10 it can either reject the connection immediately or it can carry out an error handling process to determine the extent to which the PIN must have been incorrect, as will be described below with respect to FIG. 8.

The steps of FIG. 7 may be carried out by the processor 31 of the server 3 executing the instructions of the server authentication program 34, described with respect to FIG. 3.

It will be realised that the order of some of the steps in FIGS. 6 and 7 can be varied. For example, the PIN may not be received until it is used in step 6.6. Moreover, the server may generate y before it receives the commitment and/or it may hash the client identity after it receives the coordinates of point V.

The server may use any suitable pairing, as the skilled person would appreciate, to carry out the pairings. For example, the client may use the efficient R-ate pairing. Moreover, although it has been described that elliptic curves are used, any suitable algebraic curves may be used. For example, hyper-elliptic curves may be used instead of elliptic curves.

Protocol Outputs

As mentioned above, at the end of protocol run the client still does not know whether or not they have succeeded. This is important as action to handle unsuccessful connections can now be taken appropriately. This responsibility may be passed off to another non-cryptographic process, which is informed by the available protocol outputs. What outputs should a protocol like M-Pin return after completion? For Username/Password the response is typically a boolean—true or false. The outcome is basically to either allow access or refuse it, but also some simple mechanism in place to block on-line password guessing attacks.

In the event of a successful outcome, there is not much more to be done. The client must have been registered correctly with the Trusted Authority, and therefore has been issued with a valid token and has input a valid PIN, associated with their claimed identity. The response may simply be that the connection is established. In the event of protocol failure, there appears to be relatively little for the server to work with to formulate an appropriate response. However, in some examples, the server may implement a 3-strikes-and-you-are-out strategy to prevent an attacker who has captured the token from trying all possible PINs until they hit on the right one. Note that the server does not necessarily even have a list of registered users—it would be natural that such a list should be maintained and managed by the Trusted Authority.

It may help the server 3 to decide on an appropriate response if (a) they knew if the failing client had a valid token, and (b) if they knew the extent of the error in the entered PIN. There is, in some implementations, a way to derive from a failed protocol run the extent of the PIN error. If the extent of the PIN error is outside of the range of valid PINs, then this implies that the "client" does not have a valid token.

Observe that in the M-Pin protocol both the client and the server have the same value of the master secret s involved in their calculations. If a client enters an incorrect PIN, it is as if they have instead used s+δ in their calculation, where δ is the extent of their error. The server can then search for δ by iterating through all the possibilities for sQ+δ.Q on its side, until the protocol outcome is correct. By exploiting the bilinearity of the pairing, this can be done in a way requiring only one multiplication in $\mathbb{G}_T$ for each candidate δ. In some examples, we can do even better. If the final step of the protocol results in a value of g≠1, then in fact g=e(U+yA, Q)$^δ$. To find δ requires the calculation of a pairing and the solution of a discrete logarithm problem.

One appropriate algorithm for achieving this is the method of Pollard's Kangaroos [B15]. This is a "square root" algorithm, which means that for a 4-digit PIN only a few hundred multiplications in $\mathbb{G}_T$ will be required to find δ, which is completely practical.

In the case where the extent of the PIN error can be determined by the server (and this potentially applies to any two-factor authentication scheme, but in particular to the protocols suggested here), a more intelligent response is possible rather than the classic and simplistic "3-strikes-and-you-are-out" mechanism. A server might attempt to intelligently distinguish between a bad entity who has captured the token and is trying to find the PIN by trying all possible combinations, and the good entity who has either mistyped their PIN, or inadvertently typed in the wrong PIN. One simple way to exploit knowledge of PIN error is to not punish again a user who enters the same wrong PIN more than once. Note that it is of no value to a bad entity to guess the same PIN twice, so nothing is lost by doing this.

In the case of a mistyped PIN, the error will typically be in only one digit. Again this can be detected by the server from the PIN error. Therefore we suggest an example of a more elaborate type of scoring mechanism. For example, a user may only be locked out if they reach an error score of more than 10. A completely wrong PIN scores 4, the same wrong PIN entered again scores 0, a PIN out by just 1 digit scores 2, and a PIN out by just 2 digits scores 3. In this way a genuine good entity will struggle to reach a score of 10, whereas a bad entity will typically get there after just 3 attempts. Of course, the maximum error score of 10 is just an example and another maximum error score may be selected.

Note that other side-information will be available to the server which can be folded into an intelligent decision on whether or not to lock out a particular identity. The server will also know the IP address of the client, and the time of the attempted log-in. Combined with the identity and PIN error this amounts to the who, what, where and when of each failed connection.

One exemplary process of handling errors in the second factor will now be described with respect to FIG. 8. In the process described with respect to FIG. 8, the PIN may be a four digit number. However, it will be realised that the error handling process may be applicable to PINs that take any form. Although the error handling process will be described with respect to PINs, the error handling process can be used to find errors or differences in any string of data that is used as a factor of the client secret. It can be used with a factor, of a secret, that corresponds to any type of information reducible to a string of digits or a number. At step 8.1, the server 3 determines that the PIN entered in the client 2 was wrong. If this is the first time a PIN was entered during the current session, the server sets the value of an error counter n to 0. At step 8.2, the server determines the extent of the PIN error as described above. The server finds δ from the value of g, obtained at the end of the protocol, and by using $g=e(U+yA, Q)^\delta$. The server then checks if the PIN is 1 digit out at step 8.3 and if so adds an error count "a" to the error counter n at step 8.4. The server then proceeds to step 8.10. The value of error count "a" may for example be 2. However, in other implementations, the error count "a" may be lower or higher than 2. If the PIN is found to not be out by 1 digit at step 8.3, the process instead continues to step 8.5 and checks if the pin was out by two digits. If the PIN was out by two digits, an appropriate error count "b" is added to the error counter n at step 8.6. The server then proceeds to step 8.10. The error count "b" for a PIN out by 2 may for example be 3. However, in other implementations, the error count "b" may be lower or higher than 3. If the PIN is neither out by 1 or 2 digits, the process checks if the PIN has been entered before at step 8.7. If the PIN has been entered before the server 3 may not increase the error count since, as mentioned above, there is no value to a bad entity to enter the same wrong PIN more than once. Step 8.8 shows that the error count is increased by a value "c" when it is determined that the wrong PIN has been entered earlier in the current session. As described, the value of "c" may be equal to 0. However, in other implementations, if appropriate, the value of "c" may be greater than 0. If the PIN is not out by either 1 or 2 digits and it has not been entered before, the server 3 determines that it must be a completely wrong PIN entered for the first time and adds an appropriate error count "d" to the error counter at step 8.9. The value of error count "d" may be 4 but it could be lower or higher in other implementations.

The server then proceeds to check whether the value of the error counter is lower than a maximum error count $N_{max}$ at step 8.10. As described above, this maximum error count can be 10 but it could also be lower or higher. It may be anything from a very low value, such as 2 or 3, to a value much higher than 10. Of course the maximum error count also depends on the values of "a", "b", "c" and "d" and could be any suitable value selected by taking in to account the values of "a", "b", "c" and "d". If the value of the error counter is smaller than the maximum error count value, the server may invite the client to try to authenticate again at step 8.12. The client may then ask the user 6 to try a new PIN. However, before it invites the client to try a new PIN it may check whether there is any other information that should be considered at step 8.11, such as but not limited to the location of the client, the time, the identity of the client or the IP address of the client. The server may store various rules for determining how to proceed based on this additional information. If the server still decides to invite the client 2 to try a new PIN, it will send a message to the client to do so. If the client receives a new wrong PIN from the user 6, the process will restart from step 8.1. If the PIN is wrong again the value of the error counter n is increased as described with respect to steps 8.3 to 8.9.

If the value of the error counter n at step 8.10 is equal to or higher than the maximum error count, again the server may consider if there is any additional information that may change a default decision to reject the connection. As before, the additional information may comprise the location of the client, the time, the client identity and the IP address. The server will consider this information at step 8.13 and if a decision is made to invite the client to try a new PIN, the process proceeds to step 8.12. If instead a decision is made to reject to connection, the server will reject the connection at step 8.14. The server will also proceed to reject the connection at step 8.14 if the additional information considered at step 8.11 indicates that the connection should be rejected even though the error count is lower than the maximum error count. It may also inform the client 2 that the account has been blocked and that it will need to contact the TA 4 to reset its account or open a new account. This could involve the client being issued with a new client secret 7.

Figure 8:
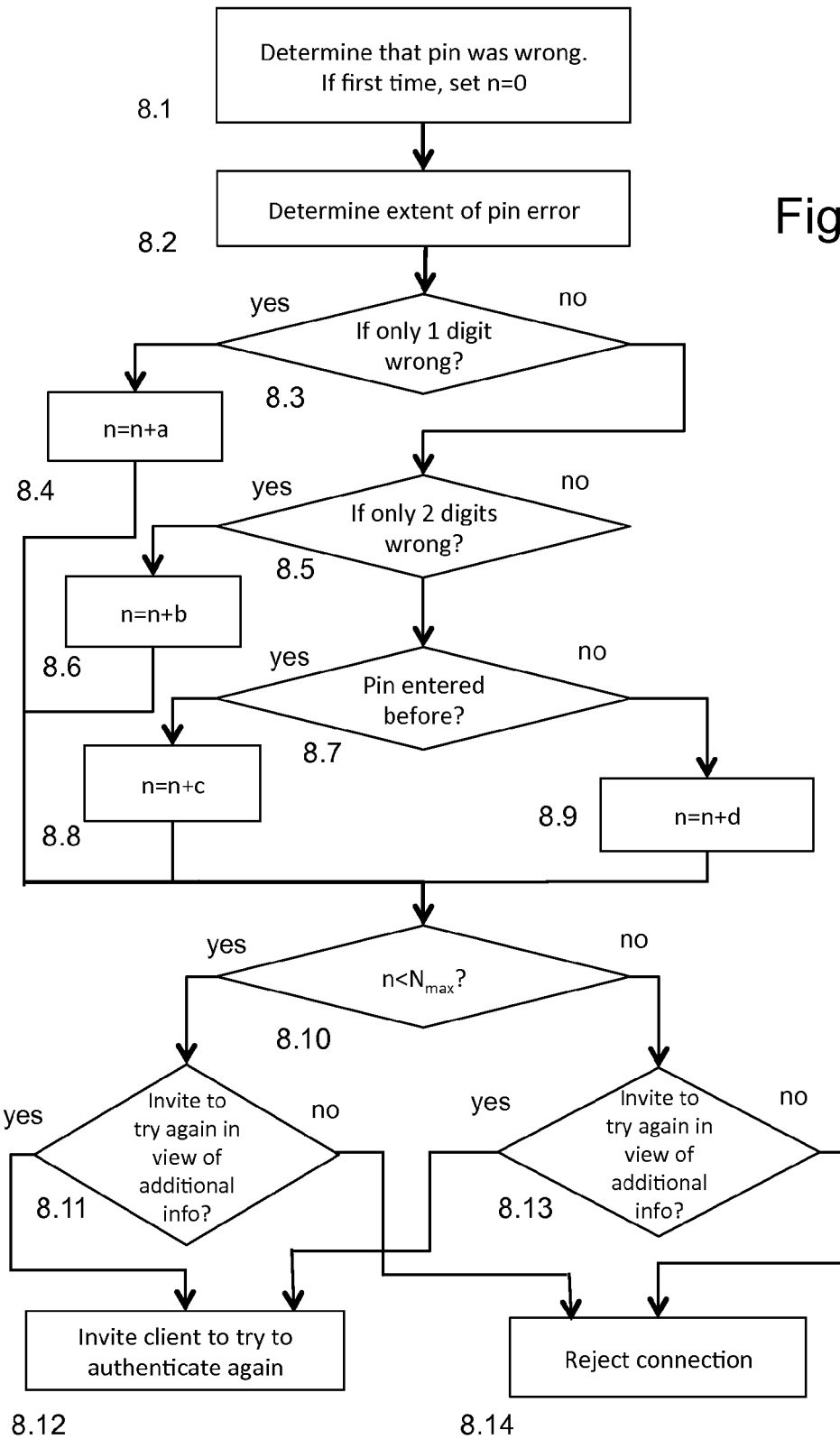
FIG. 8 is a flow diagram illustrating a process in the authentication server for handling PIN errors.

It will be realised that the process described with respect to FIG. 8 is just one process for error correction and various modifications and variations are contemplated. For example, the consideration of additional information may take place before or after the value of the error counter is adjusted and checked. Moreover, in alternative implementations, the server may not consider any additional information. Moreover, although specific PIN errors of 1 or 2 digits are considered in FIG. 8, the error counter may also be adjusted for other PIN errors. For example, the process may involve increasing the error counter with a specific value if the PIN is 3 or 4 digits out or another specific PIN error has been determined. The error count value may also vary depending on which digit of the PIN it is that it incorrect and the extent of error in that digit. Moreover, the server may not use an error counter parameter. Instead, it may store the error value of each authentication attempt. The server may add the error values up each time it needs to determine whether to invite the client to authenticate again or it may make a decision based on the separate error values.

Although the error handling process has been described with respect to the specific protocol of Table 6, the error handling process can be used with any protocol that would allow an error in a factor of a client secret to be determined. It may apply to any multi-factor protocol where the extent of error in one of the factors can be determined by the authenticating entity.

Moreover, although the error handling has been described with respect to a four digit PIN, the error handling may be applied to a PIN of length shorter than 4 digits or a PIN of length 5 or 6 digits or even longer. The error handling process may be applied to a PIN of any number of digits that forms one of the factors of the multi-factor secret. However, it will be realised that the longer the PIN the longer the time it takes to calculate the error.

We will now consider the security of the proposed scheme. The underlying IBI scheme we are using was proven secure by [B5], in that breaking the scheme is shown to be as difficult as the one-more Computational Diffie-Hellman problem. They considered the protocol in the context of a Type-1 pairing (for which $\mathbb{G}_1=\mathbb{G}_2$). This can also be considered as a Type-3 pairing in which there exists a computable isomorphism between $\mathbb{G}_1$ and $\mathbb{G}_2$. The problem of transferring a security proof from a Type-1 to a Type-3 pairing was considered by Smart and Vercauteren [B20]. Their simplest solution was to "relativise" the security proof in the context of an Oracle which was made available to an attacker and which implemented the isomorphism. The fact that such an isomorphism is not known, evidently does not weaken the proof.

Our next concern is that an attacker who captures a token should not be able to determine the associated PIN number without the willing participation of the server. A particularly powerful attacker would be one who was himself a client of the server, or who was able to recruit a coalition of insiders willing to provide their full client secrets.

So consider an attacker who was in possession of sA, sB, sC . . . and the victims token $(s-\alpha)Z$. Would it be possible to continually add Z to the victims token and to distinguish the case when it too became equal to sZ? This is exactly the Generalized Decisional Diffie-Hellman problem as considered by Bao, Deng and Zhu [B3]. They proved that this reduced to the standard DDH (Decisional Diffie-Hellman) assumption in the group $\mathbb{G}_1$.

That the DDH problem is hard in $\mathbb{G}_1$ on a Type-3 pairing is known as the XDH assumption, first informally implied in [B16], and made explicit in [B2].

Finally consider an attacker who has access to the victim token and manages to eavesdrop a run of the protocol, or perhaps succeeds via a "phishing" attack to get the client to engage in a protocol run directly with it. Such an attacker can harvest the values zA, $(s-\alpha)A$, and zsA, the first and last values obtained from the protocol run. However, to find the PIN requires the attacker to be able to distinguish zA, sA and zsA from three values without this relationship, which is again covered by the XDH assumption.

Note that the full client secret is reconstructed from the token and the PIN before it is used in the IBI protocol. Also the server does not transmit anything to the client which might be of use in determining a PIN—in fact it only transmits the random challenge y.

Consider now a successful break-in by a hacker into the server. Before considering the implications of this, it is worth pointing out that the server secret, (independent of the number of clients is supports), is just the single point $sQ \in \mathbb{G}_2$. Therefore it would be easy to protect this secret inside of a Hardware Security Module (HSM). However assuming that this secret is captured, this would allow the hacker to set up a false server to whom clients could be attracted. It would also allow the hacker to find the PIN associated with a captured token. In fact this must be true of any two-factor authentication scheme, as knowing server secrets, a false server can be created and PIN guesses can be tested against it. However the successful hacker is not able to reconstruct full client secrets, and so cannot itself log onto the genuine server and into client accounts. So the potential for mischief is greatly reduced.

In some implementations, the security may be increased further by using a distributed server arrangement as already described with respect to FIG. 5. In the system of FIG. 5, the server secret is issued by the TA in two parts, $s_1Q$ and $s_2Q$, which are added to create the full server secret sQ, where $s=s_1+s_2$. The protocol is completed while keeping the two secrets, $s_1Q$ and $s_2Q$ separate. On the server side the part of the calculation involving the server secret is of the pairing $e(X, sQ)$ for some random X. But by the magic of bilinearity $e(X, sQ)=e(X, s_1Q).e(X, s_2Q)$.

So for example the server could have two HSMs (each from a different manufacturer). One would store $s_1Q$ and the other $s_2Q$. One would calculate $e(X,s_1Q)$ and the other $e(X, s_2Q)$. The server process would then simply multiply these values and continue with the protocol as normal. However knowing $e(X, s_1Q)$ for example, and knowing X, does not reveal anything about $s_1Q$. That is the reverse pairing problem which is believed to be hard. So no single entity ever knows the server secret sQ, and a possible single-point-of-failure is eliminated.

As shown in FIG. 5, this could be implemented as two different servers 3a, 3b and a proxy 3c that receives the results of the pairings from the two servers and multiplies them to continue with the protocol as normal. Alternatively, one of the servers may be the main server and it may receive the result of the pairing in the other server from that other server. As yet another alternative, as mentioned above, the two servers may be two secure modules of the same server.

With respect to FIGS. 5 and 7, if the server secret is stored as two server secrets, step 7.5 will be modified to include each HSM 3a, 3b carrying out a pairing taking as an input its respective server secret and the point U+yA, and then carrying out a product of the two pairings. In other words, one of the servers 3a would calculate $e(U+yA,s_1Q)$ and the other server 3b would calculate $e(U+yA, s_2Q)$. The two pairings may be sent to the proxy 3c for the proxy to carry out the product or one of the HSMs that stores a part of the full server secret may carry out the multiplication of the two pairings.

It is appreciated, as was mentioned with respect to FIG. 2, that for widespread deployment the client side of this protocol might be required to be implemented in the JavaScript language inside of a browser, ideally even inside of a browser implemented on a low powered mobile device. On the face of it this is a daunting prospect. However JavaScript engines have been improving radically over the last few years, as has the processing power of mobile devices.

Examining the client side of the M-Pin protocol we see that it requires two point multiplications in $\mathbb{G}_1$, These point multiplications in $\mathbb{G}_1$ could benefit from an efficient endomorphism that exists on BN curves, as described by Gallant, Lambert and Vanstone [C1]. This makes them roughly twice as fast. Alternatively, other types of curves and methods of calculating the multiplications can be used instead.

For laptops and desktops the client-side timings are imperceptible. Some timings for mobile devices are shown in Table 7. On the server side, on contemporary Intel processors, the processing time is of the order of a few milliseconds per connection.

TABLE 7

M-Pin Client side timings

| Manufacturer | Model | OS | Browser | M-Pin timings (in seconds) |
|---|---|---|---|---|
| Apple | iPhone 4 | iOS 6 | Safari | 2.5 |
| Apple | iPhone 5 | iOS 6 | Safari | 1 |
| Apple | iPad 2 | iOS 6 | Safari | 1 |
| Samsung | Galaxy S3 | Android | Chrome | 1 |
| Motorola | MB256 | Android | Firefox | 3 |

The scheme described with respect to FIGS. 6 and 7 could be run under the protection of SSL on the server side. However, in other examples, SSL may not be used. A pairing-based identity-based encryption (IBE) alternative to the PKI based SSL may be considered, as M-Pin is itself a pairing-based and identity-based protocol. The IBE protocol of Sakai and Kasahara [C2] may for example be used. This protocol requires no pairing calculation on the client side, and a single pairing on the server side. So an implementation of M-Pin already contains all of the important building blocks for implementing IBE using the BN curve. In some applications, only authentication is required and the client and the server do not need to establish an encryption key. Accordingly, in some implementations, an encryption key is not established. Moreover, in the protocol of Table 6 the client does not authenticate the server. If authentication of the server is required, this can be carried out using SSL or using another suitable scheme.

M-Pin Full

In some examples, there is also provided a protocol that replaces the functionality of SSL as well as Username/Password. We will now describe a number of ways of achieving this as well.

The protocol of Table 6 can be extended to also establish a key in the client and the server. An example of an extended cryptographic protocol that also establishes a session key for encrypting and decrypting future messages is shown in Table 8.

One problem with pairing based key exchange protocols as described in the literature is that the protocols are "balanced" in terms of computation load and the client is also required to calculate a pairing. This is generally recognised as a substantial calculation, even with all of the improvements that have been made over recent years [B1]. All of the existing schemes reviewed above require both parties to calculate a pairing. This is particularly unsuitable in a context where a low powered client may be attempting a key exchange with a high powered server.

One idea is to off-load the calculation of the pairing to a computationally better endowed pairing server, which can do the heavy lifting for us. In some of the examples described herein, a method is provided to "unbalance" the protocols, so that the client is relieved of the burden of the pairing calculation by the server. If the pairing calculation is of C=e(P,Q), the idea is that P and Q would be passed to the pairing server, which would calculate the pairing C=e(P,Q) and pass back the value of C.

However this has obvious security implications. At least one of the parameters P or Q will be a sensitive secret, and we do not want to pass this value to a not-necessarily trusted party. The value of P and Q should not be openly communicated. Assuming that P is the secret parameter, we can exploit the properties of the pairing to "mask" P in such a way that we can cheaply "unmask" the pairing value when it is returned to us. So generate a random mask m, and pass mP and Q to the pairing server, which returns D=e(mP, Q). We then recover $C=D^{1/m}$. This all works due to bilinearity as $e(P,Q)=e(mP,Q)^{1/m}$.

The idea of delegating a pairing calculation is considered by Chevalier-Mames et al. [B9]. They consider elaborate solutions, given the possibility that a malicious server might respond with a wrong result, which might in turn cause an unfortunate outcome for the protocol. But in our case the final key is derived directly from the pairing value, and so a false pairing value simply causes the protocol to fail, in a way indistinguishable to, say, a communications failure. Therefore the solution above is adequate for our purposes.

There are however a couple of concerns. At first glance it is important that the client check that the received value of D is of the correct order. This is to prevent a small subgroup confinement attack [B14]. Recall that the pairing value is an element of $F_{p^{12}}$, and should have a prime order q that is 256 bits in size for a BN curve. However a random value in $F_{p^{12}}$ can have an order that is any exact divisor of $p^{12}-1$ where p is the prime modulus. Imagine that there exist values of order 3. Then a malicious pairing server in cahoots with an entity masquerading as a M-Pin server can complete the protocol shown in Table 8 successfully by passing back such a value t, because the client, independent of its masking value m, can calculate just one of 3 possible values for k. The false "server" can then simply try all three until they find the right one.

Our first line of defense against this attack is to carry out a quick and cheap check that the pairing value is, as it should be, an element of the cyclotomic subgroup of order $\Phi_{12}(p)=p^4-p^2+1$. This can be done at almost no cost by exploiting the frobenius action and checking that $D. DP^4=D^{p^2}$. A check that D≠1 should also be carried out. However it is still possible that the cofactor within the cyclotomic subgroup, $(p^4-p^2+1)$, sometimes called the "hard-part" of the final exponentiation of the pairing, might itself have small divisors.

We can block this avenue of attack by using a BN curve where this cofactor is prime (and much greater than q). This can, for example, be achieved by choosing the BN curve parameter such that $(p^4-p^2+1)/q$ is a prime, clearly much greater than q. We call such a BN curve "GT-Strong".

Since BN curves are so plentiful we had no difficulty in finding such curves. Finding a "GT-Strong" curve is not hard to do, at the sacrifice of the extremely low Hamming weight for x. For example the curve parameter x=-400080600000408116$_{16}$ (see [B4]) results in a suitable curve, while maintaining a relatively low Hamming weight for x, as is desirable for efficient implementation [B1].

Now, since no small subgroups exist, we can omit the group membership test, with some savings.

It will be realised that although the use of "GT Strong" curves have been described above to be used with M-Pin protocols, "GT Strong" curves may be used in any pairing-based encryption protocols in which the features of "GT Strong" curves are suitable. Moreover, it will be realised that an M-Pin and M-Pin Full protocol, and other protocols described herein, can also be realised without using "GT Strong" curves.

The next question is how best to calculate $D^{1/m}$. This is far cheaper than calculating a full pairing, but it still has some cost. Some testing indicates that the fastest solution is to compress the pairing value to an element in $F_{p^4}$ [B19] and to use the fast XTR method as described by Stam and Lenstra [B21]. Our next idea is that instead of deploying a separate pairing server, why not get the M-Pin server itself to fulfil this role? After all M-Pin is an on-line protocol and an M-Pin server must be available in order to run it. Also it is a reasonable assumption that the M-Pin server will have superior computational capabilities. In fact by combining these roles we achieve some further simplifications, as we will see.

Once the client identity is authenticated using the protocol of Table 6, the protocol goes on to complete the key exchange. The two parts of the protocol may be carefully combined for maximum efficiency. This protocol also requires another general hash function $H_g(.)$ which serialises, and hashes its input to a 256-bit value K. Both sides can then extract an Advanced Encryption Standard (AES) key from this value K. The full protocol is provided in Table 8.

TABLE 8

M-Pin Full

| Alice - identity $ID_\alpha$ | Server |
|---|---|
| Generates random x, w < q | Generates random n, y < q |
| $A = H(ID_\alpha)$ | |
| $U = xA$ | |
| $ID_\alpha, U \rightarrow$ | |
| | $\leftarrow y$ |
| $m = -(x + y)$ | |
| $V = m((s - \alpha)A + \alpha A) \rightarrow$ | $A = H(ID_\alpha))$ |
| | $t = e(V, Q)$ |
| | $g = t. e(U + yA, sQ)$ |
| | if $g \neq 1$, reject the connection |
| $W = wA \rightarrow$ | $\leftarrow r = t^n$ |
| $k = r^{w/m}$ | $k = e(nW, sQ)$ |
| $K = H_g(k)$ | $K = H_g(k)$ |

Unbalancing the protocol is sufficient to endow it with the desirable property of "full forward secrecy". The client does not have to calculate a pairing, although the server has to calculate three. The client also has no requirement to do any arithmetic in the group $\mathbb{G}_2$. Indeed all point multiplications are in the simpler group $\mathbb{G}_1$. It is left as a simple exercise for the reader to exploit bilinearity to confirm that both client and server end up with the same key. Note that since the first part of the protocol is just basically the original M-Pin protocol, all of its features still apply.

The protocol outputs can be exploited to determine the PIN error and respond to the client based on the extent of the PIN error as has been described above with respect to the M-Pin protocol of Table 6. For example, the error handling process of FIG. 8 could be used with this process before the key agreement part of the protocol is carried out.

The M-Pin Full protocol of Table 8 will now be described in more detail with respect to FIGS. 9 and 10.

The steps at the client side will be described first with respect to FIG. 9. The beginning of the protocol has in fact already been described with respect to steps 6.1 to 6.6. However, it will be noted that the client may store a separate parameter m=−(x+y) at step 6.6. Step 6.7 in FIG. 6 may be replaced with steps 9.1 to 9.4 of FIG. 9 and these steps will now be described. The client 2 receives the value r, derived from the result of the pairing based on V and Q, from the server 3 at step 9.1. By receiving this value, the client knows that the PIN entered was correct and that it has been authenticated. Alternatively, the client may also receive additional information indicating that it has been authenticated. The server has calculated a pairing required for the client to derive the key and r is derived from the result t of that pairing. Consequently, the client 2 does not need to calculate a pairing. However, one of the inputs to the pairing was the client secret, masked with m, and the client now needs to take that masking value m, unknown to the server, into account when it derives k from r. The result of the pairing t was raised to the power of n in the server to obtain r and the client does not know the value of n. However, the client does not need to recover the results of the pairing, it only needs to establish the same k as the server. The client will therefore need to share information with the server to allow the server to calculate the same key without sharing the actual masking value m. At step 9.2, the client therefore generates a random value w, which is lower than q, and carries out a multiplication, on the elliptic curve, of the point A to find the coordinates of a new point W. The client then sends the coordinates of this point to the server. At step 9.3 the client then raises the received value r to the power of w/m. At step 9.4 it hashes the result k to a key K. It has thereby obtained a session key, which can be used to encrypt further communication.

Figure 9:
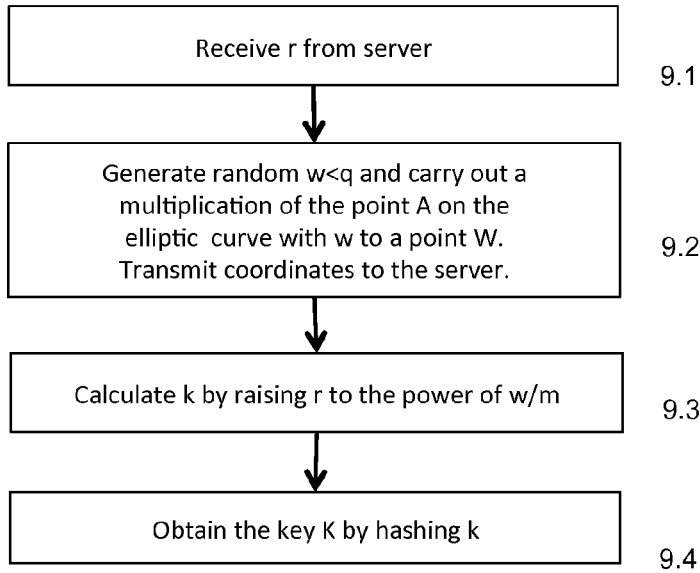
FIGS. 9 and 10 are flow diagrams illustrating an extension of the protocol of FIGS. 6 and 7 in order to also establish a session key.

The steps of FIG. 9 may be carried out by the processor 21 of the client 2 executing the instructions of the authentication program 25, described with respect to FIG. 2.

The steps on the server side will now be described with respect to FIG. 10. Again, the first steps have already been described with respect to steps 7.1 to 7.6 of FIG. 7. However, it will be noted that the server may store the results t of the first pairing at step 7.5 so that it can derive the value r later. The server may carry out the first pairing to obtain t before it multiplies it with the result of the second pairing. If the value of g equals 1 or if the correct PIN is later entered, using for example an error handling process as described in FIG. 8, the server 3 then proceeds with the key derivation process which will now be described with respect to steps 10.1 to 10.5. At step 10.1 the server generates a random n which is lower than q. At step 7.5, the server carried out a pairing calculation. One of the pairings took as inputs the coordinates of V obtained from the client and the coordinates of the fixed point Q. The server now raises the result of that pairing to the power of n to obtain a value r. The server then transmits this value to the client at step 10.2. The server has therefore calculated the pairing required to derive the key for the client and all the heavy processing is in the server. The client 2 can then use the value of r to derive the key as was described with respect to FIG. 9.

The server 3 then receives the coordinates of a point W from the client at step 10.3. W has been obtained using a value w which will be used to transform r into the key at the client side. The server therefore needs the coordinates of W to derive the same key, using bilinearity. At step 10.4, the server multiplies, on the elliptic curve, the point W with n. The server then calculates another pairing which takes as input the coordinates of the point resulting from the multiplication of W and n and the coordinates of the server secret sQ. The server then hashes the results k of the pairing to obtain a key K. This is the same key as the key obtained on the client side, as will be readily appreciated by using the bilinearity property of pairings.

Figure 10:
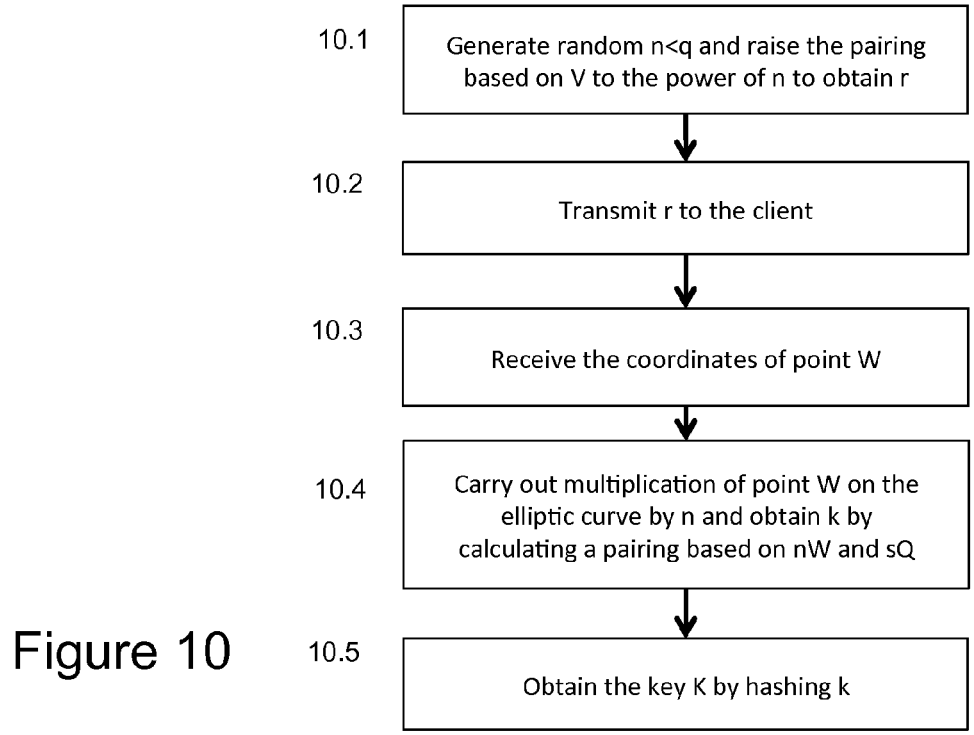

The steps of FIG. 10 may be carried out by the processor 31 of the server 3 executing the instructions of the server authentication program 34, described with respect to FIG. 3.

It should be pointed out that protocol set out in Table 8, and described with respect to FIG. 9 and FIG. 10, is not entirely equivalent to the combination of the protocol set out in Table 6 combined with SSL. The client identity is transmitted in the clear in M-Pin-Full, whereas with SSL the entire M-Pin protocol runs under cover of SSL, which therefore provides an anonymity feature. On the other hand M-Pin Full has full forward secrecy, whereas SSL, although there are supported forward-secret modes, is normally operated without this feature. Of course it is always possible to run the M-Pin Full protocol in conjunction with SSL.

What if a false server which does not possess a valid secret passes back a value of r specially concocted so that $r^{w/m}$ is a value it too can calculate? Clearly simply sending a random r will not work, as the values of w and m are unknown to the attacker. However a plausible attack might be to construct a value s=e(C,D) such that $e(C,D)^{w/m}$ is known. However to cancel the effect of the unknown m, the pairing must have as a parameter a multiple of m, and V is the only such multiple available to it. The pairing must also have as a parameter A, as when the pairing is raised to the power of w, then W=wA is the only multiple of w known to it. But both of V and A are elements from $\mathbb{G}_1$, and only one parameter from $\mathbb{G}_1$ can be submitted to the pairing. Therefore such a value cannot be constructed.

One consequence of this is that a so-called "phishing" attack will be ineffective against this protocol, as the phishing website will not be able to establish the mutual key K.

Time Permits

The protocols may also include time permits. Time permits provide a simple alternate revocation capability. The idea, in some examples, is that the server includes a time period in its construction of Alice's hashed identity. Unless Alice holds the corresponding "Time permit" for the same period, she cannot complete the protocol. The time permit may for example be valid for a day or two days. However, it will be realised that time periods may be valid for much longer, for example, a week or a month or longer than a week or a month.

In the protocols in Table 6 and Table 8 we can instead calculate $A=H(ID_\alpha)+H_T(ID_\alpha|Ti)$ on both sides of the protocol where $T_i$ is a textual description of the i-th time period, $H_T(.)$ is a hash function distinct from H(.) and indicates concatenation. $T_i$ may be an explicitly described time slot such as a day or a month. Consequently, the point A and the client secret sA are now also derived from the time period for which the secret is valid. For the protocol to work correctly Alice must be issued by the Trusted Authority 4 with a permit $s.H_T(ID_\alpha|T_i)$ which gets added to her combined PIN-plus-token secret $s.H(ID_\alpha)$ to create sA. Observe that the permit is of no use to any other party, and hence can be issued publicly, or simply sent to Alice by email, or delivered via the server. As mentioned with respect to FIG. 1, the client may store the Time Permit 27 in storage 23. A proof of security for this idea in the context of Boneh and Franklin IBE can be found in [B22]. The M-Pin protocol needs a small modification to continue to support the mechanism for determining PIN error described above and to carry out for example the PIN error handling process described with respect to FIG. 8. Since this error will be reflected in the PIN-plus-token component and not in the time permit, the client must also send the server $R=x.H(ID_\alpha)$ in the first pass of the protocol.

A protocol based on the protocol of Table 6 and including time permits is shown in Table 9. In the protocol of Table 9, the notation is different to the notation used in the description of time permits above. In the protocol of Table 9, the identity and the client secret remain the same as in Table 6 and Table 8 but we derive a new point $D=H(ID_\alpha)+H_T(ID_\alpha|T_i)$ on both sides of the protocol where $T_i$ is still a textual description of the i-the time period, $H_T(.)$ is a hash function distinct from H(.) and | indicates concatenation. Also, the client secret sA is added to the time permit sT to obtain a new point from which point V is then derived. This is mathematically equivalent to the method described above although the notation is different.

TABLE 9

M-Pin with time permits

| Alice - identity $ID_\alpha$ | Server |
|---|---|
| Generates random x < q | Generates random y < q |
| $A = H(ID_\alpha)$ | |
| $T = H_T(T_i|ID_\alpha)$ | |
| $D = A + T$ | |

TABLE 9-continued

M-Pin with time permits

| Alice - identity $ID_\alpha$ | Server |
|---|---|
| $U = xD$ | |
| $R = xA$ | |
| $ID_\alpha, U, R \rightarrow$ | $\leftarrow y$ |
| $V = -(x+y)((s-\alpha)A + \alpha A + sT) \rightarrow$ | |
| | $D = H(ID_\alpha) + H_T(T_i|ID_\alpha)$ |
| | $g = e(V, Q) \cdot e(U + yD, sQ)$ |
| | if $g \neq 1$, reject the connection |

With respect to the mechanism for determining PIN error, now the value of g returned by the protocol is $g=e(R+yA, Q)^\delta$, where $\delta$ is the PIN error.

The protocol of Table 9 will now be described in more detail with respect to FIGS. 11 and 12.

At step 11.1, the client 2 obtains a time permit sT from the TA. The client may obtain the coordinates of a point corresponding to the time permit sT from the TA 4. The client may also obtain $T_i$, indicating the time period for which the time permit is valid, from the TA or it may generate it internally. For example, the time period may be the date for which the time permit is valid, written in a specific format. Steps 11.2 and 11.3 are the same as steps 6.1 and 6.2 of FIG. 6. The client receives a PIN guess 11' from the user and it hashes its identity to a point on the elliptic curve in $\mathbb{G}_1$. At step 11.4, the client then concatenates the identity and a time period $T_i$ and hashes the concatenated string to a point T on the elliptic curve in $\mathbb{G}_1$. The client then adds points A and points T, on the elliptic curve, to obtain the coordinates of a new point D at step 11.5. At step 11.6, the client then carries out two multiplications on the curve. It generates a random x and multiplies both point D and point A with x to obtain two new points U and R. The value of x is lower than the prime order q of the groups $\mathbb{G}_1$, $\mathbb{G}_2$ and $\mathbb{G}_T$. The client then sends a commitment to the server 3, including the identity of the client and the coordinates of points U and R, at step 11.7. In some examples, the client may also send the server the time period $T_i$.

At step 11.8, the client receives a challenge in the same way as the client received a challenge y in step 6.5 of FIG. 6. The value of y is a random number also lower than q. The client then proceeds to calculate the coordinates of a point V. In the protocol of Table 6, the coordinates of this point were derived by multiplying a point corresponding to the recovered client secret with $-(x+y)$. In the protocol of Table 9, V is instead derived from the client secret sA that can be obtained from the token and the PIN and the time permit sT obtained from the TA. In more detail, at step 11.9, the client recovers the client secret from the PIN and the token in the same was as in step 6.6 of FIG. 6. The client may also add the two random values, x and y, together and multiple by −1 to obtain $-(x+y)$. The client then adds, on the elliptic curve, the point corresponding to the client secret sA and a point corresponding to the time permit sT to find a new point and then carries out a multiplication, on the curve, of the new point with a value $-(x+y)$, to obtain the coordinates of point V. The client then sends the coordinates of this point to the server to allow the server to authenticate the client. At step 11.10, the client may receive the results of the authentication. Step 11.10 will be described in more detail below.

Figure 12:
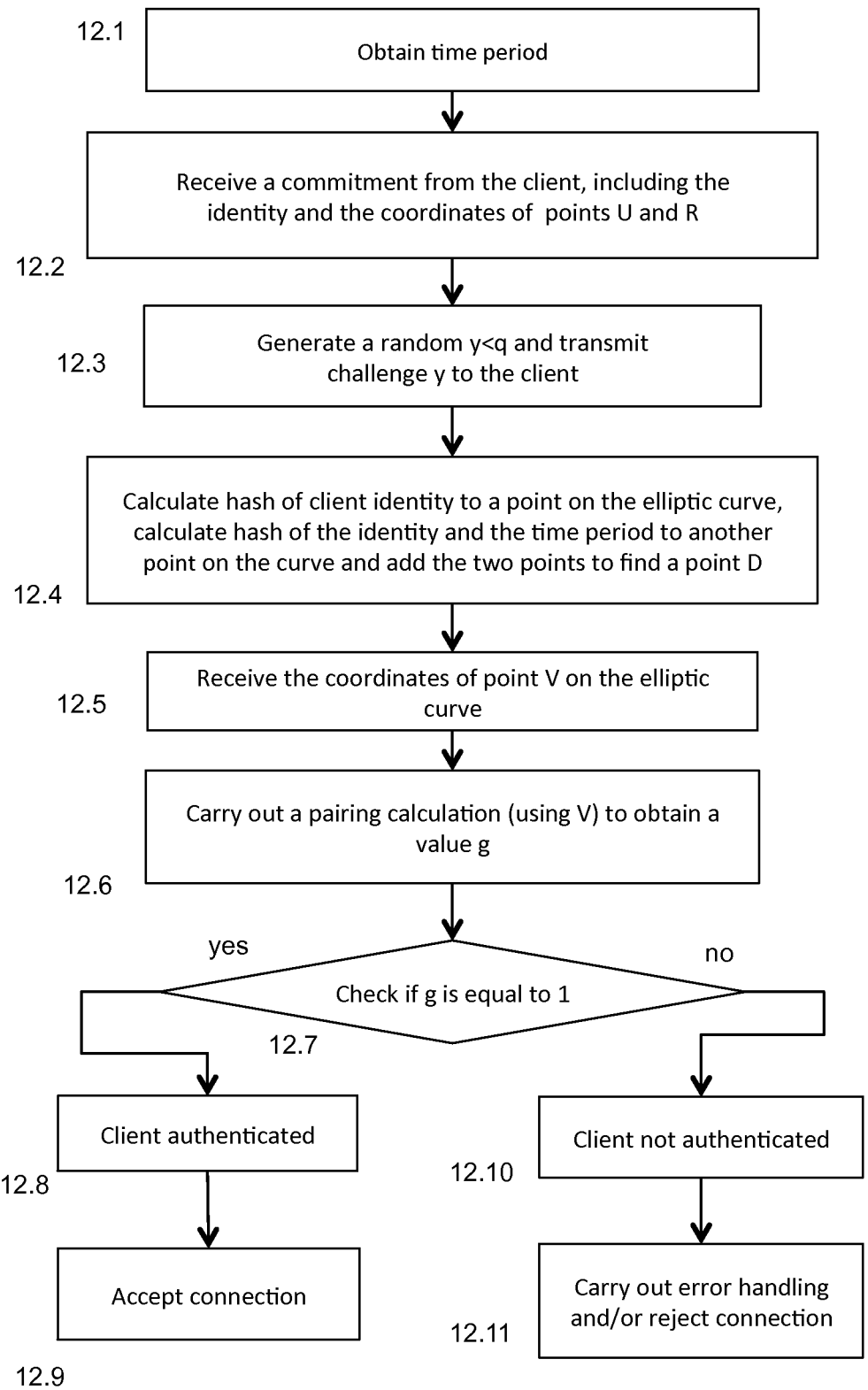

With respect to FIG. 12, the server 3 obtains a time period $T_i$ at step 12.1. The server can obtain the time period from the TA 4, generate it internally if for example it is of a known format such as a date, or receive it from the client 2. The server then receives the commitment to authenticate at step 12.2, including the claimed identity of the client and the coordinates of points U and R in $\mathbb{G}_1$ on the elliptic curve. The server may also have received another message from the client indicating that the client wishes to establish a connection. The server may have invited the client to transmit the identity and the coordinates of points U and R. In some examples, steps 12.1 and 12.2 can be combined and the server receives the time period $T_i$ in the commitment. At step 12.3, the server then generates random y, also lower than q, and transmits the value of y as a challenge to the client. The server then uses the client identity and the time period to calculate the coordinates of point D at step 12.4. At step 12.5, the server receives the coordinates of a point V on the elliptic curve.

The server then calculates a product of pairings at step 12.6. The first pairing takes as input point V and a point Q and maps them to an element in $\mathbb{G}_T$. As indicated in the description of FIG. 11, V is a point on the curve in $\mathbb{G}_1$ obtained from a point corresponding to the client secret sA and a point corresponding to the time permit sT. As already mentioned above, Q is a fixed generator of $\mathbb{G}_2$. The other pairing takes as input the coordinates of another point in $\mathbb{G}_1$, obtained from points U and D, and the point corresponding to the server secret sQ and maps them to an element in $\mathbb{G}_T$. The point sQ is of course another point in $\mathbb{G}_2$. The point in $\mathbb{G}_1$ is obtained by adding, on the elliptic curve, the point U in $\mathbb{G}_1$, the coordinates of which were received from the client in the commitment of step 12.2, and a point, of course also in $\mathbb{G}_1$, obtained by multiplying point D, calculated in step 12.4, with the random value y. The server obtains the product of the two pairings to give a value g. The calculation may be carried out as a multi-pairing in which the server calculates the product of the pairings as one calculation rather than carrying out the separate pairings before multiplying them together. If the server secret sQ is split into two parts, each stored by a separate module, each module may instead calculate a pairing based on its respective secret part and the two pairings may then be multiplied together to obtain e(U+yD, sQ). The module storing server secret $s_1$ would then calculate e(U+yD, $s_1$Q) and the module storing server secret $s_2$ would then calculate e(U+yD, $s_2$ Q).

As described with respect to FIG. 7, because of bilinearity, the value of g should be equal to 1 if the correct PIN was entered and therefore the correct client secret recovered. In step 12.7, the server 3 checks if the value of g equals to 1 and if it does equal to 1 it authenticates the client in step 12.8 and accepts the connection in step 12.9. Accepting the connection may involve transmitting a message to the client to inform the client that the client has been authenticated.

If, conversely, the value of g does not equal to 1, the server determines in step 12.10 that the client is not authenticated and can then proceed in a number of ways. In step 12.11 it can either reject the connection immediately or it can carry out an error handling process to determine the extent to which the PIN must have been incorrect. It may for example perform the process described with respect to FIG. 8.

Figure 11:
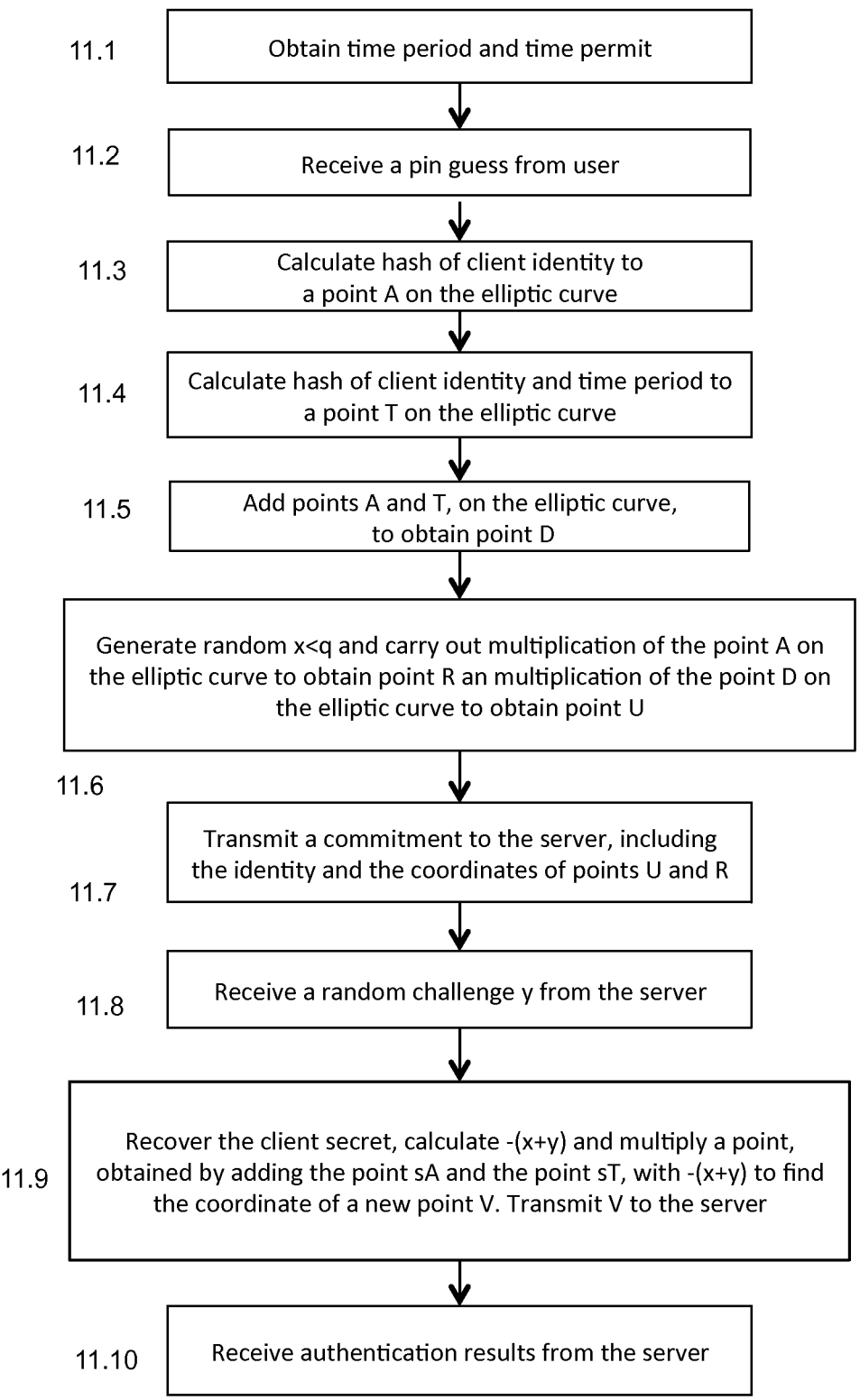
FIGS. 11 and 12 are flow diagrams illustrating a protocol for authentication a client to the server which also includes time permits.

It will be realised that the order of some of the steps in FIGS. 11 and 12 can be varied. For example, the PIN may not be received until it is used in step 11.9. Moreover, the time period and the time permit may not be obtained in the client side until they are used in steps 11.4 and steps 11.9 respectively. Furthermore, the server may hash the client identity after it receives the coordinates of point V. It may also postpone obtaining the time period until it uses it in step 12.4. Moreover, if the server does not support a more advanced error handling process for errors in the second factor of the secret, the coordinates of point R may not need to be sent to the server.

The server may use any suitable pairing, as the skilled person would appreciate, to carry out the pairings. For example, the client may use the efficient R-ate pairing. Moreover, although it has been described that elliptic curves are used, any suitable algebraic curves may be used. For example, hyper-elliptic curves may be used instead of elliptic curves.

A modification of the M-Pin Full protocol of Table 8, to also include time permits is shown in Table 10.

TABLE 10

| M-Pin Full with time permits | |
|---|---|
| Alice - identity $ID_\alpha$ | Server |
| Generates random x, w < q | Generates random n, y < q |
| A = H($ID_\alpha$) | |
| T = $H_T(T_i|ID_\alpha)$ | |
| D = A + T | |
| U = xD | |
| R = xA | |
| $ID_\alpha$, U, R → | |
| m = −(x + y) | |
| V = m((s − α)A + αA + sT) → | ← y |
| | D = H($ID_\alpha$) + $H_T(T_i|ID_\alpha)$ |
| | t = e(V, Q) |
| | g = t. e(U + yD, sQ) |
| | if g ≠ 1, reject the connection |
| W = wD → | ← r = $t^n$ |
| k = $r^{w/m}$ | k = e(nW, sQ) |
| K = $H_g(k)$ | K = $H_g(k)$ |

As mentioned above with respect to Table 9, now the value of g returned by the protocol is g=e(R+yA, Q)$^\delta$, where δ is the PIN error.

As will be clear from Table 10, modifications may not be required to the key derivation steps described with respect to FIGS. 9 and 10 when time permits are used other than that, in step 9.2, instead of a multiplication of the point A, a multiplication of a point D is carried out, with random value w lower than q, to obtain the coordinates of point W and the coordinates of the new point W are transmitted to the server. However, the steps of the beginning of the protocol may be modified as described with respect to FIGS. 11 and 12.

It is important to bear in mind that, in some examples, the M-Pin protocols are protocols that involve three parties, a single server, lots of clients, and a trusted authority (TA). One of the major benefits of this is that a lot of responsibility is taken away from the server into the hands of the TA. In particular the server holds no data related to client secrets. This greatly mitigates the problem of the server being hacked.

With careful design the server only needs to maintain a dynamic database of active client status. This database may be stored in the server, for example in the storage 33 shown in FIG. 3, and loaded into temporary memory of the processor 31 when the processor needs to quickly access the data in the database. For example if a new user successfully logs in, the server will know that they have been issued with valid credentials by the TA, and so does not need to do any further checking. The security expertise now lies solely in the hands of those that control the TA—the server can be trusted to be implemented and maintained by a non-security expert.

The time permit mechanism is a way for the TA to take control of revocation, and also relieve the server of this potential burden. Since time permits require the master secret, their issuance is at the discretion of the TA 4.

The TA may for example broadcast all time permits. A client may for example be able to obtain its time permit 27 by accessing a website associated with the TA. An imposter may also be able to obtain the client's time permit but it will have no use for this time permit since it does not know the client secret sA. A decision may be made at the beginning of each new time period in the TA about whether the TA wants to continue to allow a client to use the system and the relevant protocol to authenticate and/or derive keys and, if it does, it will publish a time permit obtained from the master secret s associated with the relevant server, the client identity and the time period for the client to use.

In some examples, instead of time permits, or in addition to the time permits, additional information can be included in the generation of the client secret sA. The time permit sT can for example be replaced by $$sT = s.H_T(ID_\alpha|T_i|Z)$$

where Z is the data that the TA 4 wishes to send to a relying party. The client will receive the time permit and also the data in plain text. It may, in some examples, as part of the protocol, send this data to the authentication server 3. This is because the authentication server has to be able to calculate $$D = H(ID_\alpha) + H_T(ID_\alpha|T_i|Z)$$

as will be clear from the protocols of Tables 9 and 10.

With respect to FIGS. 11 and 12, the client 2 may obtain the additional data Z from the TA and send the additional data in, for example, the commitment of step 11.7 for the server to receive at step 12.2. Alternatively, the server may receive the additional data in step 12.1, either from the client or the TA. Moreover, in step 11.4 the client also uses the additional data Z to obtain the point T. The client may concatenate the client identity, the time period and the additional data and hash the results using hash function $H_T$ to a point T on the elliptic curve in $\mathbb{G}_1$.

Figure 13:
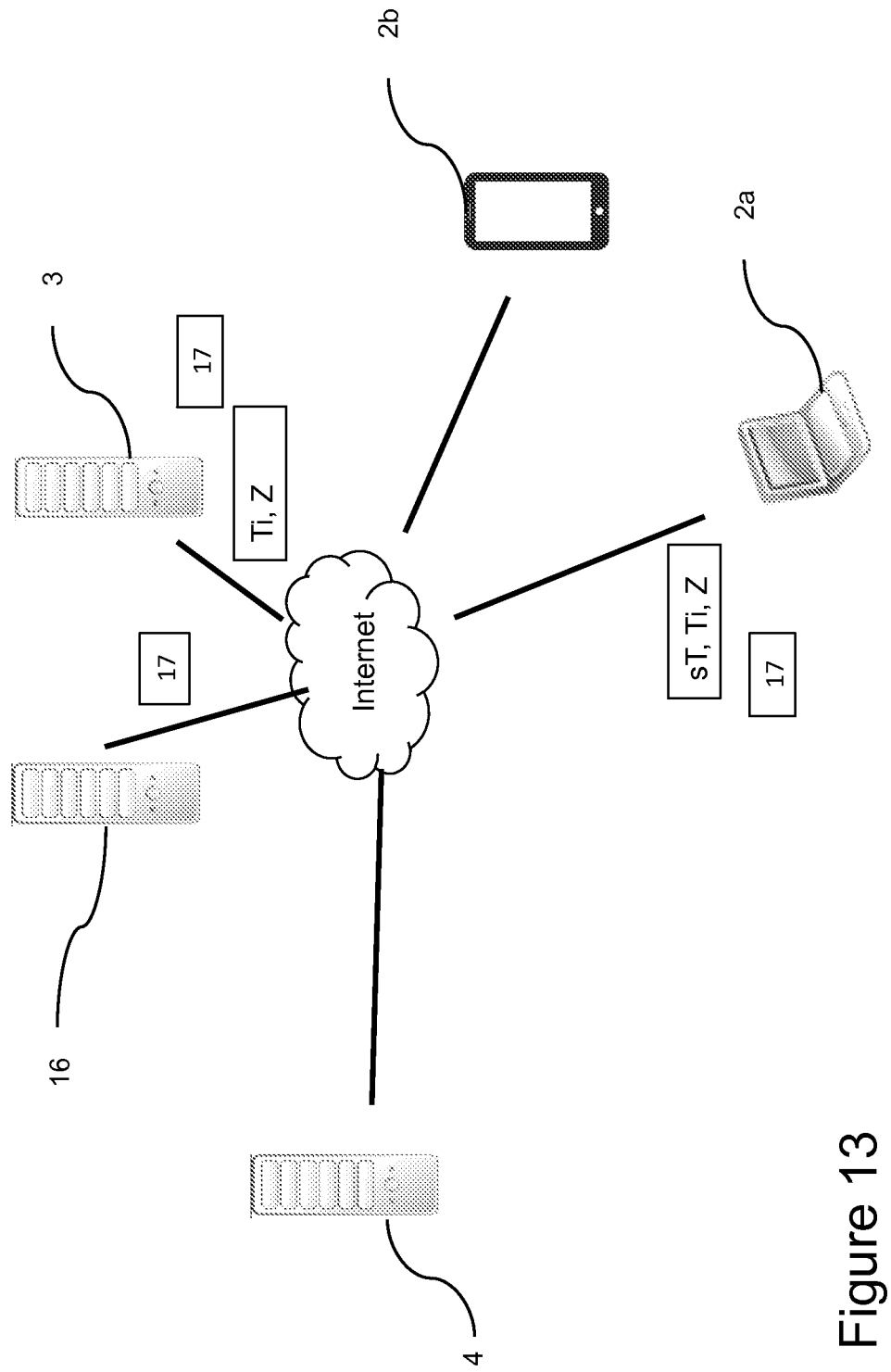
FIG. 13 is a schematic diagram of a system that uses time permits to send additional information to a party of the system.

With respect to FIG. 13, a system is shown comprising a plurality of clients 2a, 2b, an authentication server 3, a TA 4 and a relying party 16. The relying party 16 may be a server or other computing device to which the clients would like to establish a connection. For example, the relying party may store data which the client would like to access or it may be hosting an internet shopping site.

The TA 4 provides a client 2a with its time permits sT and the additional data Z. The client may also obtain the time period $T_i$, for example from the TA or by generating it internally as described above. The authentication server may also obtain the time period $T_i$. The authentication server 3 may also be provided with the additional information Z through the client 2a authenticating itself to the authentication server. The authentication server 3 may issue the client 2a with an authentication token 17 once the client has been authenticated by the server and the client can present this authentication token to the relying party 16 which may then allow or prevent access to a resource based on the token. The token 17 may contain fields for identity, success/failure, time-stamp and also the data Z that was sent from the TA. The token 17 may be signed by the authentication server, encrypted using AES, and the AES key may be encapsulated using Sakai—Kasahara Key Encryption (SAKKE). The encrypted token is sent to the client which, if it wants to, for example, access the relying party's content, must present it to the relying party 16. The relying party can decrypt the token, verify the signature and extract the data payload.

Therefore, the data has been sent from the TA 4 to the relying party 16 without being tampered with. In FIG. 13, only the first client 2a is shown to be in possession of its time permit, additional data Z and the time period but all the clients using the system may be provided with their own time permits, additional data and relevant time periods.

The TA maintains a database of rich real time analytic data that can be of use to the customer running the authentication server 3. The method described above for including additional information in the generation of the time permit can be used as a method for transmitting data via the client, authenticating itself to the authentication server, to the relying party. Moreover, additional data about the client that may be helpful for the authentication server to carry out its PIN error handling process may be transmitted in this way. For example, some of the additional data considered in steps 8.11 and 8.13 of FIG. 8 may be transmitted to the authentication server in this way.

Another Key Agreement Protocol

An alternative to the M-Pin Full protocol of Table 8 may be used to establish the keys and authenticate the client. The starting point is the final protocol from Table 5. This is based on a full authenticated key exchange protocol using pairings, due to Wang [23], but with modifications. In this protocol, instead of calculating g and checking whether g=1 before the key K is calculated, K is calculated and a value M derived from the key K is then sent from the client to the server to allow the server to carry out the authentication of the client. This protocol is shown in Table 11.

TABLE 11

Protocol for Key Agreement and Authentication

| Alice - identity $ID_\alpha$ | Server |
|---|---|
| Generates random x, m < q | Generates random y, w < q |
| $A = H_1(ID_\alpha)$ | |
| $U = xA$ | |
| $V = m((s - \alpha)A + \alpha A)$ | |
| $ID_\alpha, U, V \rightarrow$ | |
| | $A = H_1(ID_\alpha)$ |
| | $W = wA$ |
| | $t = e(yV, Q)$ |
| | $\leftarrow t, W$ |
| $k = t^{(x+1)/m}$ | $k = e(y(A + U), sQ)$ |
| $K = H(k|xW)$ | $K = H(k|wU)$ |
| $M = H(ID_\alpha|U|V|W|K)$ | $N = H(ID_\alpha|U|V|W|K)$ |
| $M \rightarrow$ | if $M \neq N$, refuse the connection |

As with the protocol of Table 8, the client no longer has to calculate a pairing. The server has to calculate two. The client also has no requirement to do any arithmetic in the group $\mathbb{G}_2$. Indeed all point multiplications are in the simpler group $\mathbb{G}_1$. Again, it is left as a simple exercise for the reader to confirm that both client and server end up with the same key. It will be observed that, unlike the M-Pin Full of protocol of Table 8, the alternative protocol of Table 11 is not a zero knowledge proof protocol since a hash of the key is in fact sent to the server.

The protocol of Table 11 can also be exploited to determine the PIN error and respond to the client based on the extent of the PIN. For example, the error handling process of FIG. 8 could be used with this protocol before the key agreement part of the protocol is carried out.

Set-Up

Examples of set-up processes will now be described in more detail with respect to FIGS. 14 to 16.

With respect to FIG. 14, the TA 4 receives a request from a server 3 to obtain a server secret at step 14.1. The TA may then provide the parameters for an elliptic curve and details of hash functions to be used in the authentication process to the server at step 14.2. The TA may have already selected an elliptic curve and details of the hash functions to be used in the authentication process. The elliptic curve parameters and the hash function details may have been pre-selected and the information 46 stored in storage 43 of the TA. The TA may also have published the parameters of the curve, details of the hash function and other public information for allowing the server to carry out an authentication process. Consequently, step 14.2 may involve directing the server to where the information is published. Alternatively, it may send the information to the server. If the server receives the server authentication program 34 from the TA, the program may include the parameters and other information that the server requires.

The TA then generates a master secret s which is unique to the server at step 14.3. At step 14.4, the TA then generates a point Q on the elliptic curve and obtains a point sQ by multiplying, on the selected curve, the point Q with the master secret s. Since s is unique for each server in some implementations, the identity for the server is not required in the generation of Q and sQ in those implementations. Point Q may be arbitrarily selected. The TA sends the coordinates of point Q and point sQ to the server 3 in a secure communication channel. In some examples, step 14.2 may be combined with step 14.4 and the TA 4 may send all the information the server requires at step 14.4. The TA may also receive and add identifying information for the server to a record 45 in storage 43, which indicates the servers and clients that use the system, at step 14.5. The record may for example be a database or other data structure.

At some time later, the TA 4 receives the identity of a client 2 that wants to authenticate with the server 4 at step 14.6. It may for example receive the identity from the server, or directly from the client with an indication of which server it wants to authenticate to. The TA retrieves the master secret s that is unique to the server that the client wishes to authenticate with at step 14.7 and generates a client secret that it sends to the client. The client secret is generated by hashing the client identity to the point A on the curve, as has been described above, and multiplying this point with the master secret s to obtain a new point sA on the curve. The TA may also generate a time permit for the client that it publishes or sends to the client at step 14.8. The TA may also add the identity of the client to the record 45 of clients and servers that use the system, at step 14.9. If the parameters of the curve and details of the hash function have not been published and will not be provided to the client by other means, the TA may also send that information, along with other information the client may need, to the client.

At some time later, at step 14.10, when the time period for which the time permit was issued expires, the TA 4 checks its records 45 and determines the clients that are still entitled to use the system. The TA publishes new time permits for the clients that are still entitled to use the system at step 14.11. For example, clients may need to pay a fee to use the authentication service and the TA may only generate and publish time permits for the clients that have paid their fees.

An example of a set-up process in the client 2 will now be described with respect to FIG. 15. The process may be triggered by the client attempting to access a server or a resource for which an authentication server 3, using an authentication system controlled by the TA, acts as an authenticating server. The client receives the client secret from the TA at step 15.1. It also obtains the parameters of the elliptic curve and details of the hash functions to use from the TA at step 15.2. For example, if the TA has published this information on a website, the client may obtain the information, along with other public information it may need to authenticate to a server, from a website. In some examples, the client may be provided with the initialisation program 24 from the TA and the program may already include the information. The initialisation program may be provided to the client before the client receives its secret. Using a user interface, the client invites a user to enter a PIN at step 15.3. The initialisation program, run in the browser of the client, from the TA may provide a graphical user interface for the user to enter a PIN. At step 15.4, the client generates the token. The client may use the specified hash function to hash the identity of the client to a point A on the curve. The client then multiplies, on the curve, the point A with the received PIN value to obtain a new point αA. It subtracts this point from the point corresponding to the client secret to obtain the token (s−α)A. It then stores this token 10 in storage along with its identity.

An example of a set-up process of the server 3 will now be described. The server sends the TA 4 a request to register at step 16.1. At step 16.2, it receives the coordinates of point Q and the point corresponding to the server secret sQ and stores these securely. At some time later, when a client attempts to authenticate, it sends the TA 4 the identity of the client. It may also look up the curve parameters and hash function details, along with other information it may need, to allow it to carry out the protocol to authenticate the client.

It will be realised, that the process described with respect to FIGS. 14, 15 and 16 are just examples and other processes for carrying out set-up in the TA, the client and the server are contemplated. For example, if no time permits are used, the steps related to time permits will not be carried out. Moreover, although the steps of FIGS. 14, 15 and 16 have been described in a particular order, the order of some steps may be varied as will be realised by the skilled person.

Covert Channel

Although the method of FIG. 8 was described as an error handling process, a similar method could also be used if an error has been entered on purpose. For example, a user who is being coerced by another person to enter the PIN in front of the other person, in order, to for example, access the user's bank account or another resources that the user wants to protect, can enter a pre-agreed error in the PIN. The authentication server will recognise the specific error as an indication that the user is being forced to enter its PIN and will reject the connection. It may automatically also take further steps to assist the user. The system therefore provides a covert channel.

The covert channel can also be used to transmit other information to the server than information indicating that the user is being coerced to enter a PIN. The difference between the entered PIN and the actual PIN may not be an error at all but a message, or part of a message, from the client that will appear on the server side without actually having been sent between the client and the server.

The covert channel in the system described above can be considered a narrow-band subliminal channel. It allows a small amount of information to be subliminally passed between a client and a server (who have been issued with compatible secrets), while looking to an external observer like (and in fact being indistinguishable from) a normal (failed) run of the protocol.

In some applications where the subliminal channel is used to communicate messages to the server, some of the protocols described herein may not be used to authenticate the client but only to allow information to appear at the server without the client actually transmitting the information. Assuming again that the PIN only includes 4 digits, if the user wants to communicate a message or data that requires more than 4 characters, the client can obtain a number of different secrets from the TA and set up a PIN for each secret.

An example of this process of communicating information will now be described with respect to FIGS. 17, 18 and 19. The process will be described in the context of making credit card information from the client 2 appear in the server 3 without the client sending the credit card information to the server. However, it will be realised that the method can be used to communicate any string of digits, representing a message, to a server without actually sending the string to the client.

The steps carried out in the TA will now be described. At step 17.1, the TA 4 receives a request from a client to register in order to allow it to securely communicate information to a server. The message may comprise the credit card information it wants to communicate to the server. At step 17.2, the TA 4 proceeds to issue multiple client secrets associated with the received credit card information. The client secrets may comprise one client secret for each 4 digits of the credit card number plus the CVC2 number, or other security code, on the back of the card. The client secret may also comprise one client secret for the entire credit card number. Consequently, if the credit card number has 16 digits plus the 3 digits on the back of the card, the TA may need to issue six client secrets. The client secrets are established using the master secret s that was also used to derive the server secret of the server to which the client wants to communicate the credit card information. Identifying information for each part of the credit card number plus the security code, and identifying information for the entire credit card number may be selected and hashed to points on the curve and the points are then multiplied with the master secret as described above to obtain the secrets. The identifying information may be any information that does not reveal the information in the credit card number. The identifying information will be referred to herein as the identities associated with the various secrets. It will be realised that the description above of how the client secrets for the credit card number are generated is just one example and the client secrets may be established in any suitable way. If the client also needs to transmit the expiry date of the credit card and other information, additional secrets may be required.

At step 17.3, the TA 4 also pre-selects the PIN numbers for the client secrets, instead of the user selecting the PIN numbers. Some of the PIN numbers may each correspond to 4 digits that appear on the card, in order. Consequently, the first client secret may have the first 4 digits of the card number selected as the PIN number, the second client secret has the second 4 digits of the card number selected as the PIN number, and so on. The fifth client secret has the CVC2 number and a 0 for null selected as the PIN number. Furthermore, the sixth client secret has the number of digits the card number is plus the number of digits of the CVC2 number on the back selected as the PIN. Consequently, if it is a 16 digit credit card number plus a 3 digit CVC2 number on the back of the card, the PIN would be '1900'.

For example, for a card number of 6456 6565 7878 9898 plus CVC2 of 767, the first PIN is selected as 6456, the second PIN is selected as 6565, the third pin is selected as 7878 and the fourth pin is selected as 9898. The fifth PIN is selected as 7670. Moreover, the sixth PIN may be selected as '1900' as described above.

The PINs are then extracted from the secrets to generate 6 tokens and the tokens are sent to the client in a response at step 17.4. The identities associated with the various secrets are also sent to the client. They may be included in the response at step 17.4. The tokens and the identities may be sent to a software wallet in the client. For example, the software wallet may be located in the storage of the browser. Alternatively, the secrets, the identities and the PINs are sent to the client and the client may itself generate the PINs. The TA may also issue a server secret to the server to which the client wants to send the credit card information if it has not done so already.

The steps carried out in the client side will now be described with respect to FIG. 18. At step 18.1, the client 2 sends a message to the TA 4 with the credit card information. At step 18.2, it receives a response with the tokens for six client secrets and the identities associated with the various client secrets back from the TA 4. Alternatively, it may receive the six client secrets and the associated PINs and may extract the PINs from the secrets to generate the tokens itself. At some time later, the client starts the program for communicating secret information in the covert channel to a server 3. This program may form part of the authentication program 25 or may be another program stored in memory 22. It may be provided to the client via a web interface from the server 3.

At step 18.3, the client sends a message to the server indicating that it will commence communicating information to the server in a covert channel. At step 18.4, the client sets a parameter P to equal the number of PINs that will be required for the whole message to be communicated. The parameter P will control how many times the difference between an actual PIN and the PIN that was used in the client will need to be determined in the server. In the credit card example mentioned above, P will be set to 6, since there are 6 separate client secrets. The client also sets a counter p to be zero. At step 18.5, the client increases the value of the counter p to 1 to prepare to communicate the first part of the message. It then transmits a commitment to the server and receives a challenge from the server at step 18.5. The client then retrieves the stored token associated with the first part of the message at step 18.6. At step 18.7, it uses an "incorrect" PIN guess "0000" to create a "secret" and generate V. The exchange of a commitment and a challenge and the calculation of V can be carried out as described with respect to the protocols of Tables 6, 8, 9, 10 or 11 above. For example, the client may use steps 6.2 to steps 6.6 of FIG. 6 or the corresponding steps described for the other protocols. Instead of receiving the PIN from the user, the client uses the PIN "0000" to create a "dummy secret" that is then used to create V.

The "secret" will not be the real client secret issued by the TA for the identity associated with the part of the message since the PIN used to create the secret is not the PIN originally entered by the TA to split the secret into a PIN and a token.

The client then checks at step 18.8 if p is smaller than the parameter P. If it is smaller than P, steps 18.5 to 18.8 are repeated for the token associated with the second part of the message. Steps 18.5 to 18.8 are repeated until the whole message has been communicated to the server without actually sending any parts of the message. Using the protocol of Table 6 as an example, each time step 18.5 is repeated, p is increased by 1 and the identity for the next part of the message is used to generate a new U and the identity and the new U are transmitted to the server. Moreover, each time step 18.6 is repeated, the token associated with the new part of the message is combined with an "incorrect" PIN guess "0000" to generate the coordinates of a new V which is sent to the server. When it is determined at step 8 that the counter p equals the parameter P, the program ends.

The steps on the server side will now be described with respect to FIG. 19. The server receives a message at step 19.1, indicating that the client will begin to communicate information in a covert channel. The server receives a commitment and generates and transmits a challenge at step 19.2. At step 19.3, the receives the coordinates of point V and it determines the difference between the PIN used in the client to derive V and the PIN that was used to generate the token in the first place. The server can do this since it has been issued with its own secret sQ from the TA. The server may carry out the exchange of a commitment and a challenge and the pairing calculation that takes V as an input as has been described with respect to the protocols of Table 6, 8, 9, 10 or 11 above. For example, the client may use steps 7.2 to steps 7.5 of FIG. 7 or the corresponding steps described for the other protocols. The server determines the value of δ from the value obtained for g and the relationship $g=e(U+yA, Q)^\delta$ when a protocol without time permits are used or the relationship $g=e(R+yA, Q)^\delta$ when time permits are used.

The client then stores this PIN difference at step 19.4 and checks if the client will send any more information at step 19.5. If the client sends more information, the server repeats steps 19.2 to 19.4 until it has recovered all information that the client wants to communicate. In some implementations, the client may send the value of P to the server as well so that the server already knows how many times it will need to repeat the PIN difference determination process. When the server determines that the full message has been received, it then proceeds to process the message. Consequently, using the credit card example above, the server cycles through the process until it has received 64566565787898987670 and also the information associated with the last secret. The information obtained in the last iteration of the PIN difference determination process, associated with the last secret corresponding to the whole credit card number, is used to make sure the server has assembled the right digits, by exposing the extent of the PIN errors on the client secrets.

The server may for example forward the credit card number in a token, and over a secure channel, to another server to allow the client to carry out a transaction with that server using the credit card information, without actually ever sending any credit card information. The other server may for example be a server operated by a bank.

In some examples, the secret based on the entire credit card number may be based on a hash of the credit card number plus the security code. The server can then check what it has assembled, using the PIN difference determination process, against the hash of the credit card plus security code "h(6456656578789898767) and using the extent of the PIN error for that secret to make sure it knows how many digits are supposed to be culled from the information assembled, in this case 19.

It will be appreciated that no credit card numbers ever have to be stored on the client. No credit card numbers are ever transmitted to the server. The server does not need to store credit card numbers, it only creates them transiently when it is instructed to make a payment, by assembling the credit card number and CVC2 number from the extent of the PIN error. The client secrets act as a tokenisation system, which can be stored on an end user software wallet, or even by the merchant in their system when they need to instruct the payment processor to make a payment. Moreover, it will be appreciated that although a CVC2 code has been referred to above, the information to be assembled on the server side can, additionally or alternatively, include other security code information, expiry date information and/or other information.

Figure 17:
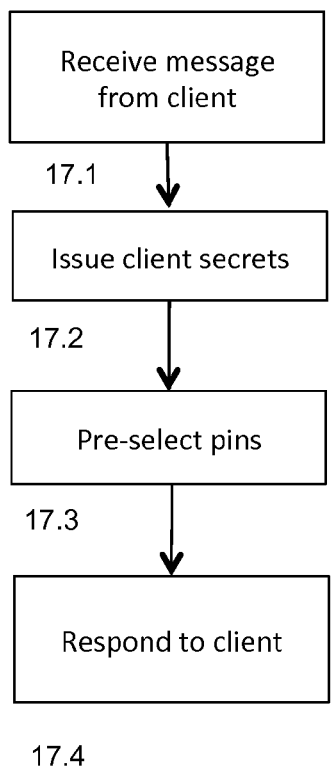
FIGS. 17, 18 and 19 are flow diagrams illustrating an example of how information can be sent in a covert channel provided by the system
Figure 18:
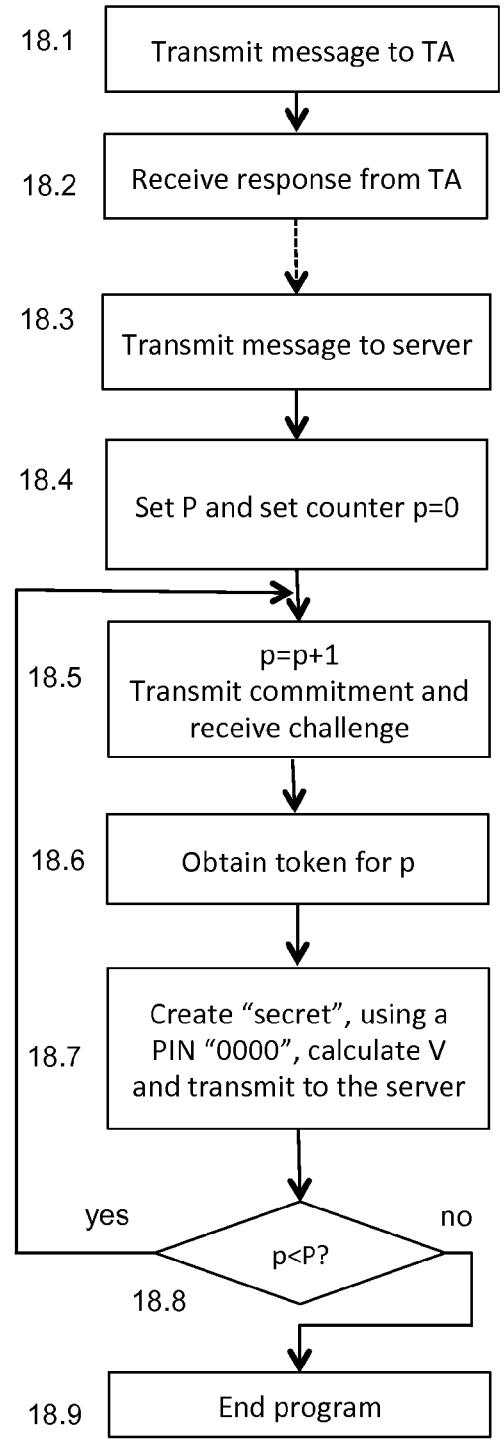
Figure 19:
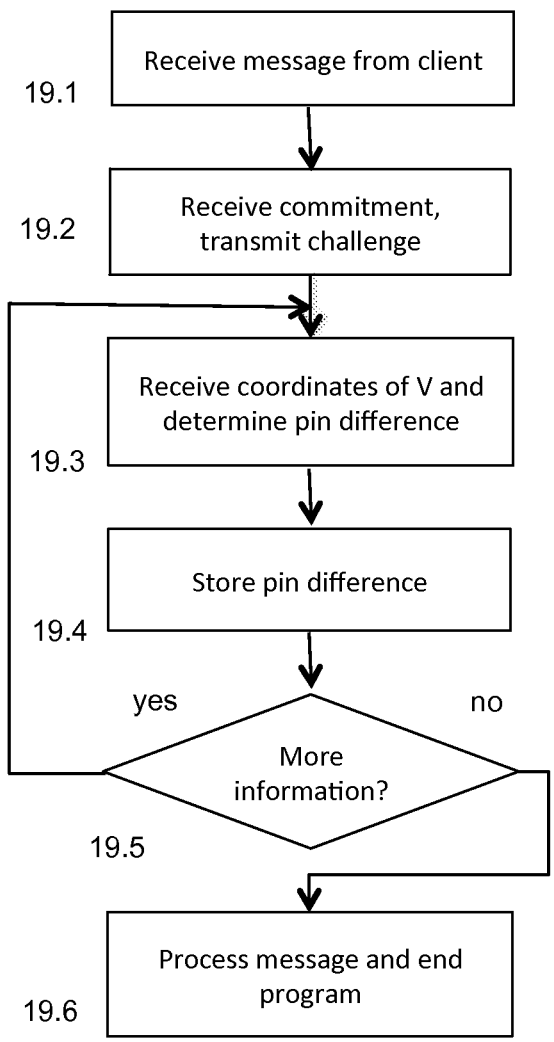

It will be realised that the processes described with respect to FIGS. 17, 18 and 19 are only an example of the processes in the TA, the client and the server for recovering secret client information in the server. Other implementations are contemplated. For example, in some examples, the client and the server may only exchange a commitment and a challenge at the beginning of the process. The client may send the ID of all the parts of the message in the same commitment or the same ID may be used for all parts. If the same ID is used for all parts of the message, either the plurality of tokens and PINs will need to be extracted from the same secret or the TA will use a number of master secrets to generate a number of client secrets.

The uses of a covert channel as described above are various. For example, the M-Pin error determination process may be used to allow the server to recover a credit card number along with the expiry date and other information required to carry out a purchase, as described above. Alternatively, it may be used to communicate a password, bank account details or other information which the client does not wish to transmit across a communication medium.

The protocols described herein can be used by any person or organisation that wants to authenticate a client or clients to a computing system or resource. For example, the client may want to transmit confidential information to the server and the server may want to establish that the client is who it says it is and the client wants to encrypt the information it sends. The protocols may also be used within a company or organisation. For example, an organisation may set up its own TA and a number of authentication servers and issue the members of the organisation with IDs. That way all communication within the organisation may be securely transmitted.

Whilst specific examples and embodiments of the invention have been described, the scope of the invention is defined by the appended claims and not limited to the examples and embodiments described. The invention could therefore be implemented in other ways and numerous modifications and alternative arrangements can be contemplated, as would be appreciated by those skilled in the art.

It will be realised that the known protocols, their problems and the desired features of a secure protocol are described to provide context only. Some of the features described as important, main or desired features may be important, main and desired features for some applications only and may not be present in all embodiments of the invention. As mentioned above, the embodiments of the invention are not limited to protocols that meet all or a specific number of the 10 security features described above.

Although specific protocols have been shown in the Tables in the description, variations and modifications to the protocols are contemplated. As specific examples, instead of the authentication server carrying out the pairing that takes V as an input, the client may off-load this pairing to a separate server. Moreover, the server may not directly take V as an input to the pairing calculation but derive an input to the pairing calculation based on V. For example, it may multiply V by a value before using it as an input. Depending on the implementation, it may then also need to multiply an input to the pairing based on the server secret with the same value so that, using bilinearity, the server will still be able to authenticate the client.

It will be realised that although it was described in some of the examples that an R-ate pairing can be used, any type of suitable pairing may be used. For example, the Weil pairing, the Tate pairing and the ate pairing are other pairings that may be used instead of the R-ate pairing.

Although the client secret has been described to be split into a token and a PIN, the invention is not limited to two-factor authentication. As has been mentioned above, the client secret can be split into any number of factors and the factor which is not stored is not limited to a PIN. The PIN may for example be replaced with a biometric, such as a finger print, face recognition data or an iris scan, or with a soft biometric. A soft biometric may be provided by biometrics data categorised into categories in order to reduce the data representing the biometrics. For example, all finger prints may be categorised based on characteristics into 10000 categories and the soft biometrics data indicates the category of the user's finger print. In some examples, the secret may be split into a token, a PIN and a soft biometric. In some examples, the PIN and/or the token may be replaced by, or further factors of the secret may include, voice data or the geolocation of the user.

Although it has been described that the client and the server can communicate over a data network such as the Internet, any communication medium is contemplated. For example, the protocols in the examples described herein may be used to send information using wireless communication technology but also non-wireless communication technology. As a few specific examples, the protocols may for example be used to send information using 3G, 4G, Bluetooth, Infrared communication or fibre optics. The protocols may also be used in communication methods that include broadcasting, digital storage media or even printed information.

Although it has been described that the server will be issued with secret sQ, where Q is a fixed generator of $\mathbb{G}_2$, Q may alternatively be derived from an identity for the server, as is the case in for example the protocol in Table 5.

Moreover, although it has been described that the client extracts the PIN received from the user from the secret and stores the token that remains, the client may in some circumstances carry out some processing to the received PIN before it extracts the obtained value from the token. For example, it may multiply or add a certain number to the PIN. Similarly, when the client receives a PIN guess, the client carries out the same transformation of the PIN guess as it did with the original PIN and then uses the transformed PIN to recover the secret.

Although it has been described with respect to M-Pin and M-Pin Full that the server carries out authentication before it carries out the key agreement, the client and the server may proceed directly to the key agreement. For example, such a protocol is shown in Table 11. In Table 11, the authentication takes place after the keys have been established. However, in some applications authentication may not be necessary or authentication may have been carried out using an alternative process. In other words, the server may not calculate the value of g and check if it is equal to 1 in the protocols of Tables 8 and 10, but will instead calculate the value of r from the result of the pairing based on V and return the value of r to the client for the client to derive its key. Consequently, in Tables 8, 9 and 10, g is not calculated and compared to 1 but the other steps of the protocol may remain the same.

Moreover, although it has been described that the trusted authority is an important part of the system, it will be realised that there may be applications, where the security requirements are lower, where a trusted authority is not used.

Incorporation by Reference

The entire contents of all patents, published patent applications, and other references cited herein are hereby expressly incorporated herein in their entireties by reference.

REFERENCES

List of References A

1. IEEE P1363 home page. http://grouper.ieee.org/groups/1363/.
2. P. S. L. M. Barreto and M. Naehrig. Pairing-friendly elliptic curves of prime order. In *Selected Areas in Cryptology—SAC* 2005, volume 3897 of *Lecture Notes in Computer Science*, pages 319-331. Springer-Verlag, 2006.
3. S. Blake-Wilson, D. Johnson, and A. Menezes. Key agreement protocols and their security analysis. *Cryptography and Coding*, 1355:30-45, 1997.
4. D. Boneh and M. Franklin. Identity-based encryption from the Weil pairing. SIAM Journal of Computing, 32(3):586-615, 2003.
5. L. Chen and C. Kudla. Identity based key agreement protocols from pairings. In *Proc. of the 16-th IEEE Computer Security Foundations Workshop*, pages 219-233. IEEE Computer Society, 2003.
6. D. Fiore and R. Gennaro. Making the Diffie-Hellman protocol identity-based. In *Topics in Cryptology—CT-RSA* 2010, volume 5985 of *Lecture Notes in Computer Science*, pages 165-178. Springer, 2010.
7. D. Freeman, M. Scott, and E. Teske. A taxonomy of pairing friendly elliptic curves. *Journal of Cryptography*, 23:224-280, 2010.
8. L. Fuentes-Castaneda, E. Knapp, and R. Rodriguez-Henríquez. Faster hashing to $\mathbb{G}_2$. In *Selected Areas in Cryptography—SAC* 2011, volume 7118 of *Lecture Notes in Computer Science*, pages 412-430. Springer-Verlag, 2011.
9. S. Galbraith, K. Paterson, and N. Smart. Pairings for cryptographers. *Discrete Applied Mathematics*, 156:3113-3121, 2008.
10. S. Galbraith and M. Scott. Exponentiation in pairing-friendly groups using homomorphisms. In *Pairing* 2008, volume 5209 of *Lecture Notes in Computer Science*, pages 211-224. Springer-Verlag, 2008.
11. R. P. Gallant, R. J. Lambert, and S. A. Vanstone. Faster point multiplication on elliptic curves with efficient endomorphisms. In Advances in *Cryptology—Crypto* 2001, volume 2139 of *Lecture Notes in Computer Science*, pages 190-200. Springer-Verlag, 2001.
12. F. Hao and D. Clarke. Security analysis of a multi-factor authenticated key exchange protocol. Cryptology ePrint Archive, Report 2012/039, 2012. http://eprint.iacr.org/2012/039.
13. H. S. Kim, S. W. Lee, and K. Y. Yoo. ID-based password authentication scheme using smart cards and fingerprints. *ACM Operating Systems Review*, 37(4):32-41, 2003.
14. I. Liao, C. Lee, and M. Hwang. A password authentication scheme over insecure networks. *Journal of Computer and System Sciences*, 72:727-740, 2006.
15. R. Martinez-Pelaez and F. Rico-Novella. Cryptanalysis of Sood at al.'s authentication scheme using smart cards. Cryptology ePrint Archive, Report 2012/386, 2012. http://eprint.iacr.org/2012/386.

16. D. Pointcheval and S. Zimmer. Multi-factor authenticated key exchange. In *ACNS'08 Proceedings of the 6th international conference on Applied cryptography and network security*, pages 277-295. Springer-Verlag, 2008.
17. R. Sakai, K. Ohgishi, and M. Kasahara. Cryptosystems based on pairing. The 2000 Symposium on Cryptography and Information Security, Okinawa, Japan, 2000.
18. C. P. Schnorr. Efficient identification and signatures for smart cards. In *Crypto'89: Advances in Cryptology*, volume 435 of *Lecture Notes in Computer Science*, pages 239-252, 1989.
19. M. Scott. Authenticated ID-based key exchange and remote log-in with simple token and PIN number. Cryptology ePrint Archive, Report 2002/164, 2002. http://eprint.iacr.org/2002/164.
20. M. Scott. Cryptanalysis of an ID-based password authentication scheme using smart cards and fingerprints. Cryptology ePrint Archive, Report 2004/017, 2004. http://eprintiactorg/2004/017.
21. M. Scott. On the efficient implementation of pairing-based protocols. In *Cryptography and Coding* 2011, volume 7089 of *Lecture Notes in Computer Science*, pages 296-308. Springer-Verlag, 2011.
22. A. Shamir. Identity-based cryptosystems and signature schemes. In *Advances in Cryptology: Proceedings of CRYPTO* 84, volume 196 of Lecture Notes in Computer Science, pages 47-53, 1984.
23. S. Sood, A. Sarje, and K. Singh. An improvement of Liao at al's authentication scheme using smart cards. *International Journal of Computer Applications*, 1(8):16-23, 2010.
24. D. Stebila, P. Poornaprajna, and S. Chang. Multi-factor password-authenticated key exchange. In *Australasian Information Security Conference, CPRIT volume* 105, pages 56-66. Australian Computer Society, 2010.
25. C. Tsai, C. Lee, and M. Hwang. Password authentication schemes: Current status and key issues. *International Journal of Network Security*, 3(2):101-115, 2006.
26. D. Wang, C. Ma, and P. Wu. Secure password-based remote user authentication scheme with non-tamper resistant smart cards. Cryptology ePrint Archive, Report 2012/227, 2012. http://eprint.iacr.org/2012/227.
27. Shengbao Wang, Zhenfu Cao, Zhaohui Cheng, and Kim-Kwang Raymond Choo. Perfect forward secure identity-based authenticated key agreement protocol in the escrow mode. *Science in China Series F Information Sciences*, 52(8):1358-1370, 2009.
28. Y. Wang. Efficient identity-based and authenticated key agreement protocol. Cryptology ePrint Archive, Report 2005/108, 2005. http://eprint.iacr.org/2005/108.
29. Y. Wang. Password protected smart card and memory stick authentication against off-line dictionary attacks. Cryptology ePrint Archive, Report 2012/120, 2012. http://eprint.iacr.org/2012/120.
30. T. Wu. The secure remote password protocol. In *Proceedings of the* 1998 *Internet Society Network and Distributed System Security Symposium*, pages 97-111, 1998.
31. Guomin Yang, Duncan S. Wong, HuaxiongWang, and Xiaotie Deng. Formal analysis and systematic construction of two-factor authentication scheme. In *Proceedings of the 8th international conference on Information and Communications Security*, ICICS'06, pages 82-91. Springer-Verlag, 2006.
32. E. Yoon and K. Yoo. New authentication scheme based on a one-way hash function and Diffie-Hellman key exchange. In CANS'05 *Proceedings of the 4th international conference on Cryptology and Network Security*, volume 3810 of *Lecture Notes in Computer Science*, pages 147-160. Springer-Verlag, 2005.

List of References B

1. D. F. Aranha, K. Karabina, P. Longa, C. H. Gebotys, and J. Lopez. Faster explicit formulas for computing pairings over ordinary curves. Cryptology ePrint Archive, Report 2010/526, 2010. http://eprint.iacr.org/2010/526.
2. L. Ballard, M. Green, B. de Medeiros, and F. Montrose. Correlation-resistant storage via keyword-searchable encryption. Cryptology ePrint Archive, Report 2005/417, 2005. http://eprint.iacr.org/2005/417.
3. F. Bao, R. Deng, and H. Zhu. Variations of diffie-hellman problem. In *ICICS*2003, volume 2836 of *Lecture Notes in Computer Science*, pages 301-312. Springer-Verlag, 2003.
4. P. S. L. M. Barreto and M. Naehrig. Pairing-friendly elliptic curves of prime order. In *Selected Areas in Cryptology—SAC* 2005, volume 3897 of *Lecture Notes in Computer Science*, pages 319-331. Springer-Verlag, 2006.
5. M. Bellare, C. Namprempre, and G. Neven. Security proofs for identity-based identification and signature schemes. In *Eurocrypt* 2004, volume 3027 of *Lecture Notes in Computer Science*, pages 268-286. Springer-Verlag, 2004.
6. D. Boneh and M. Franklin. Identity-based encryption from the Weil pairing. SIAM *Journal of Computing*, 32(3):586-615, 2003.
7. D. Boneh, B. Lynn, and H. Shacham. Short signatures from the well pairing. In *Asiacrypt* 2001, volume 2248 *of Lecture Notes in Computer Science*, pages 514-532. Springer-Verlag, 2001.
8. J. Cha and J. Cheon. An identity-based signature from gap diffie-hellman groups. In *PKC* 2003, volume 2567 of *Lecture Notes in Computer Science*, pages 18-30. Springer-Verlag, 2003.
9. B. Chevalier-Mames, J-S. Coron, N. McCullagh, D. Naccache, and M. Scott. Secure delegation of elliptic curve pairing. Cryptology ePrint Archive, Report 2005/150, 2005. http://eprint.iacr.org/2005/150.
10. A. Fiat and A. Shamir. How to prove yourself: Practical solutions to identification and signature problems. In Crypto 1986, volume 263 of *Lecture Notes in Computer Science*, pages 186-194. Springer-Verlag, 1987.
11. D. Freeman, M. Scott, and E. Teske. A taxonomy of pairing friendly elliptic curves. *Journal of Cryptography*, 23:224-280, 2010.
12. S. Galbraith, K. Paterson, and N. Smart. Pairings for cryptographers. *Discrete Applied Mathematics*, 156:3113-3121, 2008.
13. K. Kurosawa and S-H. Heng. From digital signature to ID-based identification/signature. In *PKC* 2004, volume 2947 of *Lecture Notes in Computer Science*, pages 125-143. Springer-Verlag, 2004.
14. C. H. Lim and P. J. Lee. A key recovery attack on discrete log-based schemes using a prime order subgroup. In *Crypto* 1994, volume 1294 of *Lecture Notes in Computer Science*, pages 249-263. Springer-Verlag, 1994.
15. J. Pollard. Monte carlo methods for index computation mod p. *Mathematics of Computation*, 32, 1978.
16. M. Scott. Authenticated ID-based key exchange and remote log-in with simple token and PIN number. Cryptology ePrint Archive, Report 2002/164, 2002. http://eprint.iacr.org/2002/164.

17. M. Scott. Computing the tate pairing. In CT-RSA 2005, volume 3376 of Lecture Notes in Computer Science, pages 293-304. Springer-Verlag, 2005.
18. M. Scott. Replacing username/password with software-only two-factor authentication. Cryptology ePrint Archive, Report 2012/148, 2012. http://eprintiactorg/2012/148.
19. M. Scott and P. S. L. M. Barreto. Compressed pairings. Cryptology ePrint Archive, Report 2004/032, 2004. http://eprint.iacr.org/2004/032.
20. N. Smart and F. Vercauteren. On computable isomorphisms in efficient pairing-based systems. Discrete Applied Mathematics, 155:538-547, 2007.
21. M. Stam and A. K. Lenstra. Speeding up XTR. In Asiacrypt 2001, volume 2248 of Lecture Notes in Computer Science, pages 125-143. Springer-Verlag, 2001.
22. Y. Tseng and T. Tsai. Efficient revocable ID-based encryption with a public channel. The Computer Journal, 55(4):475-486, 2012.
23. Y. Wang. Efficient identity-based and authenticated key agreement protocol. Cryptology ePrint Archive, Report 2005/108, 2005. http://eprintiactorg/2005/108.
24. X. Yi. An identity-based signature scheme from well pairing. IEEE Communications Letters, 7:76-78, 2003.

List of References C

1. R. Gallant, R. Lambert, and S. Vanstone. Faster point multiplication on elliptic curves with efficient endomorphism. In *Crypto* 2001, volume 2139 of *Lecture Notes in Computer Science*, pages 190-200. Springer-Verlag, 2001
2. R. Sakai and M. Kasahara. ID based cryptosystems with pairing on elliptic curve. Cryptology ePrint Archive, Report 2003/054, 2003. http://eprintiactorg/2003/054

The invention claimed is:

1. A computer-implemented method of carrying out multi-factor zero-knowledge proof authentication of a first entity to a second entity, wherein the method uses pairing-based cryptography to carry out the authentication, and wherein the first entity is associated with a secret issued by a separate entity, corresponding to a point on an elliptic curve and having been divided into at least a first factor and at least a second factor in the first entity and wherein the method further comprises reconstructing in the first entity the full secret from tat least the first factor, stored in the first entity, and at least the second factor, received from a user, using the reconstructed fully secret to carry out a calculation and sending a result of the calculation to the second entity and using in the second entity the results received from the first entity in a calculation to authenticate the first entity, wherein the calculation in the first entity is a non-pairing calculation and the calculation in the second entity is a pairing calculation.

2. A method according to claim 1, wherein the second entity stores its own secret, also issued by the separate entity, the second entity secret also corresponding to a point on the elliptic curve and wherein the method further comprises: carrying out a product of pairings in the second entity comprising a first pairing that takes as one of its input the result received from the first entity and a second pairing that takes as one of its inputs the point on the curve corresponding to the second entity secret, and determining whether to authenticate the first entity based on the results of the product of pairings.

3. A method according to claim 1 further comprising deriving a session encryption key from the results of the pairing calculated during the authentication of the first entity.

4. A method according to claim 3, further comprising the second entity transmitting a value derived from the results of the pairing to the first entity and wherein deriving the session encryption key comprises the first entity deriving the session encryption key from said value.

5. A computer-implemented method in a first entity for communicating information to a second entity, without sending the actual information to the second entity, the information being associated with a secret divided into at least a first factor and a second factor, the method comprising:

combining at least the first factor and a dummy second factor into a dummy secret, the dummy second factor being different to the second factor by a value corresponding to the information to be communicated to the second entity; and carrying out a calculation in the first entity using the reconstructed dummy secret and sending the results of the calculation to the second entity, wherein the results are used in a calculation in the second entity to determine the difference between the dummy second factor and the second factor, wherein the information forms a part of a message, each part of the message being associated with a secret split into at least two factors, and wherein the method further comprises combining at least a first factor and a dummy factor into a dummy secret for each part of the message and sending the results of calculations based on the dummy secrets to the second entity for the second entity to assemble the message.

6. A method according to claim 5, wherein the calculation comprises a cryptographic pairing on an elliptic curve and the secret is a point on a curve.

7. A computer implemented method comprising:
receiving in an apparatus data from a client, the data being provided as part of an authentication attempt to authenticate the client to the apparatus, the client being associated with an actual secret that has been split into multiple factors and the data having been derived from multiple factors used in the client to attempt to reconstruct the actual secret;

determining that one of the factors of the multiple factors used to derive the data is different to a corresponding factor of the multiple factors of the actual secret and determining the extent of said difference;

determining an error value associated with the difference; and in response to determining that a value of a combined error value for a number of authentication attempts of the client does not exceed a predetermined maximum error value, inviting the client to attempt to authenticate again.

8. Apparatus comprising:
at least one memory having instructions stored thereon; and
at least one processor programmed to execute the instructions to perform the following operations:
receiving data from a client as part of an authentication attempt to authenticate the client to the apparatus, the client being associated with a secret that has been split into multiple factors and the received data having been derived from multiple factors used in the client to attempt to reconstruct the actual secret;

determining in the apparatus that one of the factors of the multiple factors used to derive the data is different to a corresponding factor of the multiple factors of the actual secret and determining the extent of the difference;

determining an error value associated with the difference; and in response to determining that a combined error value for a number of authentication attempts of the client does not exceed a predetermined maximum error value, inviting the client to attempt to authenticate again.

9. A non-transitory computer readable medium having instructions stored thereon that when executed by one or more processors of an apparatus cause the one or more processors to receive data from a client, the data being provided as part of an authentication attempt to authenticate the client to the apparatus, the client being associated with an actual secret that has been split into multiple factors and the data having been derived from multiple factors used in the client to attempt to reconstruct the actual secret;

determine that one of the factors of the multiple factors used to derive the data is different to a corresponding factor of the multiple factors of the actual secret and determining the extent of said difference;

determine an error value associated with the difference; and in response to determining that a combined error value for a number of authentication attempts of the client does not exceed a predetermined maximum error value, invite the client to attempt to authenticate again.

10. A computer implemented method of authenticating a first entity to a second entity, wherein the first entity is associated with a first entity secret split into multiple factors and the method comprises carrying out a calculation, using bilinear mappings, based on data derived from the first entity secret reconstructed from the multiple factors and determining in the second entity whether the first entity must have been in possession of the first entity secret based on a result of the calculation, the method further comprising:

reconstructing the secret in the first entity from the multiple factors of the secret; and using the reconstructed secret to derive an input to a bilinear mapping, wherein carrying out the calculation comprises computing a first bilinear mapping taking said input as a first input and a second input based on data associated with the second entity and computing a second bilinear mapping taking a first input based on data associated with the first entity and a second input data derived from a second entity secret, the first entity secret having been constructed from said data associated with the first entity and the second entity secret having been constructed from the data associated with the second entity such that the results of the mappings, or values derived from the results of the mappings, can be used to determine by the second entity whether the first entity is in possession of its secret.

11. A method according to claim 10, wherein the calculation comprises carrying out a multi-pairing realising two pairings corresponding to the first and second bilinear mapping and determining whether the result of the multi-pairing is equal to a predetermined value.

* * * * *